United States Patent [19]

Watanabe et al.

[11] Patent Number: 5,765,046
[45] Date of Patent: Jun. 9, 1998

[54] PIEZOELECTRIC VIBRATION ANGULAR VELOCITY METER AND CAMERA USING THE SAME

[75] Inventors: Shunji Watanabe, Tokyo; Tatsushi Nomura, Machida; Takamitsu Fujiu, Zama; Yoshinori Sango, Machida; Toru Fujii, Takasaki; Tetsuo Hattori, Yokohama, all of Japan

[73] Assignee: Nikon Corporation, Tokyo, Japan

[21] Appl. No.: 630,824

[22] Filed: Apr. 10, 1996

Related U.S. Application Data

[63] Continuation-in-part of Ser. No. 520,912, Aug. 30, 1995.

[30] Foreign Application Priority Data

| Aug. 31, 1994 | [JP] | Japan | 6-207080 |
| Aug. 31, 1994 | [JP] | Japan | 6-207081 |
| Aug. 31, 1994 | [JP] | Japan | 6-207082 |
| Apr. 10, 1995 | [JP] | Japan | 7-083828 |
| Apr. 10, 1995 | [JP] | Japan | 7-083830 |
| May 15, 1995 | [JP] | Japan | 7-115693 |
| Jun. 13, 1995 | [JP] | Japan | 7-170153 |
| Oct. 9, 1995 | [JP] | Japan | 7-287822 |
| Dec. 22, 1995 | [JP] | Japan | 7-335085 |

[51] Int. Cl.[6] .................... G03B 5/00; G01P 9/00; H01L 41/047; H01L 41/053
[52] U.S. Cl. .................... 396/53; 73/504.14; 310/348; 310/366
[58] Field of Search .................... 396/53; 73/504.14, 73/504.12; 310/348, 352, 351, 365, 366, 354

[56] References Cited

U.S. PATENT DOCUMENTS

| 4,152,616 | 5/1979 | Ozbirn | 310/352 X |
| 4,898,031 | 2/1990 | Oikawa et al. | 73/504.12 |
| 5,430,342 | 7/1995 | Watson | 310/352 X |
| 5,635,786 | 6/1997 | Fujimoto et al. | 73/504.12 X |

FOREIGN PATENT DOCUMENTS

| 3-150914 | 6/1991 | Japan . |
| 5-23030 | 3/1993 | Japan . |

*Primary Examiner*—W. B Perkey
*Attorney, Agent, or Firm*—Foley & Lardner

[57] ABSTRACT

A piezoelectric angular velocity meter includes a piezoelectric element. The piezoelectric element includes a first piezoelectric element and a second piezoelectric element bonded to the first piezoelectric element. The second piezoelectric element includes a second member made of a piezoelectric crystal, and upper- and lower-surface electrodes sandwiching the second member. The first piezoelectric element is fixed to the upper-surface electrode of said second piezoelectric element with an adhesive. The first piezoelectric element includes a first member made of a piezoelectric crystal, upper-surface electrodes, and a lower-surface electrode. The upper- and lower-surface electrodes sandwich the first member of the first piezoelectric element. The piezoelectric element is supported by two support portions.

14 Claims, 73 Drawing Sheets

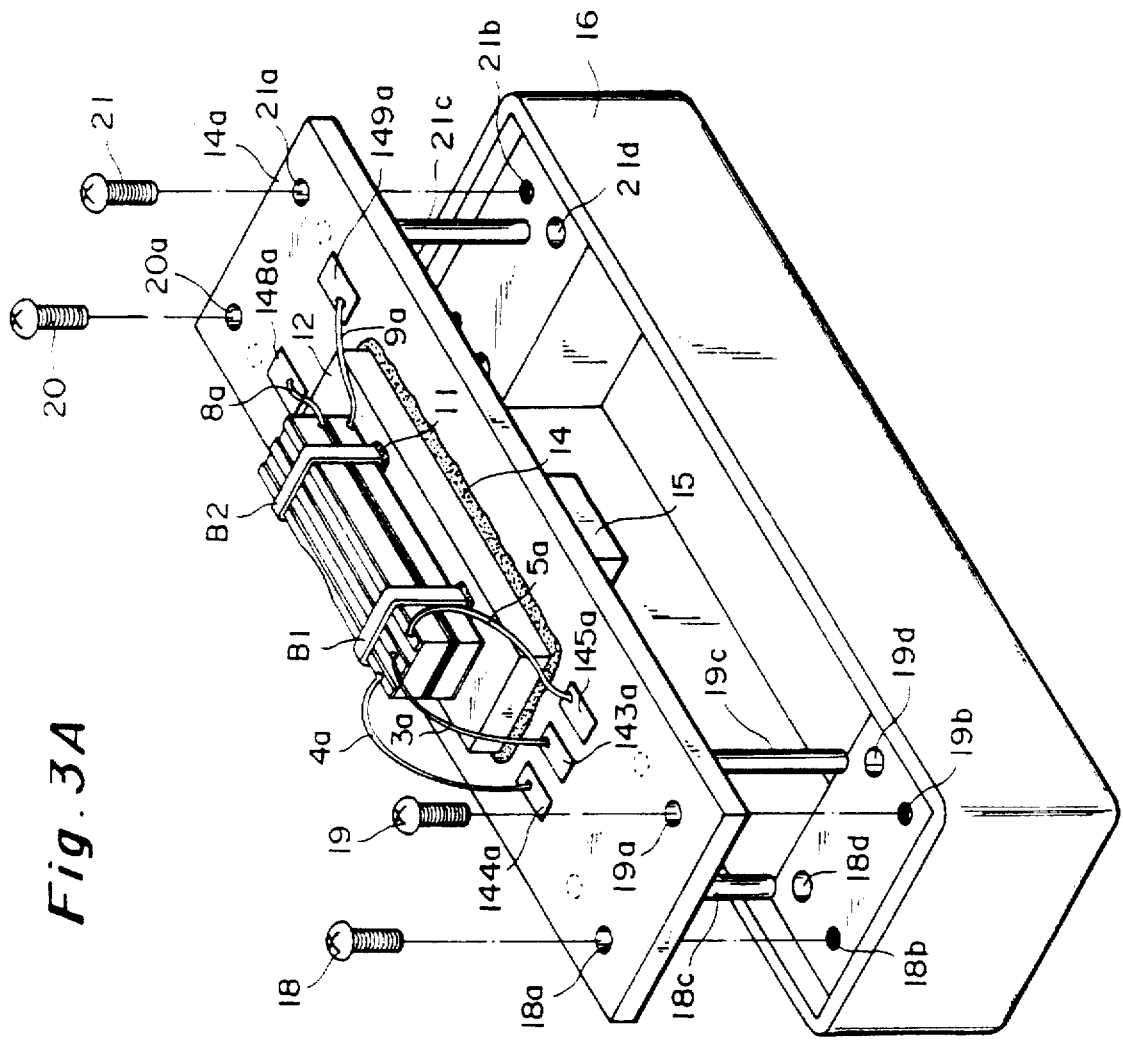

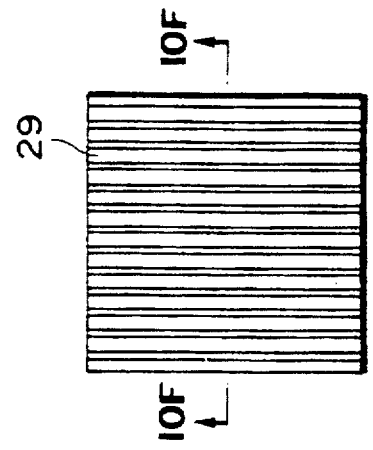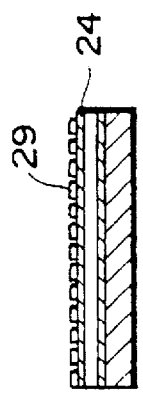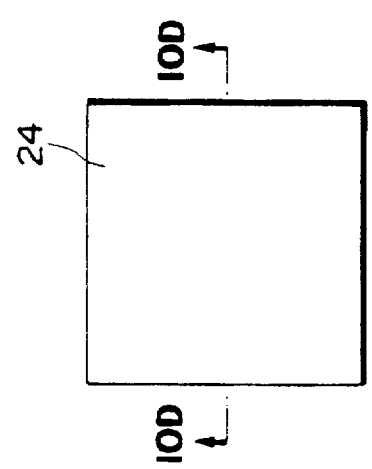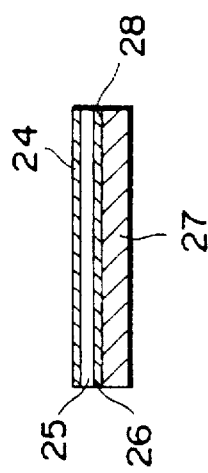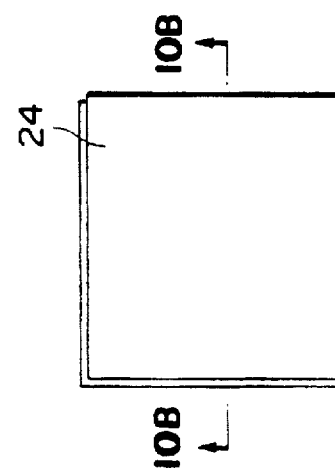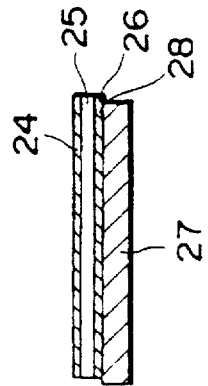

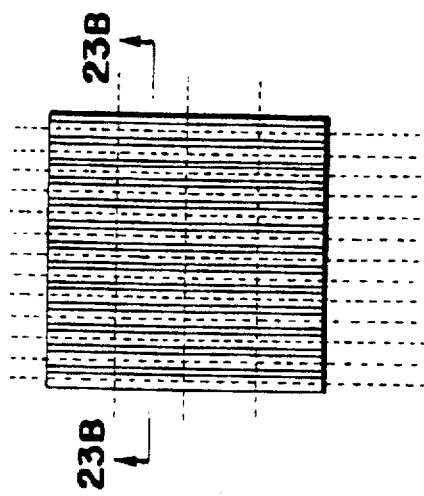
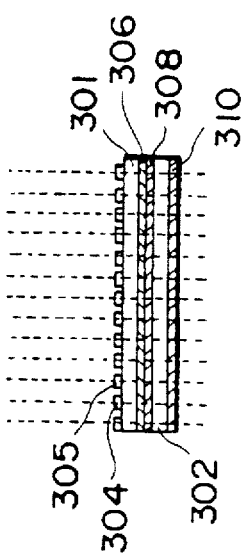
Fig. 23A  Fig. 23B
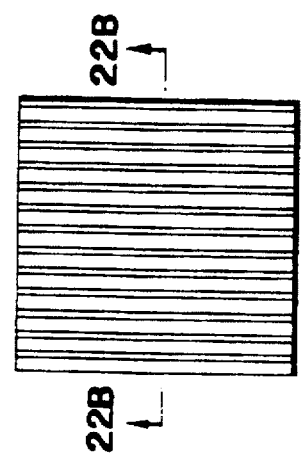
Fig. 22A  Fig. 22B
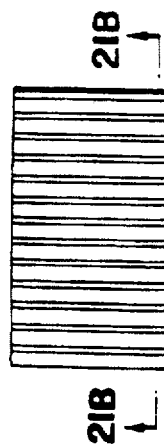
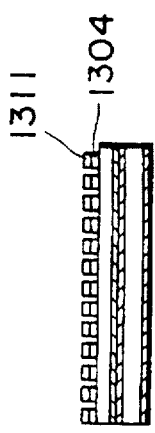
Fig. 21A  Fig. 21B

PIEZOELECTRIC VIBRATION ANGULAR VELOCITY METER AND CAMERA USING THE SAME

RELATED APPLICATIONS

This is a continuation-in-part application of application Ser. No. 08/520,912 filed on Aug. 30, 1995, now pending.

BACKGROUND OF THE INVENTION

1. Field of the Invention

The present invention relates to an angular velocity meter using a piezoelectric element and a camera using the meter and, more particularly, to a camera which prevents a camera shake.

2. Related Background Art

A conventional piezoelectric vibration angular velocity meter is disclosed in Japanese Patent Laid-Open No. 3-150914.

SUMMARY OF THE INVENTION

The piezoelectric angular velocity meters of the present invention can be classified into bimorph and unimorph piezoelectric angular velocity meters.

A bimorph piezoelectric angular velocity meter includes a piezoelectric element. This piezoelectric element includes a first piezoelectric element and a second piezoelectric element bonded to the first piezoelectric element.

The second piezoelectric element includes a second member made of a piezoelectric crystal, and upper- and lower-surface electrodes sandwiching the second member.

The first piezoelectric element is fixed to the upper-surface electrode of the second piezoelectric element with an adhesive. The first piezoelectric element includes a first member made of a piezoelectric crystal, upper-surface electrodes, and a lower-surface electrode. The upper- and lower-surface electrodes sandwich the first member. An adhesive is interposed between the lower-surface electrode of the first member and the upper-surface electrode of the second member. The upper-surface electrodes include a left electrode, a right electrode, and a middle electrode located between the left and right electrodes. These electrodes extend along the longitudinal direction of the piezoelectric element.

The first and second members are made of PZT. Each electrode is made of a silver paste.

When an AC voltage is applied between the upper- and lower-surface electrodes of the second piezoelectric element, the piezoelectric is subjected to element self-excited vibration. Since the first and second piezoelectric elements are bonded to each other, the first piezoelectric element also vibrates at this time. The piezoelectric element deflects in the direction of thickness of the piezoelectric element.

When the piezoelectric element is caused to vibrate without being fixed anywhere, i.e., when the piezoelectric element is vibrated in a nonrestraint state, the piezoelectric element (vibrator) vibrates on two nodes.

This piezoelectric angular velocity meter further includes a substrate. Two support portions are interposed between the substrate and the second piezoelectric element. The two support members are interposed between the piezoelectric element and the substrate at positions corresponding to the two nodes of vibration.

Assume that when the piezoelectric element is vibrated, the piezoelectric element deflects such that the central position of the element moves at a velocity V. At this time, when this piezoelectric element rotates about the central axis along the longitudinal direction of the piezoelectric element, a Coriolis force is generated in a direction (lateral direction) perpendicular to both the longitudinal direction and the direction of thickness of the piezoelectric element. As a result, the piezoelectric element deflects in the lateral direction.

The deflection amount of the piezoelectric element in the lateral direction corresponds to the rotational angular velocity of the piezoelectric element. This deflection amount can be measured by detecting the difference between voltage signals output from the left and right electrodes of the second piezoelectric element. Ideally, the deflection amount of the middle electrode in the direction of thickness does not change even if the piezoelectric element deflects in the lateral direction. In practice, however, the deflection amount of the middle electrode in the direction of thickness slightly changes. If the deflection amount in the direction of thickness changes, an accurate angular velocity cannot be detected. For this reason, the amplitude of an AC voltage to be applied to the piezoelectric element is controlled by an automatic level control circuit such that the deflection amount (amplitude) of the middle electrode of the piezoelectric element in the direction of thickness is kept constant.

This piezoelectric angular velocity meter can be applied to a camera. The camera includes a motor for moving a lens. The motor is controlled by a central processing unit (CPU).

The CPU controls the motor not to change the positions of a film and the optical axis of the lens in the camera on the basis of an angular velocity detected by the piezoelectric angular velocity meter, thereby causing the motor to move the lens.

A unimorph piezoelectric angular velocity meter does not have a first member. In a bimorph piezoelectric angular velocity meter, the piezoelectric element may be cantilevered.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a perspective view showing the piezoelectric element in FIG. 1, a circuit for driving the piezoelectric element, and a case for housing them;

FIG. 10A is a plan view of a piezoelectric element;

FIG. 10B is a sectional view taken along the direction indicated by arrows Z in FIG. 10A illustrating the element;

FIG. 10C is a plan view of a piezoelectric element;

FIG. 10D is a sectional view taken along the direction indicated by arrows Z in FIG. 10C illustrating the element;

FIG. 10E is a plan view of a piezoelectric element;

FIG. 10F is a sectional view taken along the direction indicated by arrows Z in FIG. 10E illustrating the element;

FIG. 21A is a plan view of a piezoelectric element;

FIG. 21B is a sectional view taken along the direction indicated by arrows Z in FIG. 21A illustrating the element;

FIG. 22A is a plan view of a piezoelectric element;

FIG. 22B is a sectional view taken along the direction indicated by arrows Z in FIG. 22A illustrating the element;

FIG. 23A is a plan view of a piezoelectric element;

FIG. 23B is a sectional view taken along the direction indicated by arrows Z in FIG. 23A illustrating the element;

FIG. 98 is an explanatory view for explaining the manufacturing method;

FIG. 99 is a variation chart of the resonance frequency on the drive side and the resonance frequency on the detection side;

FIG. 100 is a variation chart of the difference between the resonance frequency on the drive side and the resonance frequency on the detection side;

FIG. 101 is a side view of a piezoelectric vibrational angular velocity meter;

FIG. 102 is a front view of an element shown in FIG. 101; and

FIG. 103 is a perspective view showing a piezoelectric vibrational angular velocity meter of another embodiment.

DESCRIPTION OF THE PREFERRED EMBODIMENTS

Figure 1:
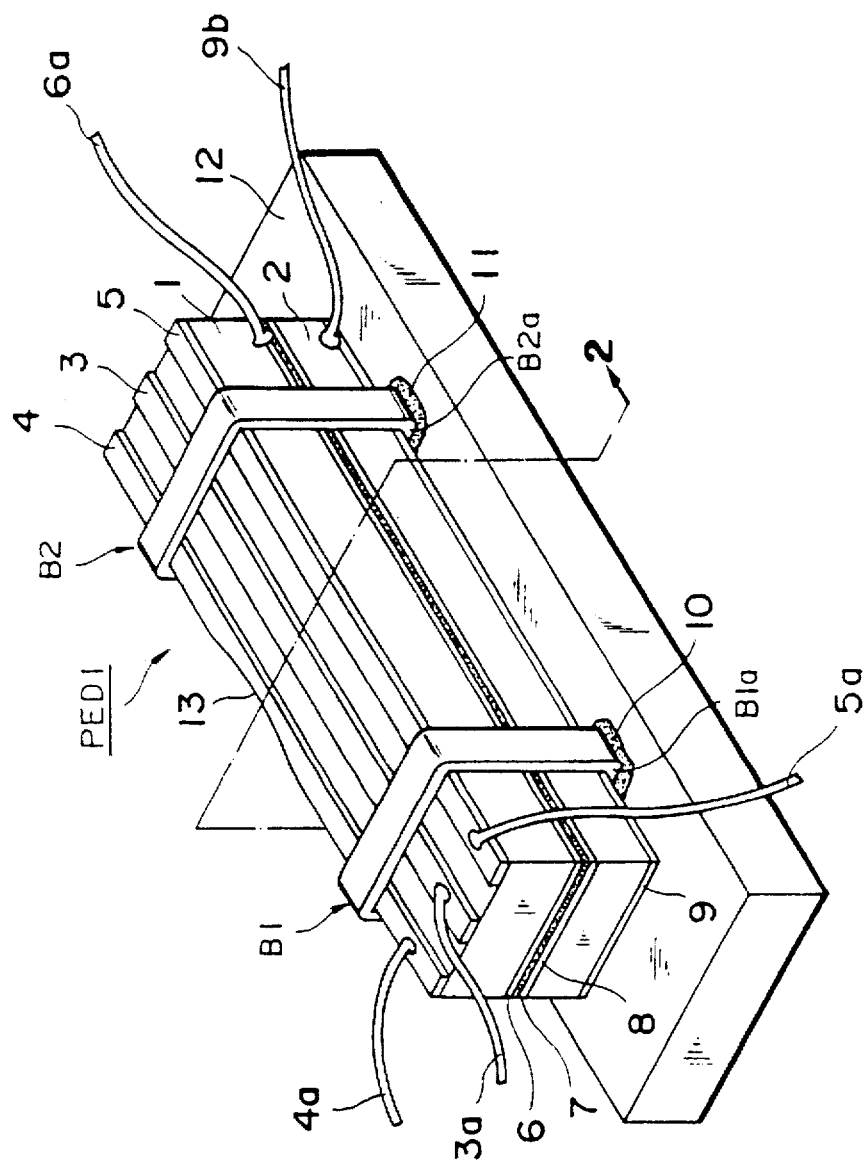
FIG. 1 is a perspective view of a piezoelectric element according to an embodiment of the present invention.
Figure 2:
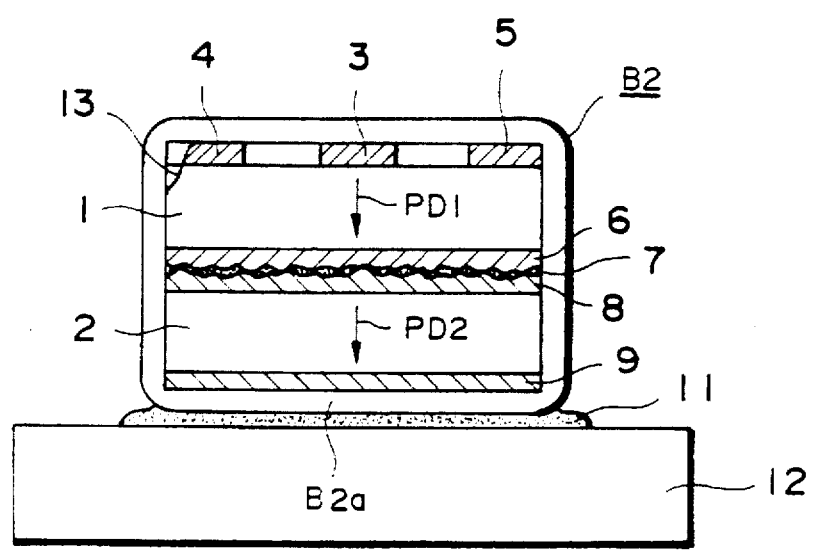
FIG. 2 is a longitudinal sectional view taken along the direction indicated by an arrow Z in FIG. 1 illustrating the piezoelectric element.

FIGS. 1 and 2 show a piezoelectric element according to an embodiment of the present invention.

A piezoelectric element PEDI comprises first and second piezoelectric elements. The first piezoelectric includes a first member 1, an electrode 6, and electrodes 3, 4, and 5. The electrode 6 and the electrodes 3, 4, and 5 sandwich the first member 1. The second piezoelectric element includes a second member 2 and electrodes 8 and 9 which sandwich the second member 2.

Each of the first and second members 1 and 2 is made of a piezoelectric crystal such as PZT. Each of the electrodes 3, 4, 5, 6, 8, and 9 is made of a silver paste. The lower surface of the first piezoelectric element is fixed to the upper surface of the second piezoelectric element via an adhesive layer 7.

A direction perpendicular to both the longitudinal direction and the direction of thickness of the first member 1 is defined as a "lateral direction" or "widthwise direction". The middle electrode 3 of the first piezoelectric element is arranged between the right and left electrodes 5 and 4. There are gaps between the middle electrode 3 and the right electrode 5 and between the middle electrode 3 and the left electrode 4. These electrodes 3, 4, and 5 are electrically insulated from each other. The electrodes 3, 4, and 5 extend parallel in the longitudinal direction.

The adhesive layer 7 between the lower surface of the lower-surface electrode 6 of the first piezoelectric element and the upper-surface electrode 8 of the second optical axis element is electrically insulated. Both the lower surface of the lower-surface electrode 6 of the first piezoelectric element and the upper surface of the upper-surface electrode 7 of the second piezoelectric element are rough. The adhesive layer 7 has a thickness of 1 mm or less. For these reasons, these electrodes 6 and 7 are electrically connected to each other.

The piezoelectric element PED1 is supported by ring-like support members B1 and B2. The rubber rings B1 and B2 are wound on the piezoelectric element PED1. Each of the rings B1 and B2 is made of silicone rubber and is fixed to a substrate 12 via adhesive layers 10 and 11. A node set when the piezoelectric element PED1 vibrates in a nonrestraint state is a point that remains still when the piezoelectric element PED1 vibrates without being supported anywhere. Two nodes are set. The piezoelectric element PED1 is supported by the support members B1 and B2 at the positions of these two nodes to be fixed to the substrate 12. The support members B1 and B2 respectively have support portions B1a and B2a.

The substrate 12 is a glass plate. The substrate 12 may be made of alumina.

One edge of the piezoelectric element PED1 is slightly cut. That is, a portion of the electrode 4 is cut, and the edge defined by the upper and side surfaces of the first piezoelectric element is smoothly arcuated. The first member 1 has an arcuated edge surface 13. When a portion of the piezoelectric element PED1 is cut, its natural oscillation frequency changes. A portion of the piezoelectric element PED1 is cut to adjust its natural oscillation frequency so as to match the frequency of an AC voltage to be applied between the electrodes 8 and 9.

Lead lines (wires) 3a, 4a, 5a, 6a, and 9a are electrically connected to the electrodes 3, 4, 5, 6, and 9, respectively.

The first and second members 1 and 2 have undergone polarization. The polarizing direction coincides with the direction of thickness of the members 1 and 2.

FIG. 3A shows the piezoelectric element in FIG. 1, a circuit unit for driving the piezoelectric element, and a case for housing them.

The glass plate 12 is fixed to a circuit board 14a via an adhesive layer 14. A circuit unit 15 is mounted on the lower surface of the circuit board 14a. The lead lines 3a, 4a, 5a, 6a, and 9a are electrically connected to the circuit unit 15 via terminals 143a, 144a, 145a, 146a, and 149a arranged on the upper surface of the circuit board 14a.

Four holes 18a to 21a are formed in the corner portions of the circuit board 14a. Screws 18 to 21 extend through these holes 18a to 21a, respectively. These screws 18 to 21 are threadably engaged with screw holes 18b to 21b formed in the upper surface of a lower case 16. The circuit board 14a is, therefore, fixed to the lower case 16. The lower case 16 is made of a plastic material.

A large cavity capable of housing the circuit unit 15 is formed in the center of the lower case 16. When the circuit board 14a is fixed to the lower case 16, the circuit unit 15 is housed in this cavity.

An input pin 18c, an output pin 19c, and a GND pin 21c extend downward from the circuit board 14a. These terminals 18c, 19c, and 21c are connect to the circuit unit 15. An input voltage is applied from the outside of the element in FIG. 3A to the circuit unit 15 via the input pin 18c. The GND pin 21c is connected to the earth (ground). An output voltage is output from the circuit unit 15 to the outside of this element via the output pin 19c.

Figure 3B:
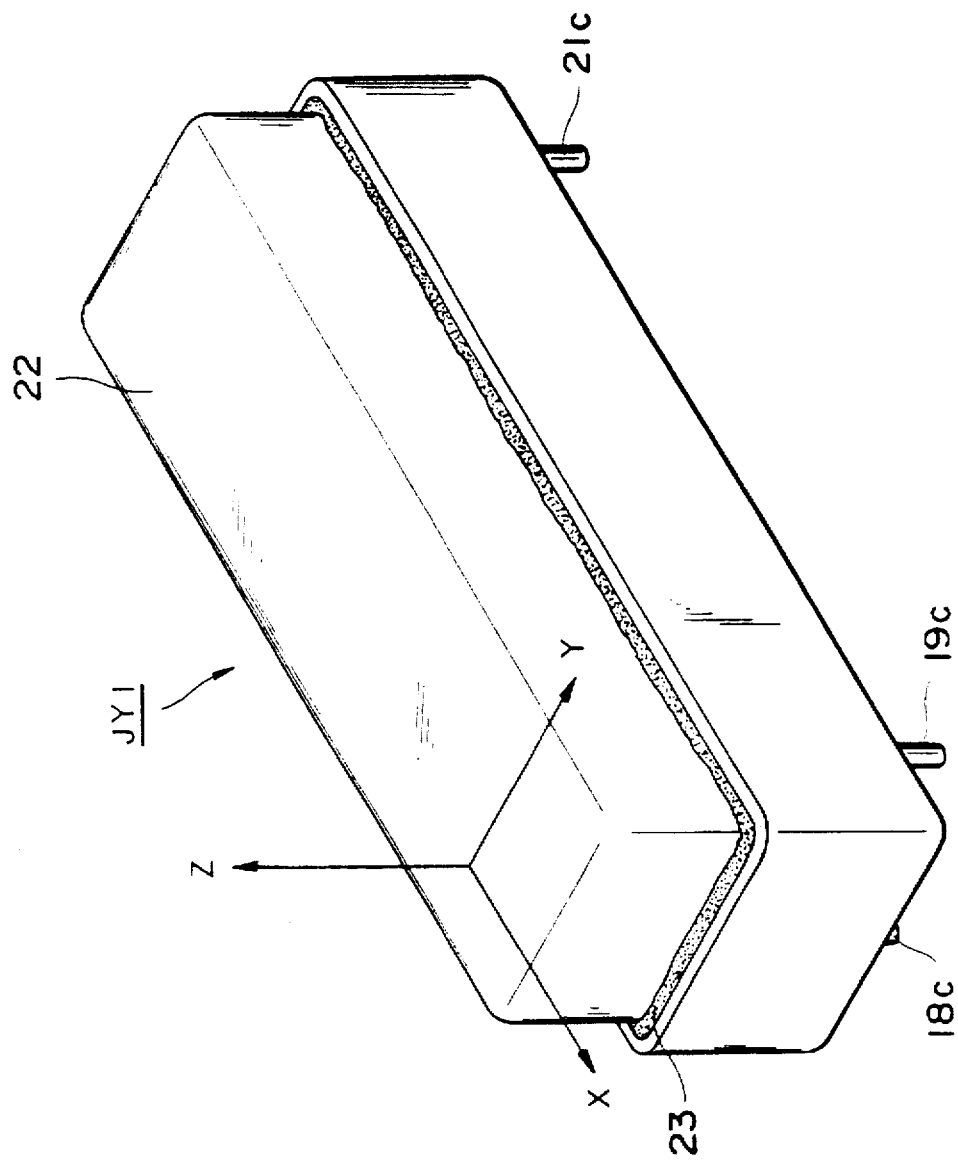
FIG. 3B is a perspective view of a piezoelectric angular velocity meter.

FIG. 3B shows a piezoelectric angular velocity meter. This element is obtained by mounting a cover (upper case) 22 on the upper surface of the element in FIG. 3A. The cover 22 is made of a metal. There is an adhesive (seal agent) layer 23 between the outer surface of the opening edge portion of the cover 22 and the inner surface of the opening edge portion of the lower housing. The airtightness in the case is maintained by the adhesive layer 23.

Figure 4A:
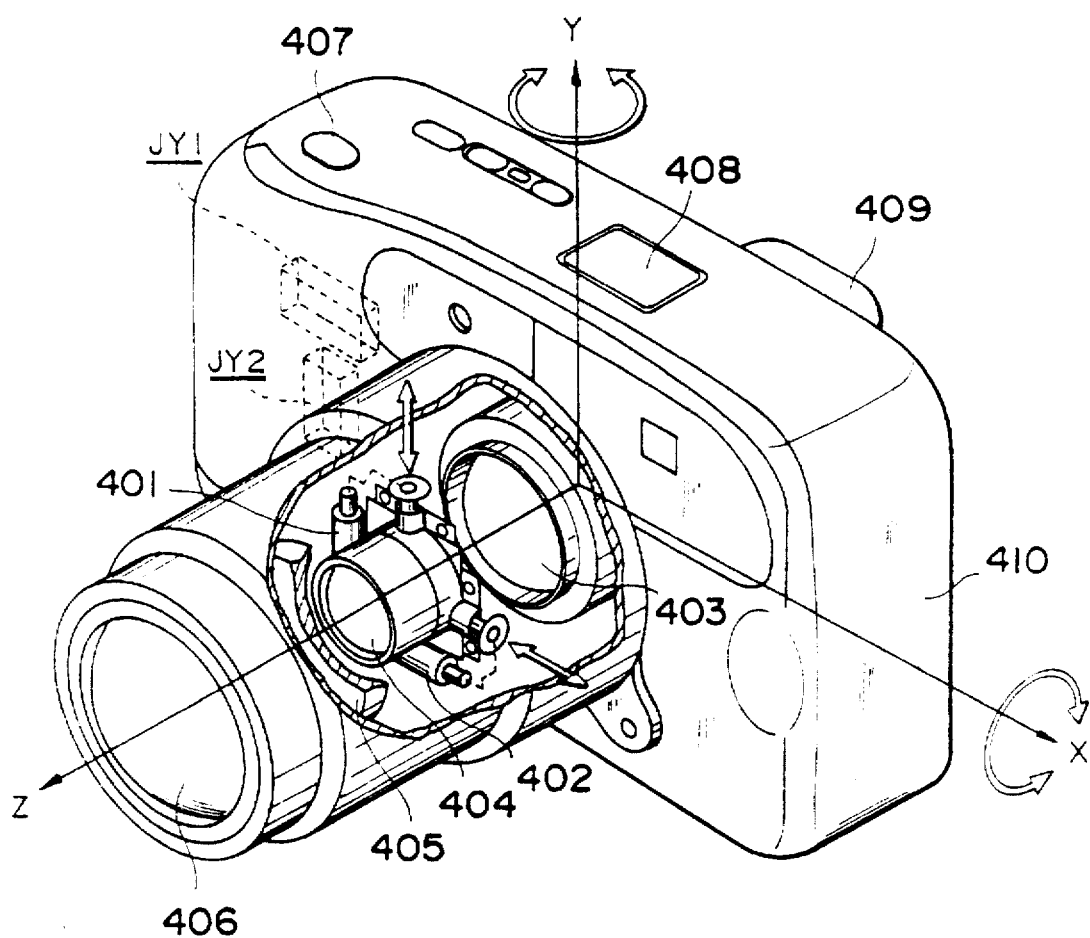
FIG. 4A is a perspective view of a camera using the piezoelectric angular velocity meter in FIG. 3B.

FIG. 4A shows a camera using a piezoelectric angular velocity meter (sensor) YJ1 in FIG. 3B.

This camera also includes a sensor JY2. The sensor JY2 has the same structure as that of the sensor JY1. The sensors JY1 and JY2 are arranged within the X-Y plane. The longitudinal directions of piezoelectric elements PED1 arranged in these sensors JY1 and JY2 are perpendicular to each other.

The optical axis of a lens of the camera is defined as the Z-axis. The X-axis, the Y-axis, and Z-axis in FIG. 4A are perpendicular to each other. This camera has a housing 410, in which the sensors JY1 and JY2 are arranged. The rotational angular velocity (pitching amount) of the camera which rotates about the X-axis is detected by the sensor JY. The rotational angular velocity (pitching amount) of the camera which rotates about the Y-axis is detected by the sensor JY2.

This camera includes lenses 403, 404, 405, and 406. Image light passing through these lenses is focused on a film 411 arranged in the housing 410. The lens 404 is moved in the X direction by a coreless motor 401, and is moved in the Y direction by a coreless motor 402.

Figure 4B:
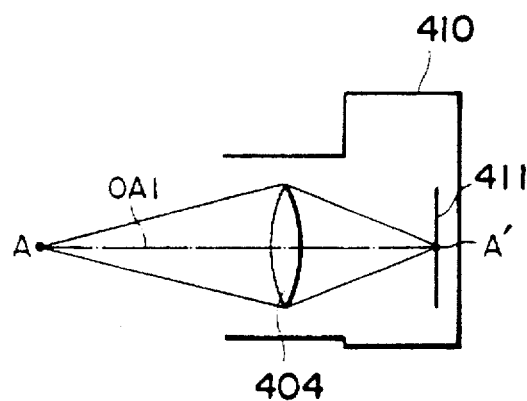
FIGS. 4B to 4D are views showing control of the lens of the camera.

While this camera is not rotated, an optical axis OA1 of the lens 404 extends through a center A' of the film 411. Light from an object A, therefore, passes through the center A' of the film 411 (see FIG. 4B).

Figure 4C:
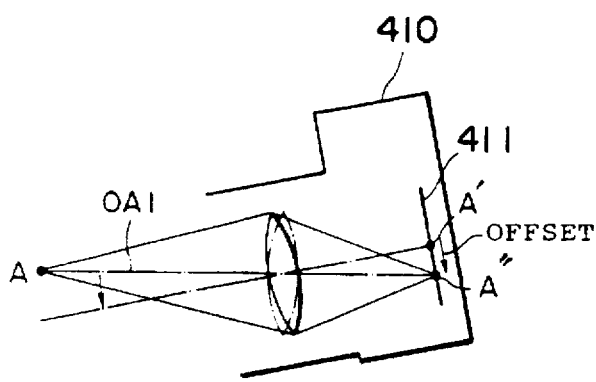

Let R (cm) be the distance from the X-Y plane (film surface) to the lens 404, and $\Omega$ (rad/sec) be the angular velocity detected by the sensor JY1. When the lens 404 is fixed to the housing 410 so as not to move, the lens 404 rotates about the X-axis at the angular velocity $\Omega$ (rad/sec), together with the camera (see FIG. 4C). At this time, the lens 404 is moved in the −Y direction at about a velocity R×$\Omega$ (cm/sec), together with the camera.

In this case, the focal point of light from the object A shifts from the point A' to a point A" on the film 411.

Figure 4D:
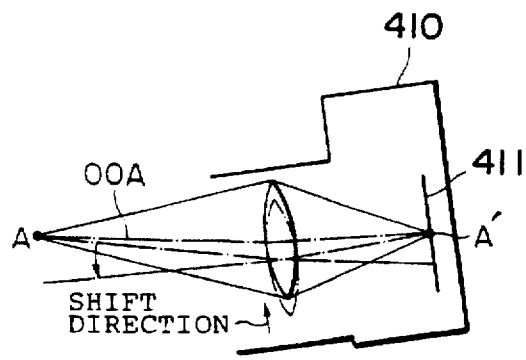

The camera of this embodiment includes a central processing unit 502. The central processing unit 502 controls the motor 401 to move the lens 404 in accordance with the angular velocity detected by the sensor JY1. When the angular velocity detected by the sensor JY1 is $\Omega$ (rad/sec), the lens 404 is moved in the +Y direction with respect to the housing 410 at about the velocity R×$\Omega$ (cm/sec) (see FIG. 4D). Even if, therefore, the camera rotates about the X-axis, an image of the object A does not move with respect to the film 411.

Similarly, when the lens 404 is fixed to the housing 410 so as not to move, and the camera rotates about the Y-axis at the angular velocity Ω (rad/sec), the lens 404 is moved in −X direction at about the velocity R×Ω (cm/sec).

The central processing unit 502 controls the motor 402 to move the lens 404 in accordance with the angular velocity detected by the sensor JY2. When the angular velocity detected by the sensor JY2 is Ω (rad/sec), the lens 404 is moved in the +X direction with respect to the housing 410 at about the velocity R×Ω (cm/sec) (see FIG. 4D). Even if, therefore, the camera rotates about the Y-axis, an image of the object A does not move with respect to the film 411.

Note that this camera, similar to a general camera, includes a release button (shutter button) 407, a liquid crystal display 408 for displaying an exposure value and the frame count of the film, and a finder 409.

The circuit unit 15 shown in FIG. 3B will be described next.

Figure 5:
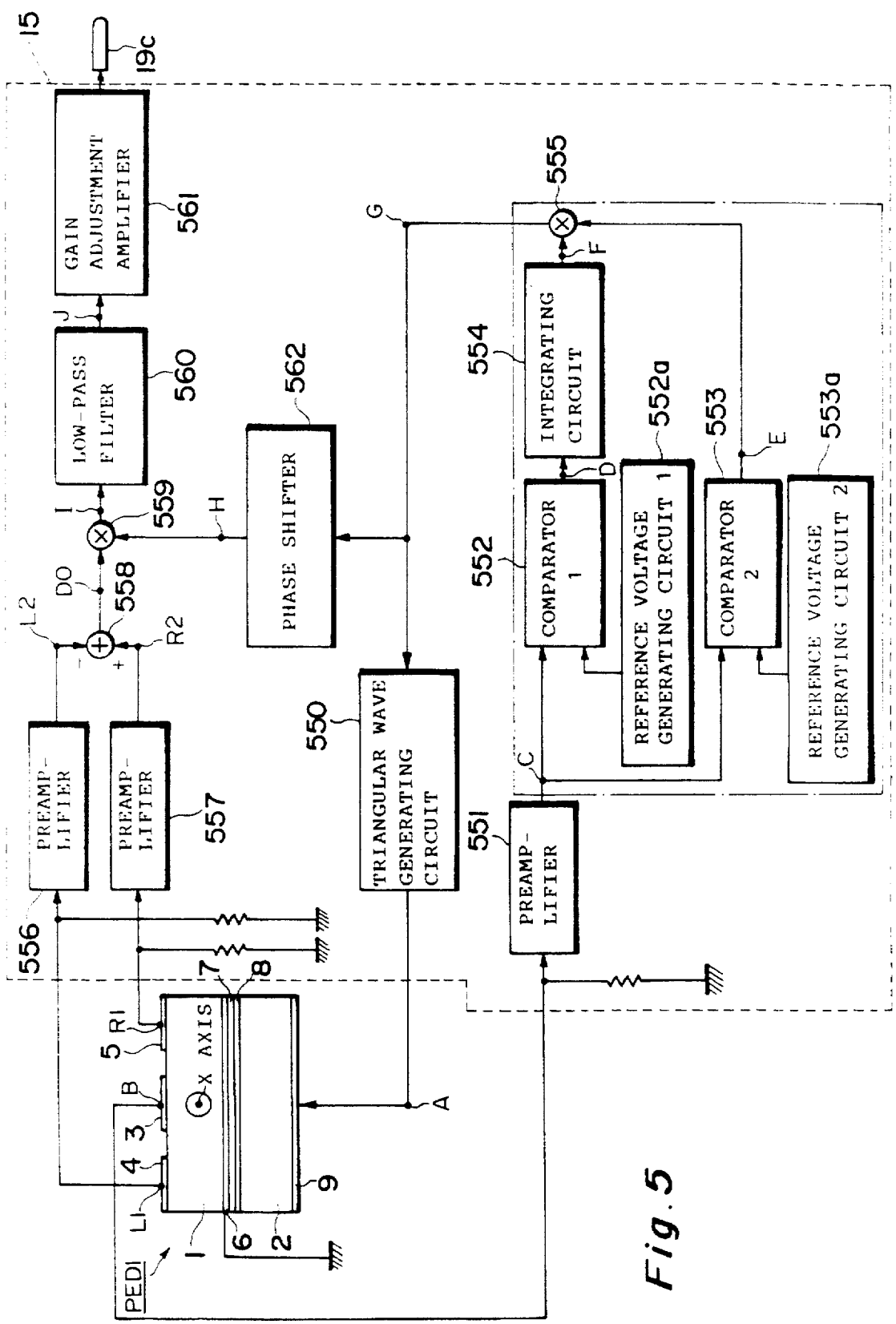
FIG. 5 is a block diagram showing a piezoelectric element and a circuit for driving it.
Figure 6A:
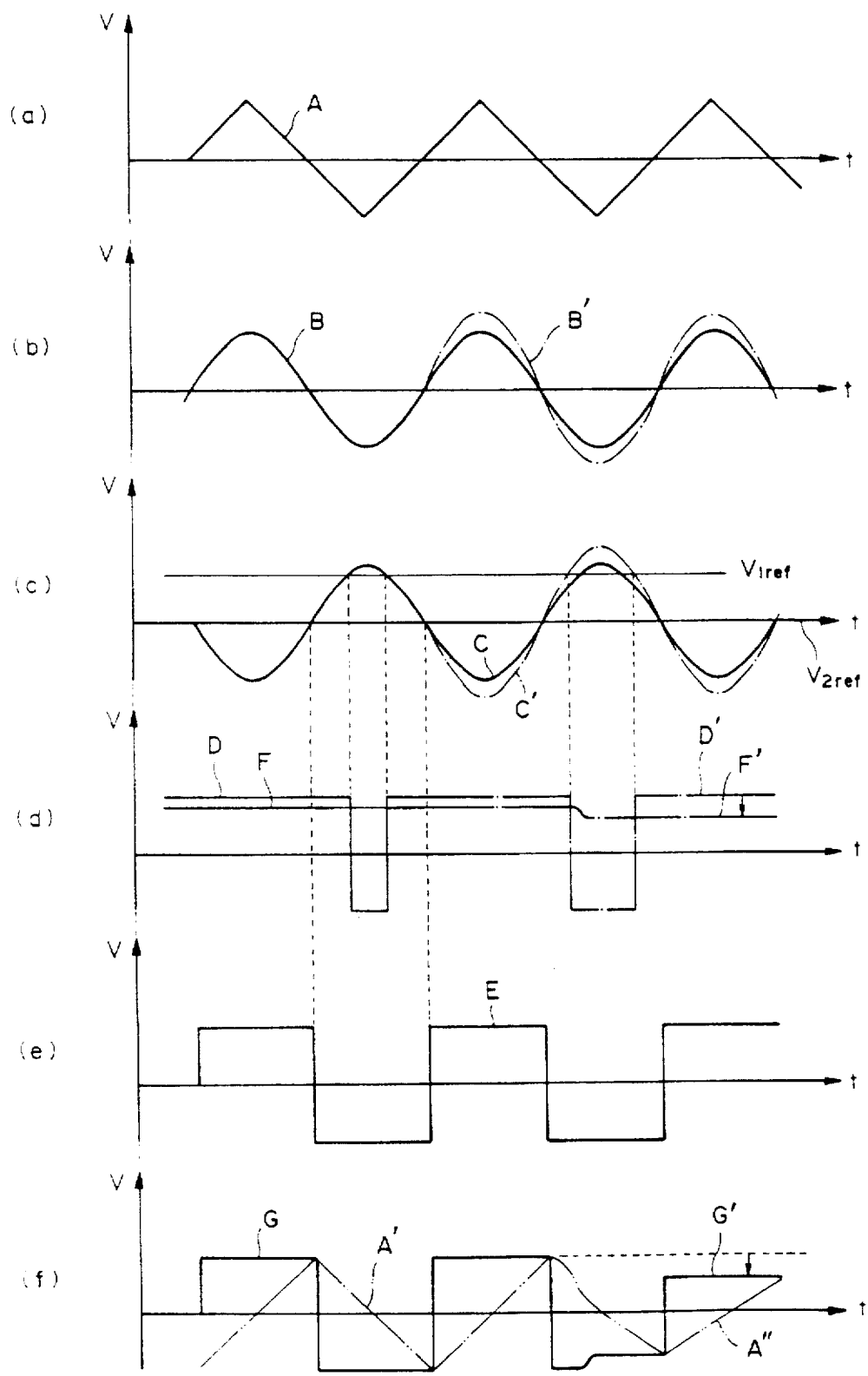
FIGS. 6A and 6B are timing charts for explaining the operation of the circuit in FIG. 5.
Figure 6B:
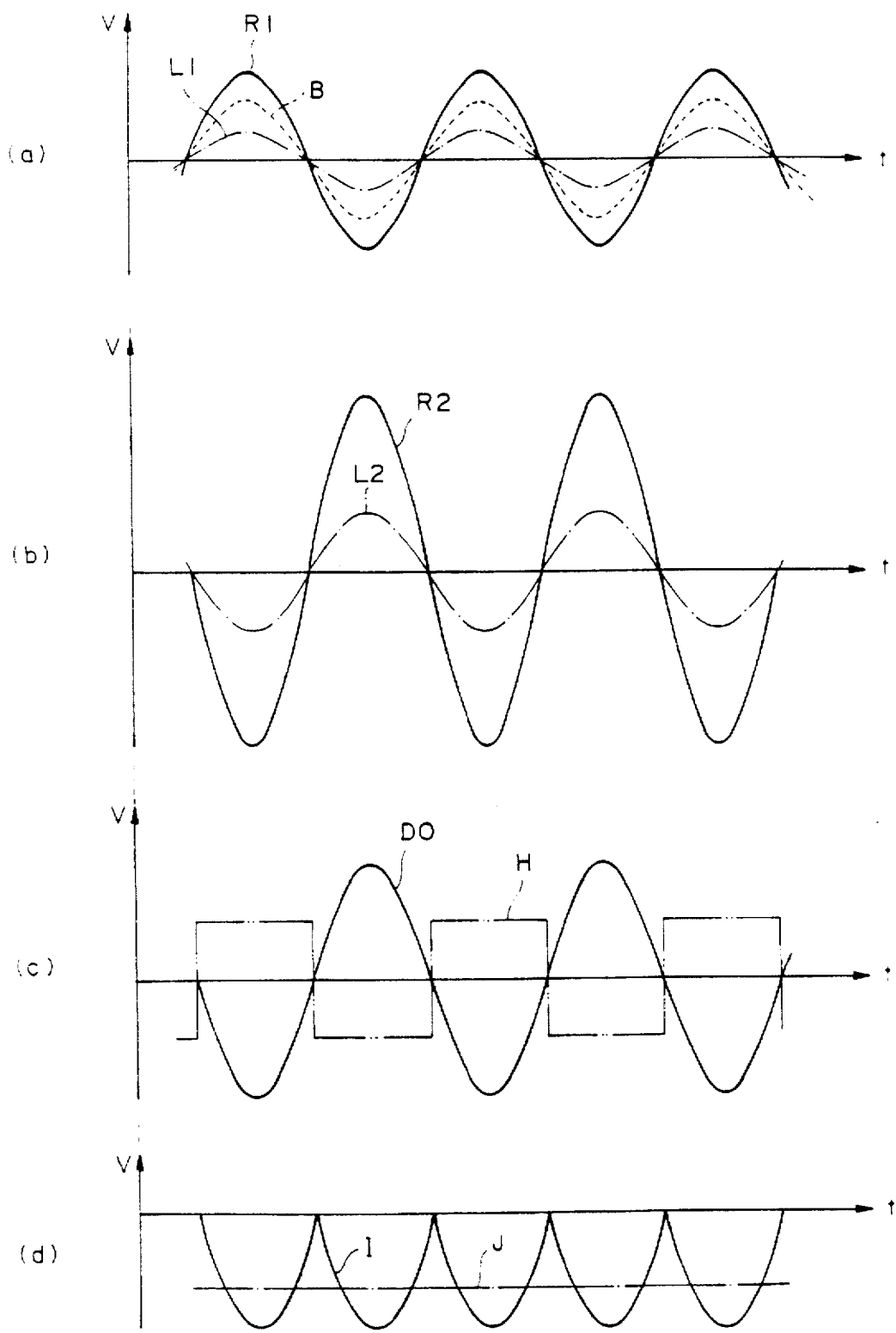

FIG. 5 is a block diagram showing the piezoelectric element in FIG. 1 and a circuit connected thereto. FIGS. 6A and 6B are timing charts for explaining the operation of the circuit in FIG. 5. Voltage waveforms A to J, R1, R2, L1, L2, and DO respectively correspond to the voltage waveforms at points A to J, R1, R2, L1, L2, and DO in FIG. 5. In addition, voltage waveforms A', A", B', C', D', F, and G' in FIGS. 6A and 6B respectively correspond to the voltage waveforms at points A, B, C, D, F, and G in FIG. 5.

An antivibration circuit for the piezoelectric element will be described first.

The second piezoelectric element is used to vibrate the first piezoelectric element. A triangular wave "A" generating circuit 550 applies a triangular wave voltage between the lower-surface electrode 9 of the second piezoelectric element and the ground electrode 6 (see FIG. 6A (a)). The frequency of the triangular wave is about 39 MHz. The frequency of the triangular wave matches the natural oscillation frequency of the piezoelectric element PED1.

When an AC voltage matching the natural oscillation frequency of the piezoelectric element PED1 is applied from the triangular wave generating circuit 550 to the second piezoelectric element, the second piezoelectric element vibrates. Since the first piezoelectric element is fixed to the second piezoelectric element, the first piezoelectric element also vibrates. When the first piezoelectric element vibrates, AC voltages are respectively induced between the ground electrode 6 and the three electrodes 3, 4, and 5 of the first piezoelectric element owing to the piezoelectric effect.

The middle electrode 3 of the first piezoelectric element is used to keep vibration constant. The voltage waveform between the middle electrode 3 and ground is indicated by "B" in FIG. 6A (b).

A preamplifier 551 is connected to the middle electrode 3. The preamplifier 551 inverts the phase of an input voltage signal and outputs the resultant signal. The waveform of the voltage output from the preamplifier 551 is indicated by "C" in FIG. 6A (c).

First and second comparators 552 and 553 are connected to the preamplifier 551.

The first comparator 552 receives both a signal from the preamplifier 551 and a signal from a first reference voltage generating circuit 552a. The level of the first reference voltage is represented by $V_1$ref. If a voltage signal output from the preamplifier 551 is higher than the level $V_1$ref, the first comparator 552 outputs a low-level voltage signal. If a voltage signal output from the preamplifier 551 is lower than the level $V_1$ref, the first comparator 552 outputs a high-level voltage signal. The waveform output of the voltage from the first comparator 552 is indicated by "D" in FIG. 6A (d).

An integrating circuit (level monitor) 554 is connected to the first comparator 552. The integrating circuit 554 integrates an input signal and outputs the resultant signal. A voltage signal output from the first comparator 552 is integrated by the integrating circuit 554, which then outputs a DC voltage F in FIG. 6A (d).

The second comparator 553 receives both a signal from the preamplifier 551 and a signal from a second reference voltage generating circuit 553a. The level of the second reference voltage is represented by $V_2$ref. If a voltage signal output from the preamplifier 551 is higher than the level $V_2$ref, the second comparator 553 outputs a low-level voltage signal. If a voltage signal output from the preamplifier 551 is lower than the level $V_2$ref, the second comparator 553 outputs a high-level voltage signal. The level $V_2$ref is lower than the level $V_1$ref. The level $V_2$ref crosses the operating point of an input AC voltage. The waveform of the voltage output from the second comparator 553 is indicated by "E" in FIG. 6A (e).

Both a voltage signal output from the second comparator 553 and a voltage signal output from the integrating circuit 554 are input to a multiplier (switch) 555. The multiplier 555 multiplies the output voltage from the second comparator 553 and the output voltage from the integrating circuit 554, and outputs the product. The multiplier 555 switches the output voltage from the integrating circuit 554 in synchronism with the output voltage from the second comparator 553. The output from the second comparator 553 is a square wave voltage, and the output from the integrating circuit 554 is a DC voltage. For this reason, the output from the multiplier 555 is a square wave voltage. The waveform of the voltage output from the multiplier 555 is indicated by "G" in FIG. 6A (f).

The triangular wave generating circuit 550 integrates the square wave voltage output from the multiplier 555, and outputs the resultant voltage. The voltage B detected by the middle electrode 3 delays in phase with respect to the voltage A' output from the triangular wave generating circuit 550 by 90°.

Since the piezoelectric element PED1 detects a strain corresponding to an angular velocity as a voltage, the amplitude of vibration may change. Assume that the amplitude of an AC voltage induced by the first piezoelectric element increases, as indicated by "B" and "B'" in FIG. 6A (b). In this case, the amplitude of the output voltage from the preamplifier 551 also increases, as indicated by "C'". Therefore, the time during which the voltage is higher than the level $V_1$ref is prolonged, and the pulse width of the square wave output from the first comparator 552 increases as indicated by "D'". As a result, the level of the DC voltage output from the integrating circuit 554 decreases. The amplitude of the square wave output from the multiplier 555 also decreases. Consequently, the amplitude of the triangular wave output from the triangular wave generating circuit 550 decreases.

As described above, if the amplitude of an AC voltage induced by the first piezoelectric element increases as indicated by "B'", this automatic level control circuit controls the triangular wave generating circuit 550 to decrease this amplitude. If the amplitude of the AC voltage induced by the first piezoelectric element decreases, the automatic level control circuit controls the triangular wave generating circuit 550 to increase this amplitude. The automatic level control circuit comprises the comparators 552 and 553, the integrating circuit 554, the multiplier 555, and the reference voltage generating circuits 552a and 553a.

A rotational angular velocity detection circuit will be described next.

Assume that while the piezoelectric element PED1 is vibrating along the Z-axis direction, the piezoelectric element PED1 rotates about the X-axis. In this case, a Coriolis force acts on the piezoelectric element PED1 in the Y-axis direction, and the piezoelectric element PED1 deflects in the Y-axis direction (lateral direction). At this time, an AC voltage L1 induced between the left electrode 4 and the ground electrode 6 is different in amplitude from an AC voltage R1 induced between the right electrode 5 and the ground electrode 6 (see FIG. 6B). Note that the waveform B in FIG. 6B (a) indicates the waveform of the voltage output from the left and right electrodes 4 and 5 when no Coriolis force acts on the piezoelectric element.

A preamplifier 556 is connected to the left electrode 4 of the first piezoelectric element. A preamplifier 557 is connected to the right electrode 5. The preamplifiers 556 and 557 invert the phases of input voltage signals and amplify them. The amplification factor is, for example, 2.2. The waveform of the voltage output from the preamplifier 556 indicated by "L2" in FIG. 6B (b). The waveform of the voltage output from the preamplifier 557 is indicated by "R2" in FIG. 6B (b).

The signals L2 and R2 output from the preamplifiers 556 and 557 are input to a differential amplifier 558. As shown in FIG. 6B (c), a voltage signal DO representing the difference between the voltage signals L2 and R2 is output from the differential amplifier 558. This difference signal DO corresponds to the Coriolis force acting on the piezoelectric element PED1, i.e., the rotational angular velocity of the piezoelectric element.

The signal output from the differential amplifier 558 is input to a multiplier 559. The multiplier 559 multiplies the voltage signal DO output from the multiplier 555 and a signal H output from the differential amplifier 558 and passing through a phase shifter 562, and outputs the resultant signal. The phase shifter 562 adjusts the phase of a signal G output from the multiplier 555 such that the differential output DO is synchronous with the output G.

As shown in FIG. 6B (d), a voltage signal I output from the multiplier 559 passes through a low-pass filter 560. A DC component J of the signal is output from the low-pass filter 560. The level of the DC voltage J corresponds to the Coriolis force acting on the piezoelectric element PED1, i.e., the rotational angular velocity of the piezoelectric element.

The DC voltage J is amplified by a gain adjustment amplifier 561 and is output from the output terminal 19c.

As described above, a signal corresponding to the angular velocity of rotation about the X-axis is output from the piezoelectric angular velocity meter JY1. The piezoelectric angular velocity meter JY2 has the same structure as that of the meter JY1. A signal corresponding to the angular velocity of rotation about the Y-axis is output from the angular velocity meter JY2.

Figure 7:
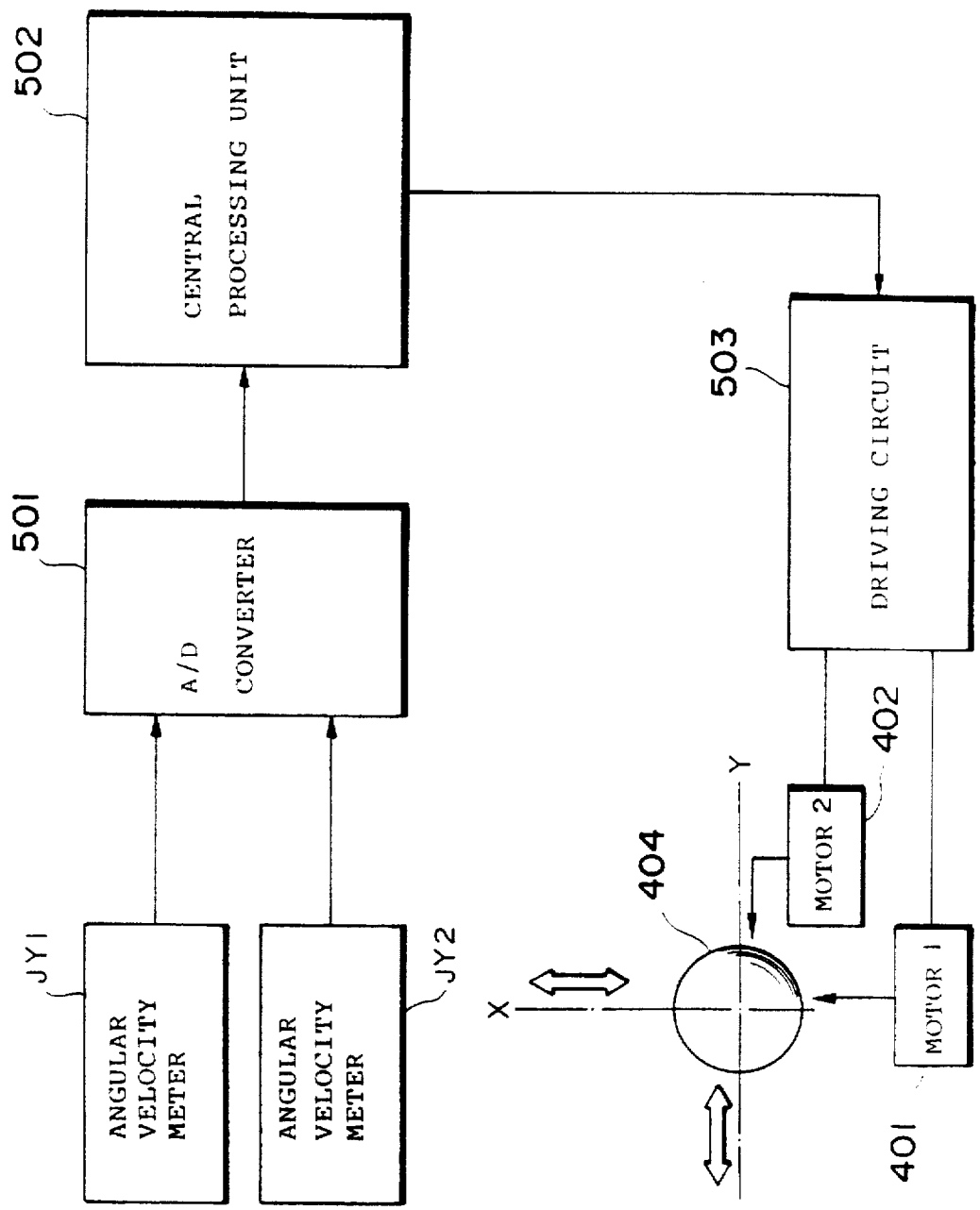
FIG. 7 is a block diagram showing a camera system for moving the lens in accordance with a signal output from the piezoelectric angular velocity meter.

FIG. 7 shows a camera system for moving a lens on the basis of signals output from the piezoelectric angular velocity meters.

The signals output from the angular velocity meters JY1 and JY2 are converted into digital signals by an A/D converter 501. Data output from the A/D converter 501 are input to the central processing unit (CPU) 502. The motors 401 and 402 are driven by a driving circuit 503. The central processing unit 502 controls the driving circuit 503 to rotate the motor 401. The method of controlling the lens 404 through the central processing unit 502 has been described with reference to FIGS. 4A to 4D.

Each piezoelectric angular velocity meter will be described in detail below.

When the above vibrator PED1 causes natural oscillation and rotates about the vibrator axis, a Coriolis force FC is generated in a direction perpendicular to the two directions. This force FC is given by:

$$Fc = 2m[V \cdot \Omega] \quad (1)$$

where m is the mass of the vibrator, v is the vibration speed of the vibrator, and $\Omega$ is the rotational angular velocity.

In a conventional vibration angular velocity meter, problems are posed in manufacturing inexpensive, compact vibrators. More specifically, when the manufacturing process includes the process of joining piezoelectric ceramic plates to metal vibrators, piezoelectric ceramic plates must be joined to vibrator side surfaces one by one. This process needs much time, posing difficulty in realizing mass production. In the process, the workability deteriorates as the size of each vibrator decreases. When electrodes are to be formed on the side surface of cylindrical piezoelectric ceramic member, the electrodes must be formed on vibrators one by one by using a roll type printing machine. In addition, each vibrator must be polarized. Such a process is not suitable for mass production and a reduction in size either.

If electrodes are two-dimensionally formed on a ceramic plate consisting of a piezoelectric or electrostrictive material, compact vibrators can be manufactured in large quantities at once. In consideration of such a technique, there is provided a piezoelectric vibration angular velocity meter having a unimorph structure including a metal or ceramic base member in the form of a quadratic prism, a vibrator constituted by a piezoelectric or electrostrictive member in the form of a quadratic prism, an inner electrode formed between the base member and the piezoelectric or electrostrictive member, and an outer electrode formed on the side surface of the piezoelectric or electrostrictive member which is located on the opposite side to the inner electrode.

Note that the ceramic material includes a glass material, a sintered polycrystalline material, a synthetic single crystal, and the like.

Unimorph vibrators can be manufactured in large quantities by joining a piezoelectric or electrostrictive ceramic or plate having electrode patterns formed on both the surfaces thereof to a metal or ceramic plate having the same size as that thereof, and cutting the resultant structure. In addition, if the electrode patterns are formed by lithography, and the joint plate is cut with a precision cutter, compact unimorph vibrators can be manufactured with good reproducibility.

Nonrestraint fundamental vibration of a unimorph vibrator is excited by using a so-called piezoelectric lateral effect by applying a voltage between an inner electrode as a ground electrode on a piezoelectric or electrostrictive member and the middle electrode of three divided outer electrodes. The vibration, therefore, is caused in a direction perpendicular to the electrode surface. When the vibrator rotates about the axis of the vibrator, the vibrator is bent within the electrode surface owing to the Coriolis force. This bending due to the Coriolis force is detected by the two detection electrodes of the three divided outer electrodes which are located on both sides.

At this time, since piezoelectric signals are generated in the Coriolis force detection electrodes upon driving of the vibrator, actual signals are signals obtained by synthesizing signals originating from the Coriolis force and signals originating from the driving of the vibrator. The signals generated in the two detection electrodes have the same frequency, are opposite in phase with respect to the Coriolis force, and are in phase with respect to the driving operation. If, therefore, differential voltages between the signals are obtained, only signals almost originating from the Coriolis force can be obtained.

Figure 8A:
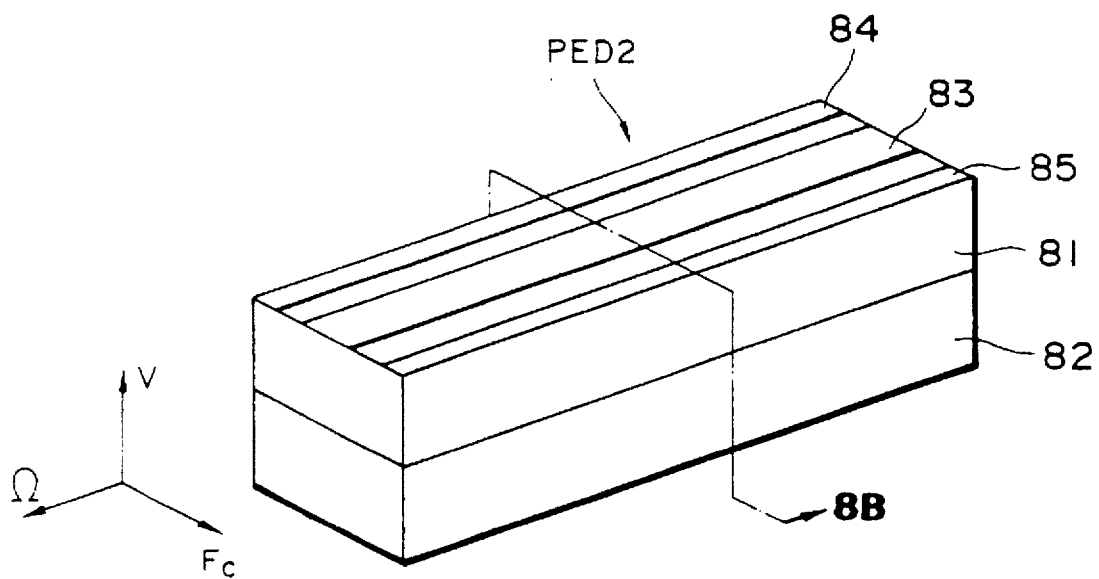
FIG. 8A is a perspective view of the piezoelectric element in FIG. 1.
Figure 8B:
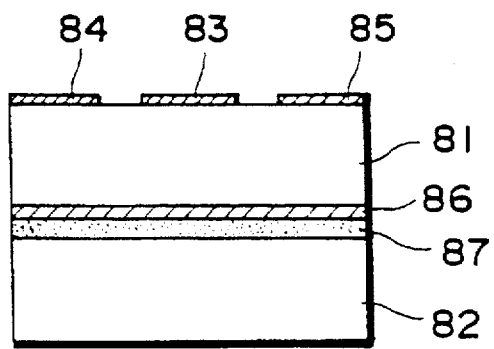
FIG. 8B is a sectional view taken along the direction indicated by an arrow Z in FIG. 8A illustrating the piezoelectric element.

FIGS. 8A and 8B show a vibration angular velocity meter PED2 of the second embodiment. A rectangular parallellepiped member 81 consists of a piezoelectric material. Electrodes 83, 84, 85, and 86 formed on the two opposite surfaces of the upper member 81. The upper member is joined to a lower rectangular parallellepiped member 82 consisting of a silica glass material with an adhesive layer 87 such that the electrode 86 serving as an inner electrodes becomes a joint surface. The electrodes 83, 84, and 85 on the piezoelectric member 81, i.e., the upper surface of the vibrator, are isolated from each other to be symmetrical about the central axis of the vibrator. The middle electrode 83 is used for a driving operation, and the electrodes 84 and 85 on both sides are used for detection. The inner electrode 86 serving as a ground electrode is formed on the entire surface without being divided. The piezoelectric member 81 is polarized in the direction of thickness. A cross-section of the vibrator which is perpendicular to the direction of a vibrator axis $\Omega$ is almost square to match the resonance frequency in the direction of a velocity V of the direction of thickness with the resonance frequency in the direction of the Coriolis force Fc.

Figure 9A:
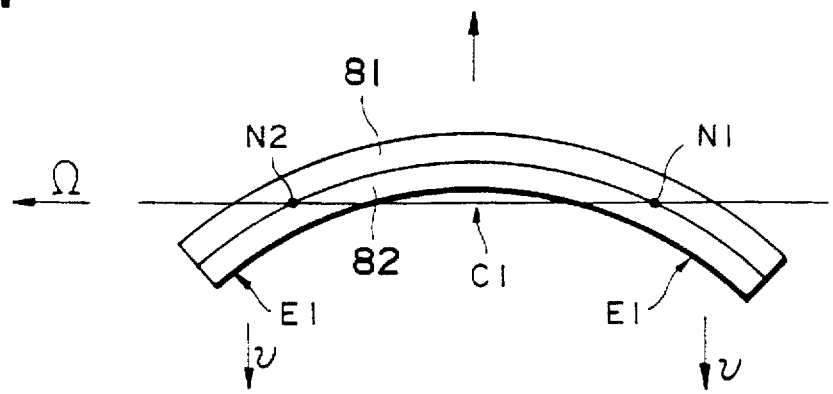
FIGS. 9A to 9C are views for explaining the operation of the piezoelectric element.
Figure 9B:
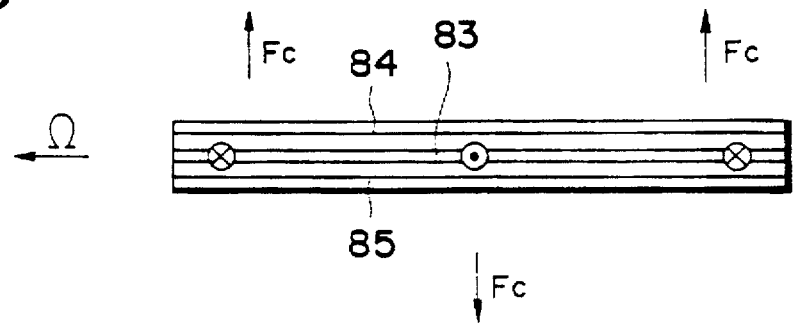
Figure 9C:
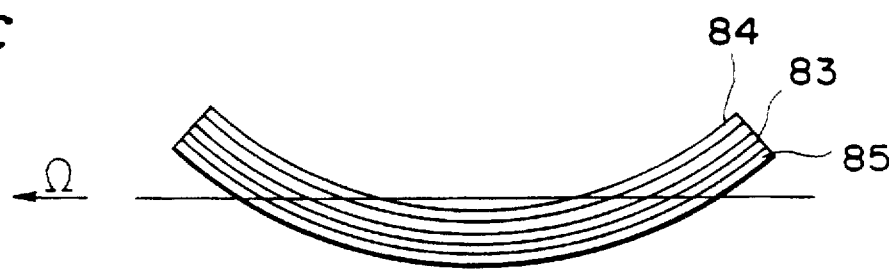

FIGS. 9A to 9C show the operation principle of the piezoelectric vibration angular velocity meter in FIG. 8A. The vibrator in FIG. 8A vibrates under a nonrestraint condition, and the central portion between nodes N1 and N2 of the vibration and the end portions have velocities in opposite directions (see FIG. 9A). When the vibrator rotates about the vibrator axis; $\Omega$, Coriolis forces Fc are exerted on a central portion C1 between the nodes N1 and N2 of the vibration and end portions E1 and E2 in the opposite directions (see FIG. 9B). With these forces Fc, the vibrator is bent in a direction within the electrode surface (within a plane perpendicular to the direction of thickness) (see FIG. 9C). In the two detection electrodes 84 and 85 on both sides, piezoelectric signals originating from the driving/vibration shown in FIG. 19A and piezoelectric signals originating from the deformation due to the Coriolis forces in FIG. 9C are generated at the same time. Of these signals, the piezoelectric signals originating from the Coriolis forces are almost opposite in phase between the two electrodes 84 and 85. This is because in, for example, the deformed state in FIG. 9C, a compression stress acts on the electrode 84 side and, and a tensile stress acts on the electrode 85 side. That is, stresses acting on the two electrodes 84 and 85 always have opposite signs. In contrast to this, the piezoelectric signals originating from the driving operation and generated in the two electrodes 84 and 85 are almost identical. If, therefore, differential signals between the piezoelectric signals in the two electrodes 84 and 85 are obtained, only the piezoelectric signals almost originating from the Coriolis force can be obtained. Since the vibrator has a square cross-section to match the resonance frequency in the Coriolis force direction with the resonance frequency in the driving direction, if outputs from the detection electrodes 84 and 85 are fed back, the vibrator can be driven at a frequency near the resonance frequency by a simple oscillation circuit. Therefore, the vibration based on the Coriolis force is also set in a resonant state to improve the detection sensitivity.

The vibrator, however, need not be designed such that the resonance in the driving direction matches the resonance frequency in the Coriolis force direction. For example, even if a resonant state is not set in a driving operation, unimorph vibration with a large displacement can be used, and resonance in the Coriolis force direction can be used only for detection. For this purpose, the vibrator my be subjected to unimorph driving at the resonance frequency in the Coriolis force direction. With such a vibrator, the resonance matching step can be omitted.

Figure 9D:
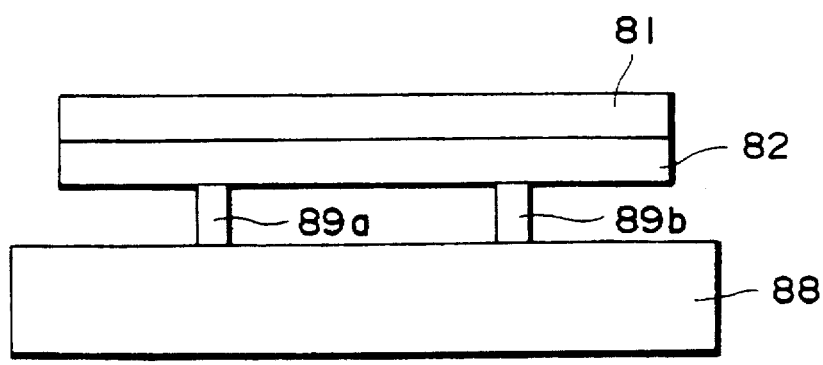
FIG. 9D is a sectional view showing the piezoelectric element fixed to a substrate via support members.

FIG. 9D shows a method of supporting the vibrator to realize the nonrestraint vibration condition of the vibrator in FIG. 8A. Support portions 89a and 89b are fixed to the plate 82 at positions corresponding to the nodes N1 and N2 of vibration with an adhesive, and the support portions 89a and 89b are fixed to a support base 88 with a silicone-based adhesive. The overall vibrator may be simply embedded in an adhesive having a relatively low elastic constant.

Figures 10K, 10L:
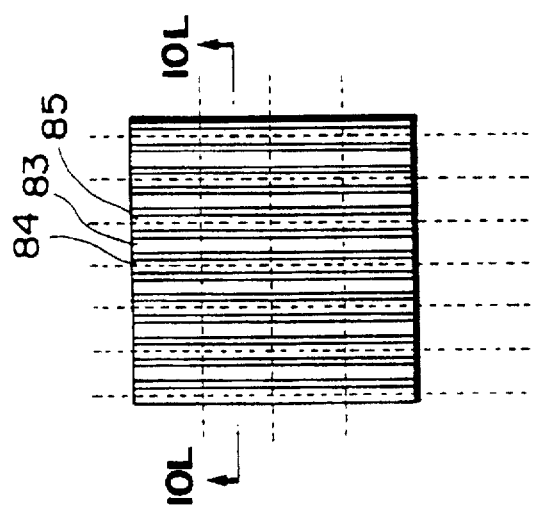
FIG. 10K is a plan view of a piezoelectric element.
FIG. 10L is a sectional view taken along the direction indicated by arrows Z in FIG. 10K illustrating the element.
Figures 10I, 10J:
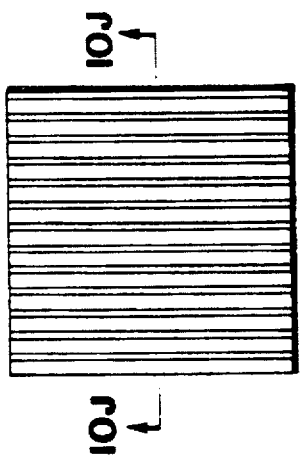
FIG. 10I is a plan view of a piezoelectric element.
FIG. 10J is a sectional view taken along the direction indicated by arrows Z in FIG. 10I illustrating the element.
Figures 10G, 10H:
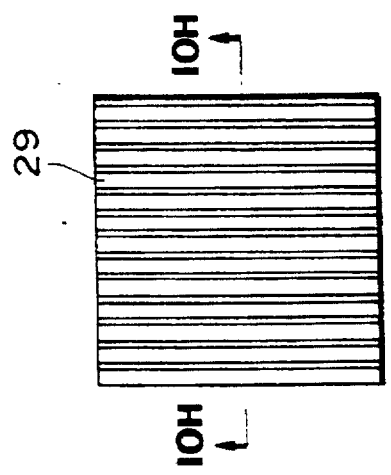
FIG. 10G is a plan view of a piezoelectric element.
FIG. 10H is a sectional view taken along the direction indicated by arrows Z in FIG. 10G illustrating the element.

FIGS. 10A to 10L show a manufacturing process for the piezoelectric vibration angular velocity meter in FIG. 8A. A plate 25 made of a piezoelectric material polarized in the direction of thickness and having silver electrodes 24 and 26 on the upper and lower surfaces is joined to a silica glass plate 27 having a shape similar to the plate 25 with an epoxy-based adhesive layer 28 (see FIGS. 10A and 10B). In order to maintain high positioning precision in the subsequent steps, the peripheral portion of the joint plate is cut with a dicing saw to align the side surfaces of the two plates (FIGS. 10C and 10D). A photoresist film 29 is formed on the surface of one electrode 24, and a resist pattern corresponding to an electrode pattern having electrodes of the same width at equal intervals is formed by an exposure apparatus (FIGS. 10E and 10F). The exposed portions of the silver electrode 24 are removed by reactive ion etching using this resist 29 as a protective mask (FIGS. 10G and 10H). Thereafter, the resist 29 is removed (FIGS. 10I and 10J), and every other electrode of the remaining bar-like electrodes 24 is cut at its middle portion, thereby manufacturing a vibrator having a driving electrode 83 formed in the middle and detection electrodes formed on both sides thereof, which electrodes are symmetrical about the central axis of the vibrator (FIGS. 10K and 10L). According to this process, a large number of compact unimorph piezoelectric vibration angular velocity meters can be manufactured from one joint structure of a piezoelectric plate and a silica glass plate.

An inexpensive, compact piezoelectric vibration angular velocity meter similar to the one described above can be manufactured by using a metal plate as a member constituting a unimorph structure instead of a ceramic material such as silica glass. In this case, the metal member can be used as parts of electrodes and leads.

As described above, according to the present invention, inexpensive, compact vibration angular velocity meters can be provided in large quantities.

Figure 11:
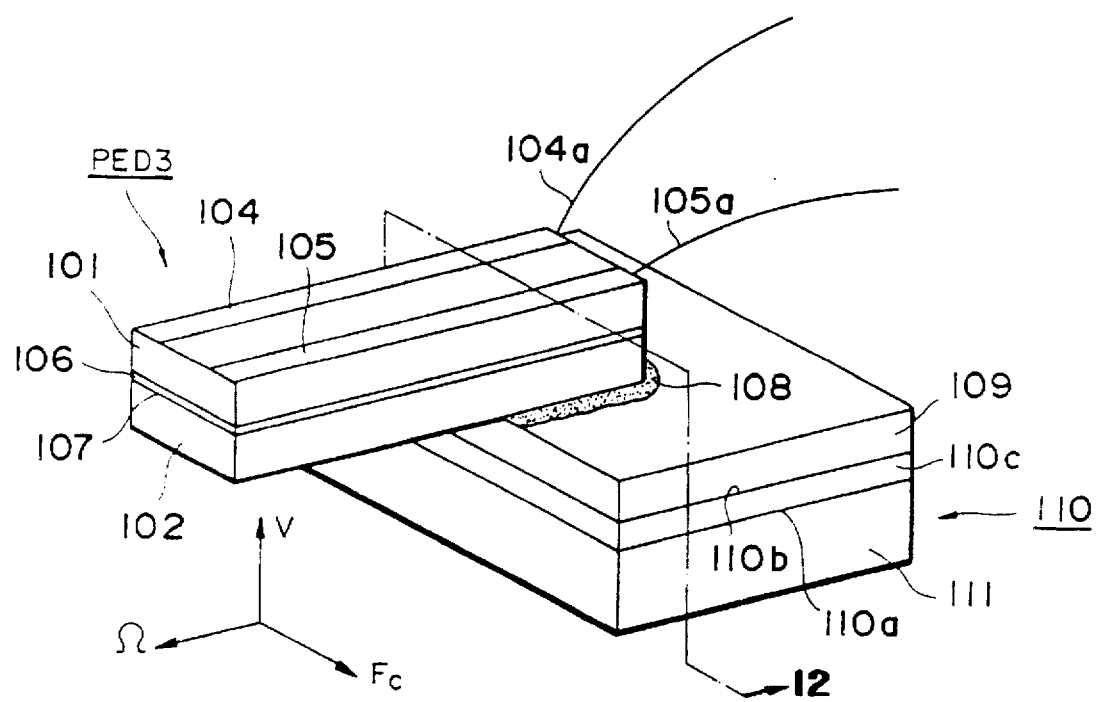
FIG. 11 is a perspective view of a unimorph piezoelectric element.
Figure 12:
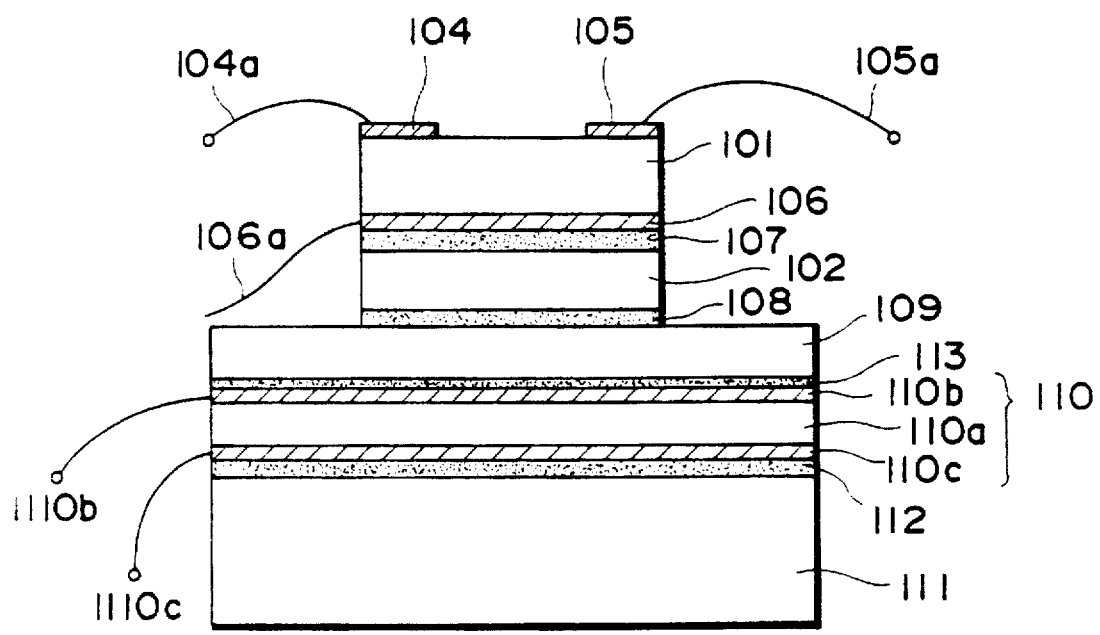
FIG. 12 is a longitudinal sectional view taken along the direction indicated by an arrow Z in FIG. 11 illustrating the piezoelectric element.

FIGS. 11 and 12 show a piezoelectric vibration angular velocity meter according to the third embodiment. A unimorph structure as a vibrator is manufactured by joining a piezoelectric member 101 to a metal member 102 whose thermal expansion coefficient is matched with that of the piezoelectric member 101. Two divided outer electrodes 104 and 105 are formed on a surface of the piezoelectric member 101, and an inner electrode 106 is formed entirely on the opposite surface of the inner electrode 106 to the surface on which the electrodes 104 and 105 are formed. The piezoelectric member 101 is polarized in a direction perpendicular to the electrode surface. The vibrator is joined on a metal plate 109. The metal plate 109 is joined to a plate 110 constituted by a piezoelectric member 110a having electrodes 110b and 110c formed on both surfaces. This plate 110 is fixed to a support base 111. The shape of the vibrator is designed such that the resonance frequencies of an element DEP3 in a normal direction (indicated by "V" in FIG. 11) with respect to the electrode surface become almost the same. Leads 104a and 105a extend from the divided electrodes 104 and 105 on the fixed end portion of the vibrator PED3 to connect the metal member 102 and the metal plate 109 of the vibrator to ground.

An AC voltage having a frequency near the resonance frequency of the fundamental cantilever natural oscillation of the uniform vibrator PED3 is applied to the piezoelectric plate 110 to cause resonant vibration of the vibrator. When the vibration is caused in the direction (indicated by "V" in FIG. 11) perpendicular to the electrode surface to cause rotation (indicated by Ω in FIG. 11) about the axis of the vibrator, the vibrator is bent within the electrode surface owing to the Coriolis force ("Fc" in FIG. 11). Owing to this force, a compression stress is generated on the right side (electrode 105 side) of the vibrator and a tensile force is generated on the left side (electrode 104 side) of the vibrator with respect to the central axis of the vibrator. At this time, piezoelectric signals originating from the Coriolis force, which are obtained from the two divided detection electrodes 104 and 105 because of the piezoelectric lateral effect, have opposite phases. In contrast to this, piezoelectric signals originating from the stresses upon driving of the vibrator and generated in the two divided electrodes are in phase. In general, since a signal generated by a driving operation is larger than a signal generated by a Coriolis force, it is difficult to read the Coriolis force from a signal obtained by synthesizing the two signals. For this reason, the difference between the signals obtained from the two divided electrodes is obtained, and the gain and phase are adjusted, thereby canceling out the piezoelectric signals generated by the driving operation. With this operation, only the signals generated by the Coriolis force can be extracted. Note that the respective members are fixed with adhesive layers 107, 108, 112, and 113. Lead lines 1110b and 1110c are respectively connected to the electrodes 110b and 110c.

Figure 13:
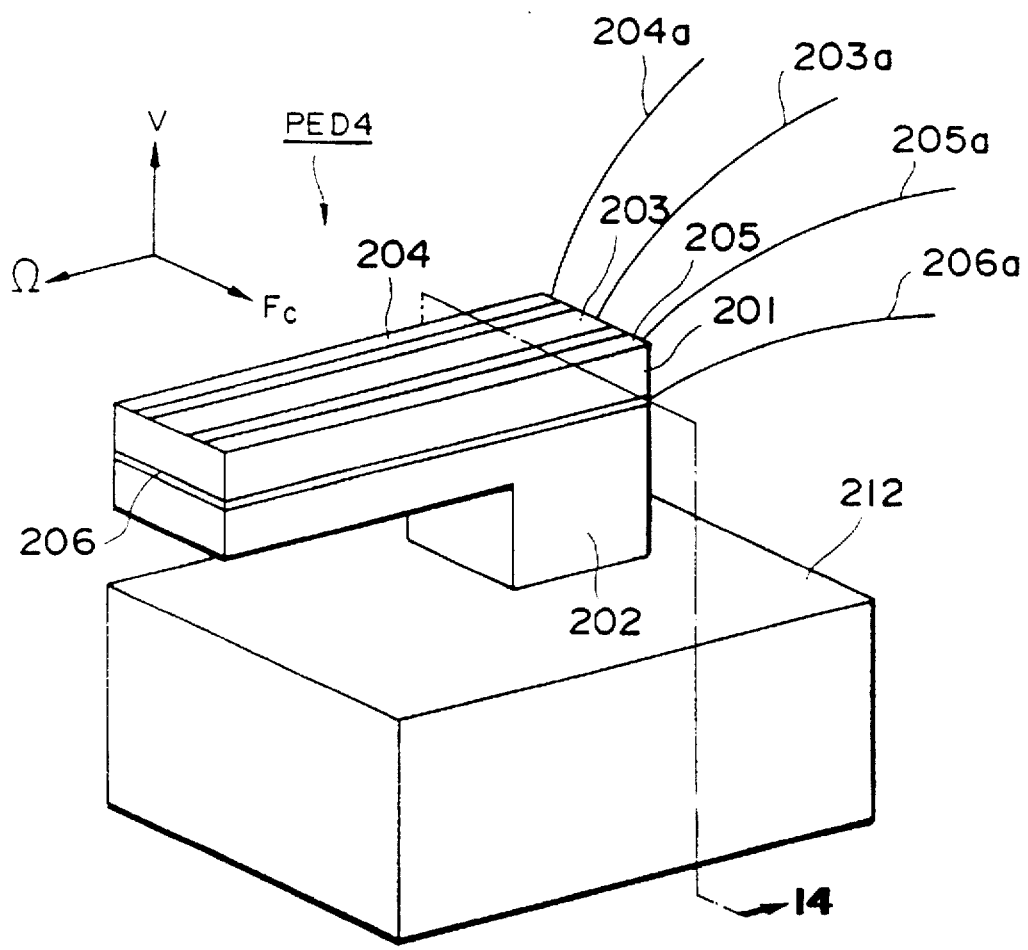
FIG. 13 is a perspective view of a unimorph piezoelectric element.
Figure 14:
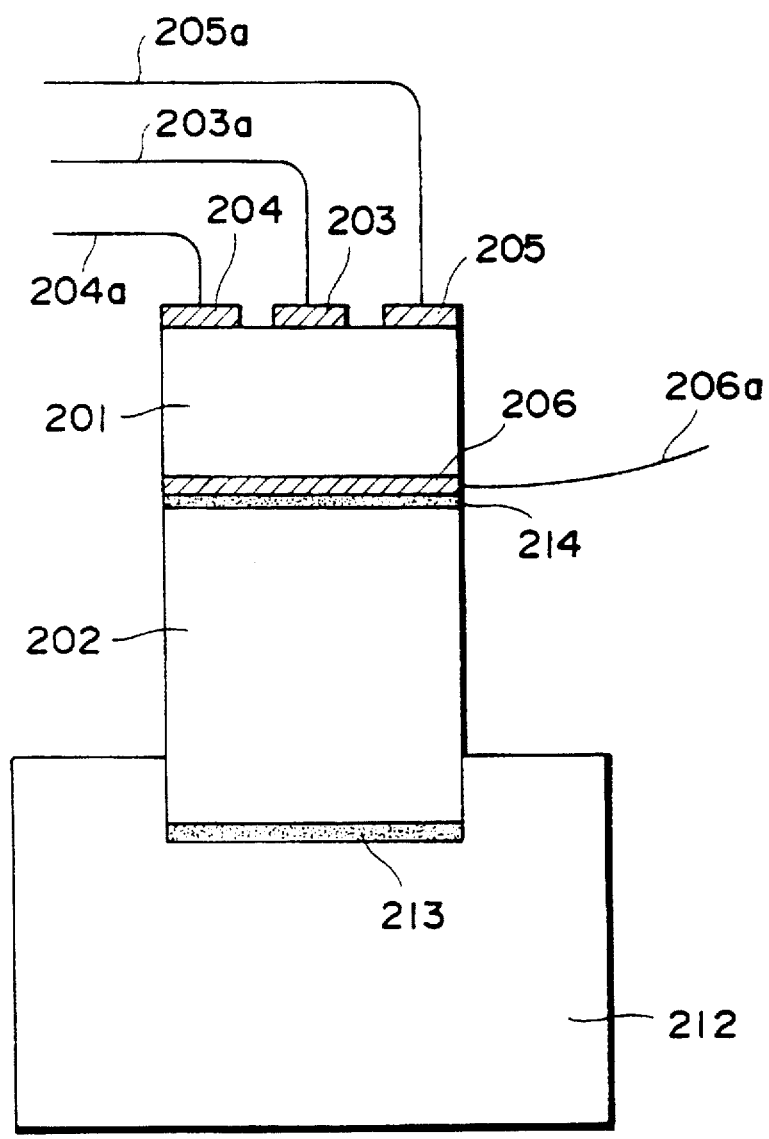
FIG. 14 is a longitudinal sectional view taken along the direction indicated by an arrow Z in FIG. 13 illustrating the piezoelectric element.

FIGS. 13 and 14 show a piezoelectric vibration angular velocity meter PED4 according to the fourth embodiment. Electrodes 203, 204, 205, and 206 are formed on the opposite surfaces of a piezoelectric member 201 constituting the vibrator. The three divided electrodes 203, 204, and 205 serving as outer electrodes are formed with reference to the central axis of the vibrator, and the inner electrode 206 is formed on the entire surface. Polarization is performed in a direction perpendicular to the electrode surface. This piezoelectric member 201 is joined to part of the vibrator made of a free-machining ceramic material and a prop 202 via the inner electrode 206 with an adhesive 214. The prop 202 is also embedded/fixed in/to a support base 212 made of a ceramic material with an adhesive layer 213. Leads 203a, 204a, and 205a respectively extend from the divided electrodes 203, 204, and 205 on the fixed end portion of the vibrator, and a lead 206a also extends from the inner electrode 206. The shape of the vibrator is designed such that the resonance frequency in the normal direction (indicated by "V" in FIG. 13) with respect to the electrode surface is almost equal to that in the Coriolis force direction (indicated by "F" in FIG. 13). The outer electrode 203 in the middle is used for a driving operation. When an AC voltage having a frequency near the resonance frequency of the fundamental natural oscillation of the unimorph vibrator is applied, resonant vibration in the normal direction (indicated by "V" in FIG. 13) with respect to the electrode surface is caused. At this time, when the vibrator rotates about the axis of the vibrator, the vibrator is bent within the electrode surface owing to the Coriolis force ("Fc" in FIG. 13). By obtaining the difference between piezoelectric signals generated in the two electrodes on both the sides of the middle electrode by stresses caused upon this bending, the Coriolis force can be detected by the same method as that described in the third embodiment.

If the vibrator is caused to vibrate under cantilever vibration conditions with one end of the vibrator being fixed, and the other end being set in a nonrestraint state, the vibrator can be easily fixed, and lead lines can be joined to electrode portions on the fixed portion which does not vibrate. Therefore, an almost ideal vibration state can be obtained. This device has a unimorph structure including a rectangular parallelepiped base member consisting of a metal or ceramic material, a vibrator constituted by a parallelepiped piezoelectric or electrostrictive member joined to the base member, an inner electrode formed between the base member and the piezoelectric or electrostrictive member, and outer electrodes on the opposite side surface of the piezoelectric or electrostrictive member to the inner electrode. One end of the vibrator is fixed.

Cantilever vibration allows the vibrator to be easily fixed, and also allows lead lines to be connected to the fixed portion which does not vibrate so that an ideal vibration state can be easily attained. The vibrator is preferably shaped into a quadratic prism, which allows easy formation of a unimorph structure and easy adjustment of the resonance frequency.

By vibrating the piezoelectric or electrostrictive element as an excitation means, fundamental cantilever vibration of the unimorph vibrator can be excited. Vibration is caused in a direction perpendicular to the electrode surface. When the vibrator rotates about the axis of the vibrator, the vibrator is bent within the electrode surface owing to the Coriolis force. Of the signals generated in the two divided outer electrodes, the signals originating from the Coriolis force have opposite phases between the two electrodes, and the signals originating from the driving operation are in phase. If, therefore, the differential signal between the two signals is obtained, only the signals almost originating from the Coriolis force can be obtained.

If three divided outer electrodes are formed on a piezoelectric or electrostrictive member constituting a unimorph structure, the middle electrode is used for excitation to excite fundamental cantilever natural oscillation. If the electrodes on both sides are used for detection, and the differential voltage between the two signals generated in the two electrodes is obtained, signals originating from the Coriolis force can be obtained.

According to the above method, a vibration angular velocity meter having an ideal vibration condition can be easily provided. In addition, inexpensive, compact vibrators can be manufactured in large quantities by forming an electrode pattern on a large ceramic plate by printing, photolithography, or the like, joining a metal or ceramic plate to the ceramic plate, and cutting the resultant structure.

Figure 15:
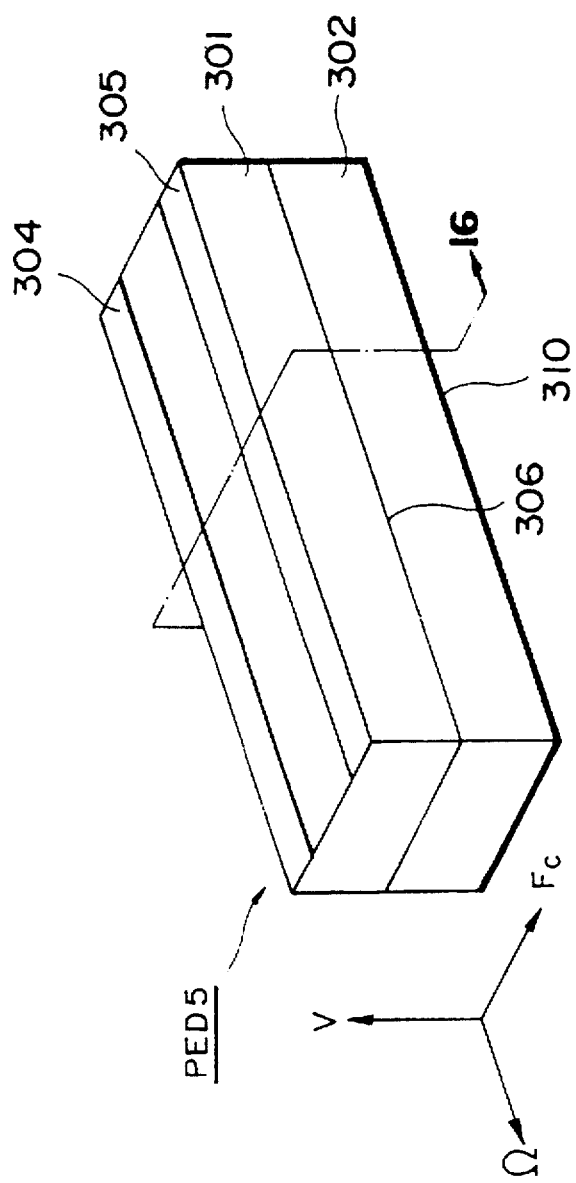
FIG. 15 is a perspective view of a bimorph piezoelectric element.
Figure 16:
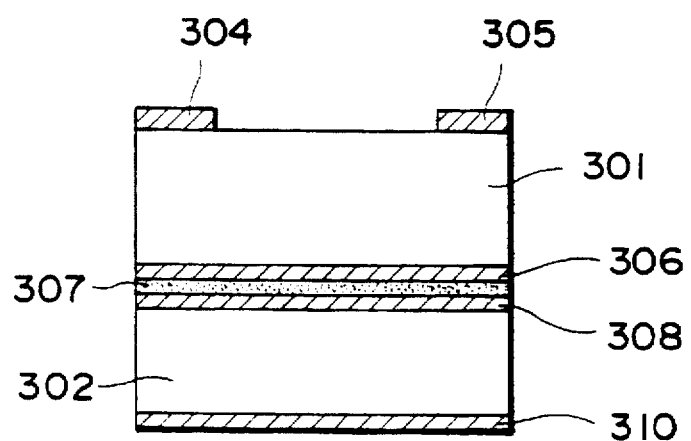
FIG. 16 is a longitudinal sectional view taken along the direction indicated by an arrow Z in FIG. 15 illustrating the piezoelectric element.

FIGS. 15 and 16 show a vibration angular velocity meter PED5 according to the fifth embodiment. Rectangular parallelepiped members 301 and 302 consisting of a piezoelectric material and having electrodes 304, 305, 306, 308, and 310 on the two opposite surfaces of each member are joined to each other by joining the electrode surfaces to each other. The piezoelectric member 301 serving as a detection member has the electrodes 304 and 305 isolated from each other on the upper surface of the vibrator to be symmetrical about the central axis of the vibrator. The piezoelectric member 302 serving as a detection member has both the electrodes 306 and 310 respectively formed on the entire surfaces. Both the piezoelectric members are polarized in a direction perpendicular to the electrodes. A cross-section of the vibrator in a direction perpendicular to the axis of the vibrator has almost a square shape to match the resonance frequency in the driving direction with the resonance frequency in the Coriolis force direction.

Figure 17A:
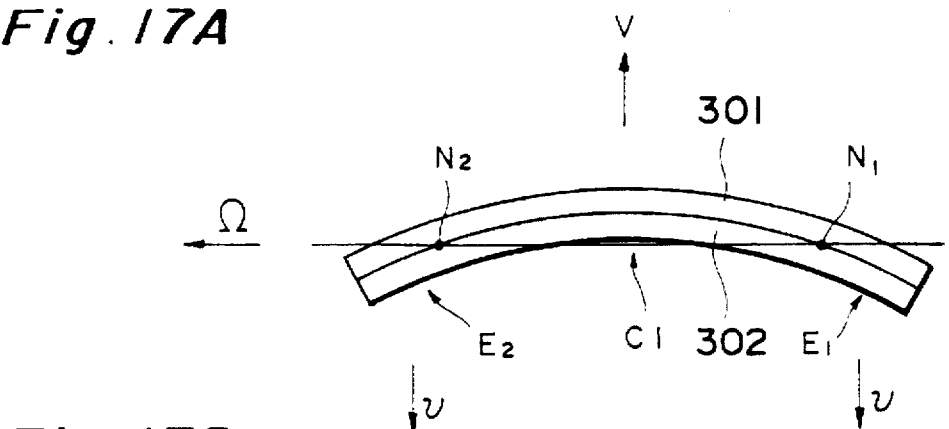
FIGS. 17A top 17C are views for explaining the operation of the piezoelectric element in FIG. 15.
Figure 17B:
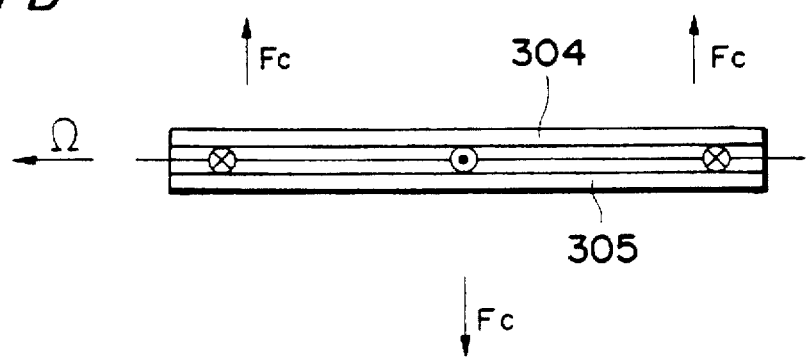
FIG. 17D is a sectional view showing the piezoelectric element fixed to a substrate via support members.
Figure 17C:
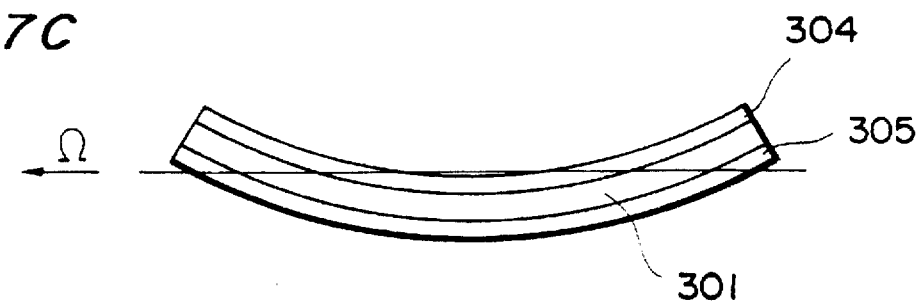

FIGS. 17A to 17C show the operation principle of the vibration angular velocity meter PED5 in FIG. 16. The vibrator vibrates under a nonrestraint condition, and a central portion C1 and end portions E1 and E2 of the vibrator have velocities in opposite directions with respect to nodes N1 and N2 of vibrator as boundaries (FIG. 17A). At this time, when the vibrator rotates about an axis Ω of the vibrator, since the central portion C1 and the end portions E1 and E2 have velocities in the opposite directions, Coriolis forces are generated in the opposite directions with respect to the nodes N1 and N2 of vibration as boundaries (FIG. 17B). Owing to these Coriolis forces, the vibrator is bent in a direction within the electrode surface (FIG. 17C). In the two divided detection electrodes 304 and 305, piezoelectric signals (FIG. 17C) originating from the driving operation (FIG. 17A), and piezoelectric signals originating from deformation caused by the Coriolis forces are generated at the same time. Of these signals, the piezoelectric signals originating from the Coriolis forces and generated in the two electrodes 304 and 305 have almost opposite phases. This is because, in the deformation state shown in FIG. 17C, for example, a compression stress acts on the electrode 304 side, and a tensile stress acts on the electrode 305 side, and stresses acting on the two electrodes always have opposite signs. In contrast to this, the piezoelectric signals originating from the driving operation and generated in the two electrodes 304 and 305 are almost in phase. Therefore, only the piezoelectric signals almost originating from the Coriolis forces can be obtained by obtaining differential signals from the two electrodes 304 and 305.

Figure 17D:
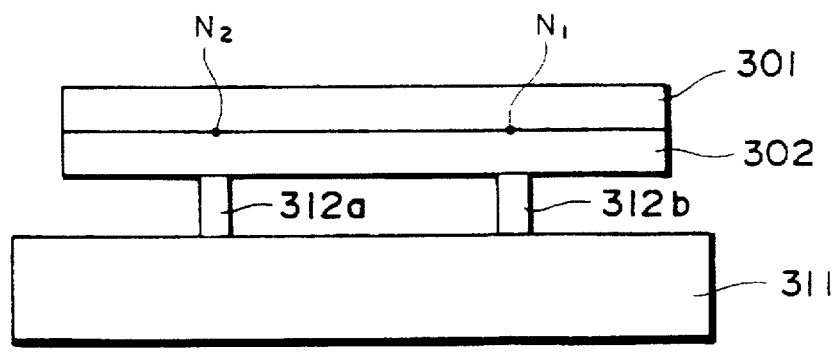

FIG. 17D shows a vibrator supporting method for realizing a nonrestraint condition for the vibrator PED5 in FIG. 16. Support members 312a and 312b are fixed to the member 302 at positions corresponding to the nodes N1 and N2 of vibration, and are fixed to a support base 311 with a silicone-based adhesive. The overall vibrator may be simply embedded in an adhesive having a relatively low elastic constant.

Figure 18A:
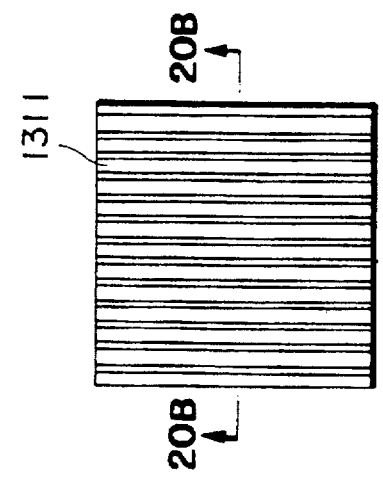
FIG. 18A is a plan view of a piezoelectric element.

FIGS. 18A to 23B show a manufacturing process for the piezoelectric vibration angular velocity meter in FIG. 16. A first piezoelectric plate is constituted by a piezoelectric crystal plate 1301 and electrodes 1304 and 1306 formed on the upper and lower surfaces of the piezoelectric crystal plate 1301. A second piezoelectric plate is constituted by a piezoelectric crystal plate 1302 and electrodes 1308 and 1310 formed on the upper and lower surfaces of the piezoelectric crystal plate 1302. These plates are bonded to each other with an adhesive layer 1307 as of epoxy resin (FIGS. 18A and 18B). Note that the piezoelectric crystal plates 1301 and 1302 are polarized in the direction of thickness of the electrode 1304.

Figure 19A:
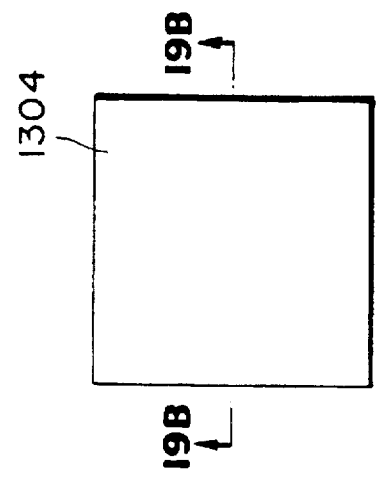
FIG. 19A is a plan view of a piezoelectric element.
Figure 19B:
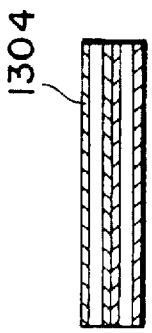
FIG. 19B is a sectional view taken along the direction indicated by arrows Z in FIG. 19A illustrating the element.

In order to maintain high positioning precision in the subsequent steps, the peripheral portion of the joint plate constituted by the these plates is cut in the direction of thickness with a dicing saw to align the side surfaces of the two plates (FIGS. 19A and 19B).

Figure 20A:
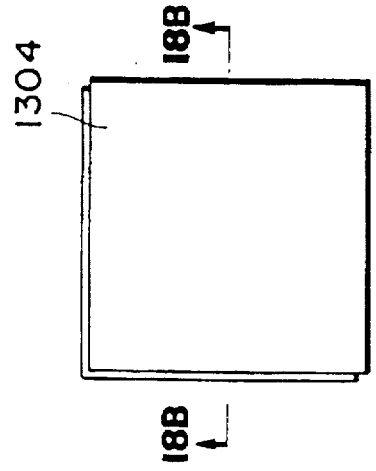
FIG. 20A is a plan view of a piezoelectric element.
Figure 18B:
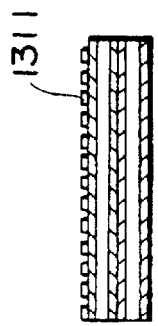
FIG. 18B is a sectional view taken along the direction indicated by arrows Z in FIG. 18A illustrating the element.
Figure 20B:
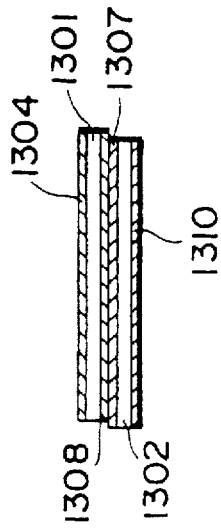
FIG. 20B is a sectional view taken along the direction indicated by arrows Z in FIG. 20A illustrating the element.

A photoresist 1311 is coated on the electrode 1304. Predetermined areas of the photoresist 1311 are exposed by using an exposure apparatus. The photoresist 1311 is exposed such that exposed areas having the same width are arranged at equal intervals. The non-exposed areas of the photoresist 1311 are etched to form a resist pattern corresponding to an electrode pattern (FIGS. 20A and 20B).

This resist 1311 is used as a protective mask. The exposed portions of the silver electrode 1304 are removed by using the reactive ion etching (RIE) method (FIGS. 21A and 21B). Thereafter, the resist 1311 is removed (FIGS. 22A and 22B). As a result, a plurality of strip-like silver electrodes 1304 are exposed. The joint plate is then cut along a direction perpendicular to the longitudinal direction of the strip-like silver electrodes 1304 with a dicing saw. In addition, the joint plate is cut along the central line in the longitudinal direction of the silver electrodes 1304 with the dicing saw (FIGS. 23A and 23B). As a result, the piezoelectric element shown in FIG. 15 is formed. According to this process, compact bimorph piezoelectric vibration angular velocity meters can be manufactured in large quantities from one pair of piezoelectric plates.

Figure 24:
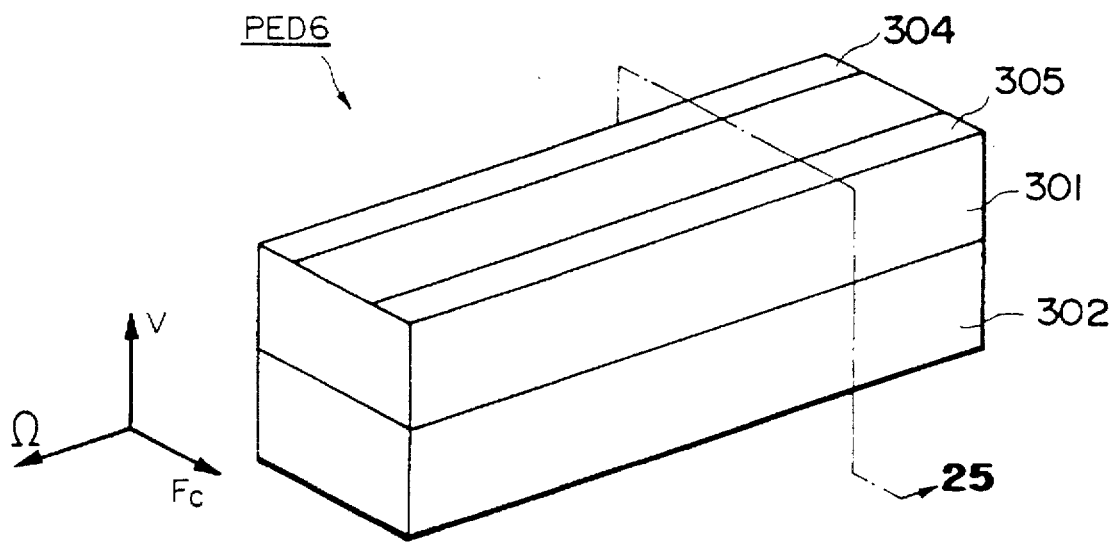
FIG. 24 is a perspective view of a piezoelectric element.
Figure 25:
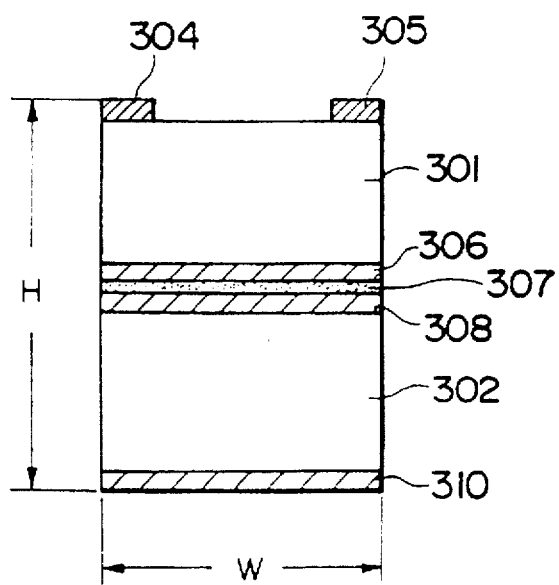
FIG. 25 is a longitudinal sectional view taken along the direction indicated by an arrow Z in FIG. 24 illustrating the piezoelectric element.

FIG. 24 shows a vibration angular velocity meter PED6 according to the sixth embodiment. This element basically has the same structure as that of the element shown in FIG. 15. A cross-section of the vibrator PED6 in a direction perpendicular to the longitudinal direction has a width W, in a direction along the surface of an electrode 304, which is smaller than a side height H in a direction perpendicular to the surface of the electrode 304. The driving and detection principles of this element are basically the same as those described with reference to FIGS. 17A to 17C. Since the width W in a Coriolis force direction Fc is smaller than the height H, the nonrestraint vibration fundamental resonance frequency in the Coriolis force direction Fc is lower than that in a driving direction V.

When an AC voltage having a frequency near the nonrestraint vibration fundamental resonance frequency in the Coriolis force direction is applied to a driving piezoelectric member 302 via driving elements 308 and 310, vibration is excited in the direction V. The vibration caused at this time causes no resonance because the frequency of the applied AC voltage is lower than the vibration fundamental basic resonance frequency. However, since the element PED6 has a bimorph structure, a sufficiently large amplitude can be obtained by applying a proper voltage. Detection outer electrodes 304 and 305 are separated from the central axis of the vibrator PED6 to maintain the balance of vibration and prevent coupling of vibration caused by the driving operation in the Coriolis force direction.

When the vibrator rotates about the axis of the vibrator PED6, Coriolis forces are generated. Since the frequency of an AC voltage used for a driving operation is equal to the vibration fundamental resonance frequency in the Coriolis force direction, a resonant state is set once the vibrator is bent by the Coriolis forces. As a result, an amplitude of a quality factor multiple (sever 10 to several 1,000 times) of vibration of a static amplitude obtained by piezoelectric strain can be obtained.

Coriolis force signals are detected by the divided electrodes. This detection principle is the same as that in the first embodiment.

If electrodes are two-dimensionally formed on a ceramic plate consisting of a piezoelectric or electrostrictive material, compact vibrators can be manufactured in large quantities at once. In consideration of such a technique, there is provided a piezoelectric vibration angular velocity meter comprising a vibrator having a bimorph structure constituted by a first member made of a piezoelectric or electrostrictive material in the form of a quadratic prism and a second member made of a piezoelectric or electrostrictive material in the form of a quadratic prism, an inner electrode formed between the first and second members, and outer electrodes formed on the opposite surfaces of the first and second members to the inner electrode.

Bimorph vibrators can be manufactured in large quantities at once by joining two piezoelectric or electrostrictive plates respectively having electrode patterns formed on upper and lower surfaces and having the same size, and cutting the resultant structure. In addition, if the electrode patterns are formed by reactive etching, and the joint ceramic plate is cut with a precision cutter, compact bimorph vibrators can be manufactured with good reproducibility.

Nonrestraint fundamental vibration of a bimorph vibrator is excited by using a so-called piezoelectric lateral effect by applying a voltage between an inner electrode in the bimorph shape as a ground electrode and the outer electrode on the driving piezoelectric or electrostrictive member. The vibration, therefore, is caused in a direction perpendicular to the electrode surface. When the vibrator rotates about the axis of the vibrator, the vibrator is bent within the electrode surface owing to the Coriolis forces. This bending due to the Coriolis forces is detected by the detection piezoelectric or electrostrictive member.

According to the above arrangement, since a piezoelectric signal is generated in the Coriolis force detection element upon driving of the vibrator, detection of the Coriolis forces imposes a heavy load on an electrical system in practice. For this reason, the outer electrode on the detection piezoelectric or electrostrictive member is divided into two electrodes with reference to the central line of the vibrator in the axial direction. Signals generated in the two electrodes have the same frequency and opposite phases with respect to the Coriolis forces and are in phase with respect to the driving operation. If, therefore, the differential voltages between these signals are obtained, only the signals almost originating from the Coriolis forces can be obtained.

If a cross-section of the vibrator is square, and the resonance frequencies in the Coriolis force direction and the driving direction can be matched with each other, the vibrator can be driven at a frequency near the resonance frequency with a simple oscillation circuit by feeding back outputs from the detection electrodes. Therefore, the vibration based on the Coriolis forces is set in a resonant state, and the detection sensitivity improves.

In order to omit the cumbersome process of matching resonance frequencies, the vibrator has a rectangular cross-section to intentionally shift the resonance frequencies in the two directions. With this operation, a bimorph driving operation which allows a large amplitude without driving the vibrator in a resonant state can be realized, and the frequency of the AC voltage for this driving operation is used as the resonance frequency of the fundamental vibration in the Coriolis force direction. In addition, if the vibrator is driven at a frequency higher than the fundamental resonance frequency in a bimorph driving operation, vibration cannot be stably caused because of, e.g., coupling with a high-order mode. For this reason, the vibrator has a rectangular cross-section shorter in the electrode surface direction than in the other direction.

As a method of fixing the vibrator, a method of fixing the vibrator at positions corresponding to the nodes of nonrestraint fundamental vibration is most simple and hence preferable.

According to the above method of the present invention, inexpensive, compact vibration angular velocity meters can be provided in large quantities.

Figure 26:
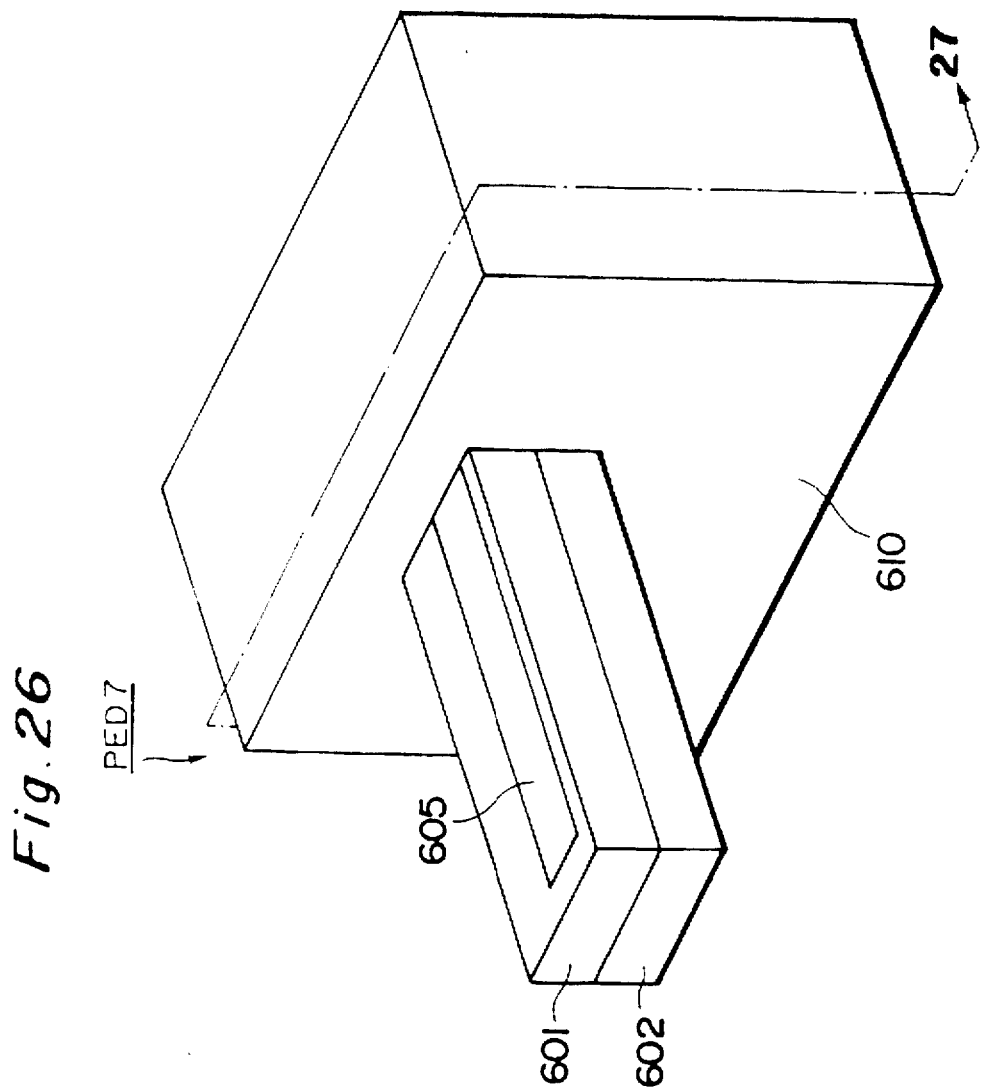
FIG. 26 is a perspective view of a bimorph piezoelectric element.
Figure 27:
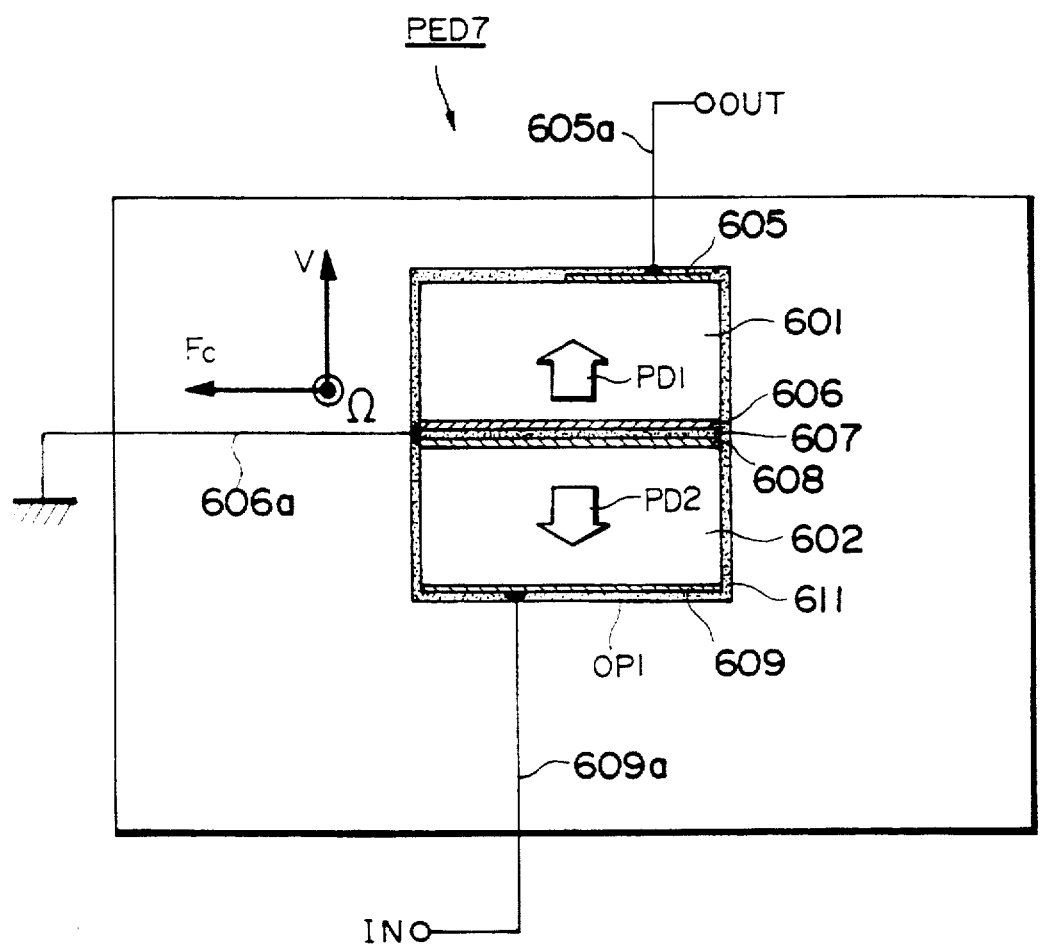
FIG. 27 is a sectional view taken along the direction indicated by an arrow Z in FIG. 26 illustrating the element.

FIGS. 26 and 27 show a piezoelectric vibration angular velocity meter PED7 according to the seventh embodiment.

This element includes rectangular parallelepiped members 601 and 602 made of a piezoelectric material. Electrodes 605 and 606 are respectively formed on the upper and lower surfaces of the rectangular parallelepiped member 601. Electrodes 608 and 609 are respectively formed on the upper and lower surfaces of the rectangular parallelepiped member 602. These rectangular parallelepiped members are fixed to each other with an adhesive layer 607. The electrode 605 on the upper surface is used to detect the strain amount of the element based on Coriolis forces. The central line of the upper-surface electrode 605 in the longitudinal direction is parallel to the central line of the upper surface of the rectangular parallelepiped member 601 in the longitudinal direction but does not overlap it.

A support portion 610 has a hole (cavity) OP1 in its center. In this hole OP1, the piezoelectric element is constituted by the rectangular parallelepiped members 601 and 602, the electrodes 606, 608, and 609, and the adhesive layer 607. One end portion of the piezoelectric element is fitted in the hole OP1 of the support portion 610. The size of the opening of this hole OP1 is almost equal to the area of a cross-section of the piezoelectric element in a direction perpendicular to the longitudinal direction. Although the piezoelectric element and the support portion 610 are fixed to each other with an adhesive layer 611, they may be fixed to each other with a screw.

A lead line 606a is electrically connected to the electrodes 606 and 608. This lead line 606a is in contact with the inner surface of the hole OP1 of the support portion 610 as well as the electrodes 606 and 608. A lead line 605a is electrically connected to the electrode 605. This lead line 605a is in contact with the inner surface of the hole OP1 of the support portion 610 as well as the electrode 605. A lead line 609a is electrically connected to the electrode 609. The lead line 609a is in contact with the inner surface of the hole OP1 of the support portion 610 as well as the electrode 609.

FIG. 27 is a sectional view taken along a direction perpendicular to the axial direction of the vibrator of the vibration angular velocity meter in FIG. 26. A cross-section of the vibrator is almost square, and the resonance frequencies in the vibrator driving direction (indicated by "V" in FIG. 27) and the Coriolis force direction (indicated by "Fc" in FIG. 27) are almost the same. The driving piezoelectric member 602 and the detection piezoelectric member 601 are respectively polarized in the directions indicated by arrows PD2 and PD1 in FIG. 27. The electrodes 606 and 608 between the two members 601 and 602 are used as ground electrodes commonly used for driving and detecting operations. When an AC voltage having a frequency near the fundamental resonance frequency of cantilever vibration is applied to the driving piezoelectric member 602, the member 602 tries to expand/contract in accordance with the applied AC voltage owing to the piezoelectric lateral effect. At this time, since no driving voltage is applied to the detection piezoelectric member 601, no force acts on the member to change its length. However, the vibrator obtained by joining the two piezoelectric members becomes a so-called unimorph structure, and resonance of the vibrator is excited in the direction indicated by "V" in FIG. 27.

In this case, when the vibrator rotates about the vibrator axis, a Coriolis force is generated in the direction indicated by "Fc" in FIG. 27, so that the vibrator is bent in a direction perpendicular to both the vibrator direction and the axial direction of the vibrator. Since the resonance frequency in the Coriolis force direction is set to be equal to that in the driving direction, the magnitude of the Coriolis force, i.e., the rotational angular velocity, can be obtained according to equation (1) by detecting a voltage generated in the electrode of the detection piezoelectric member owing to the piezoelectric lateral effect upon this bending. When the Coriolis force indicated by "Fc" in FIG. 27 acts on the vibrator, a compression stress and a tensile stress respectively act on the left and right sides of the vibrator with respect to the central axis of the vibrator. In this case, if the detection electrode is symmetrically arranged with respect to the central axis of the vibrator, piezoelectric signals based on the compression stress and the tensile stress have opposite phases and hence almost cancel out each other, resulting in low sensitivity. For this reason, as shown in FIG. 27, the detection electrode 605 is shifted from the central axis of the vibrator to allow extraction of only a piezoelectric signal based on a compression or tensile stress upon one bending operation. In this case, a piezoelectric signal based on a stress accompanying a driving operation is also generated in the detection electrode. The signal accompanying the Coriolis force has the same frequency as that of the driving AC voltage. A signal obtained by synthesizing the above two signals is obtained from the detection electrode.

Figure 28:
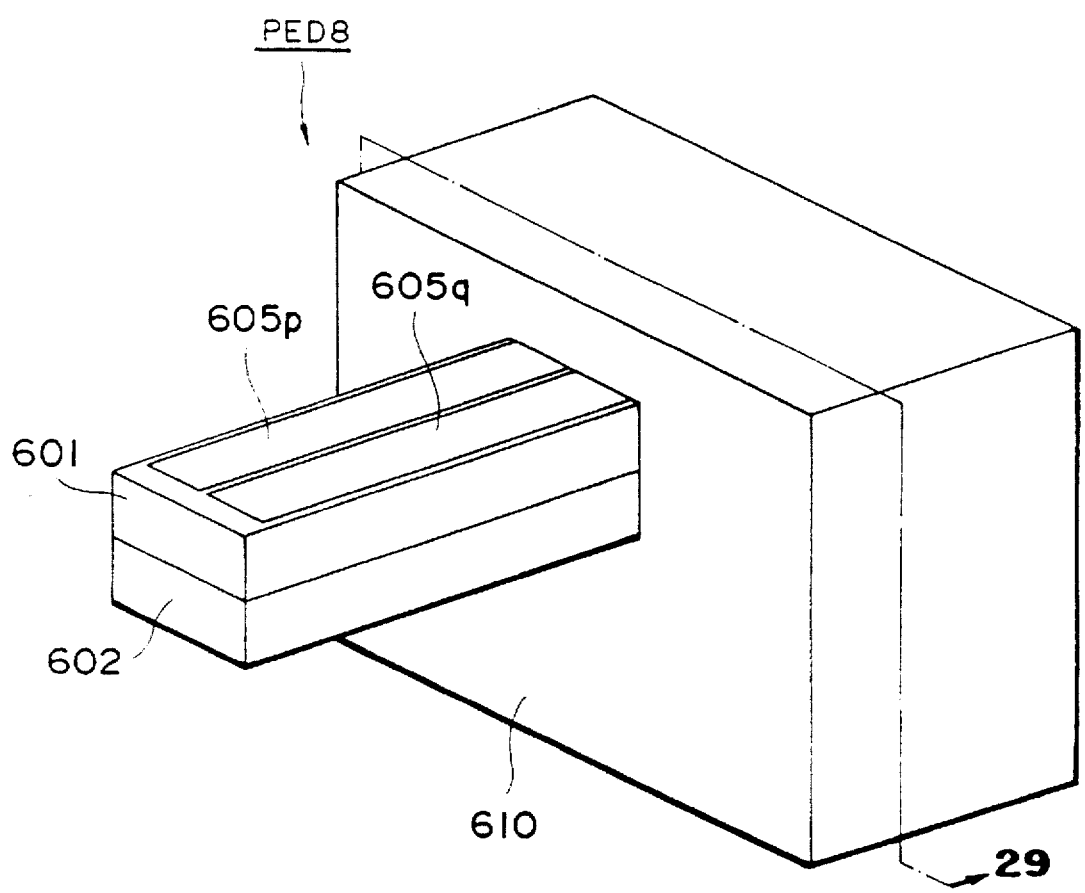
FIG. 28 is a perspective view of a bimorph piezoelectric element.

FIG. 28 shows the basic arrangement of a piezoelectric vibration angular velocity meter PED8 having a bimorph vibrator according to the eighth embodiment. This vibration angular velocity meter basically has the same mechanism as that shown in FIGS. 26 and 27 except that the detection electrode formed on the upper surface of the detection piezoelectric member is divided into two electrodes (605p and 605q) in the axial direction of the vibrator.

Figure 29:
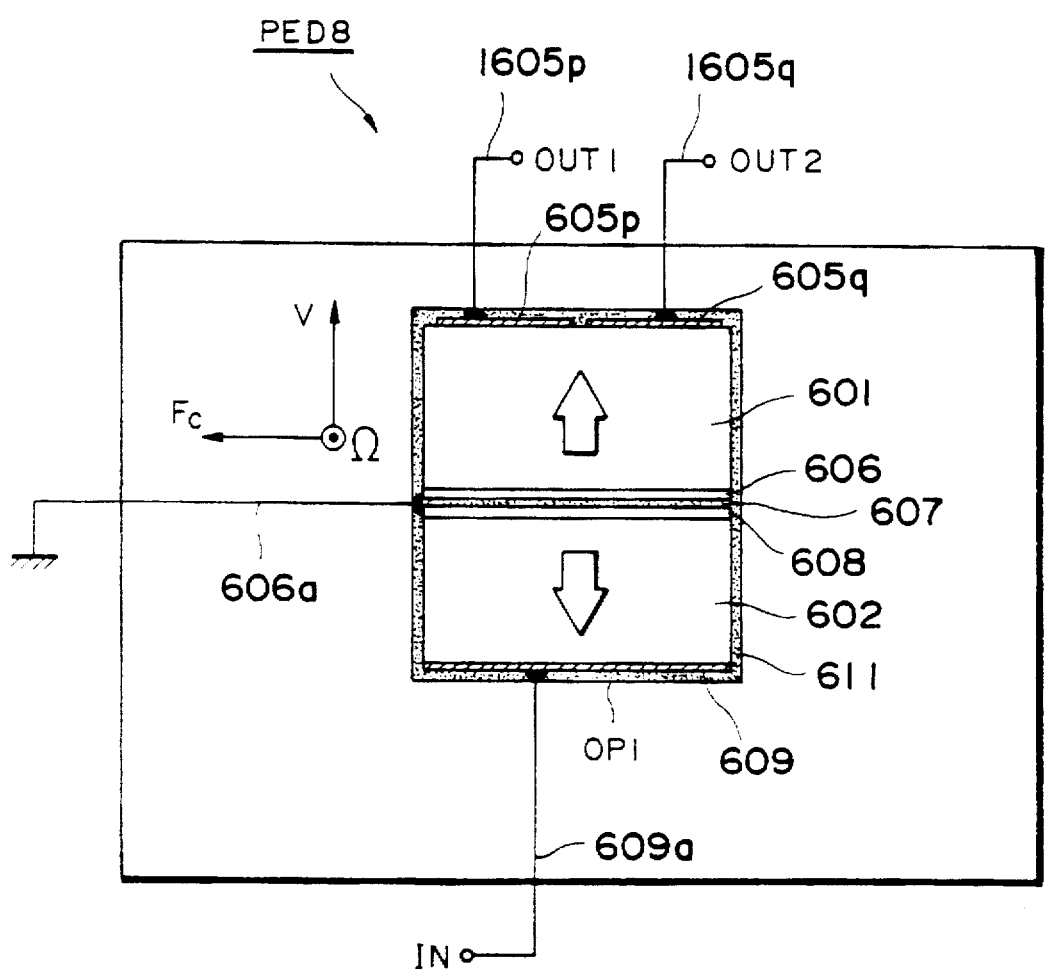
FIG. 29 is a sectional view taken along the direction indicated by an arrow Z in FIG. 28 illustrating the element.

FIG. 29 is a sectional view taken along a direction perpendicular to the axis of the vibrator of the vibration angular velocity meter in FIG. 28. A cross-section of the vibrator has a shorter side in the electrode direction than in a direction perpendicular thereto. The driving and detection principles are basically the same as those described with reference to FIG. 27. However, the cantilever vibration fundamental resonance frequency in the Coriolis force direction indicated by "Fc" in FIG. 29 is lower than that in the driving direction indicated by "V" in FIG. 29 because the length of the vibrator in the Coriolis force direction is smaller than that in the driving direction.

When an AC voltage having a frequency near the cantilever vibration fundamental resonance frequency in the Coriolis force direction is applied to a driving piezoelectric member 602 via a driving electrode 609, vibration is excited in the direction indicated by "V" in FIG. 29. The vibration caused at this time does not become resonant vibration because the frequency of the applied AC voltage is lower than the cantilever vibration fundamental resonance frequency in the driving direction. However, since the vibrator has a unimorph structure, a sufficiently large amplitude can be provided by applying an appropriate voltage to the driving piezoelectric member 602.

When the vibrator rotates about the axis of the vibrator, a Coriolis force is generated. Since the frequency of the AC voltage used for a driving operation is equal to the cantilever vibration fundamental resonance frequency in the Coriolis force direction, a resonant state occurs once the vibrator is bent by the Coriolis force. As a result, an amplitude of a quality factor multiple (several 10 to several 1,000 times) of vibration of a static amplitude obtained by piezoelectric strain can be obtained.

A signal based on a Coriolis force is detected by the divided electrodes. When the Coriolis force indicated by "Fc" in FIG. 29 acts on the vibrator, a compression stress and a tensile stress respectively act on the left and right sides of the vibrator with respect to the central axis of the vibrator in FIG. 29. Piezoelectric signals obtained from the two divided electrodes therefore have the same frequency and opposite phases. Since a signal based on a stress accompanying a driving operation of the vibrator is larger than a signal based on a Coriolis force, it is difficult to detect the Coriolis force from a signal obtained by synthesizing the two signals. For this reason, the difference (OUT1–OUT2) between signals obtained from the two divided electrodes 605p and 605q is detected via leads 1605p and 1605q, and gain and phase adjustment is performed, and the piezoelectric signals based on the driving operation are canceled out, thereby extracting only the signal based on the Coriolis force.

Figure 30:
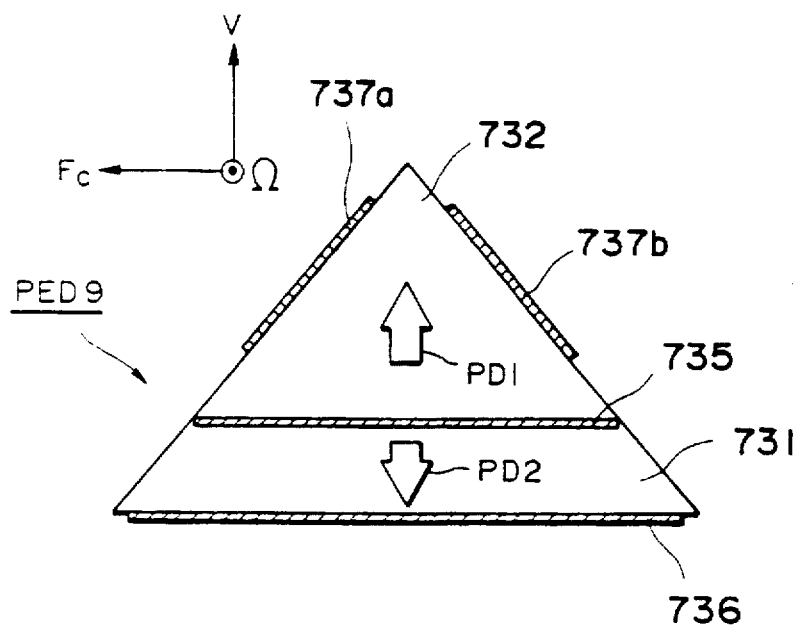
FIG. 30 is a perspective view of a bimorph piezoelectric element.
Figure 31:
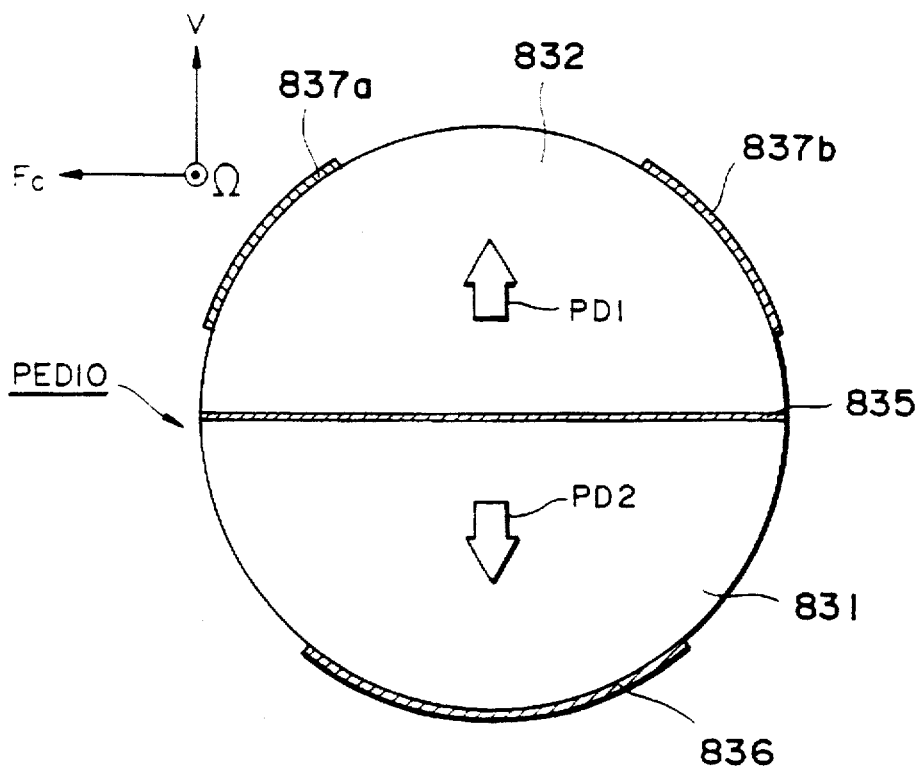
FIG. 31 is a perspective view of a bimorph piezoelectric element.

Each embodiment described above has exemplified the angular velocity meter using the vibrator in the form of a quadratic prism. However, as shown in FIGS. 30 and 31 each illustrating a vibrator viewed from the axial direction of the vibrator, even if a vibrator is in the shape of a triangular prism or column, the operation principle of the vibration angular velocity meters having the bimorph vibrators of the seventh and eighth embodiments can be used. In either structure, the driving piezoelectric member and the detection piezoelectric member are joined to each other via the ground electrode, and the detection electrode is divided into two electrodes.

FIG. 30 shows a piezoelectric vibration angular velocity meter PED9 according to the ninth embodiment. This element includes a first member 732 consisting of a piezoelectric crystal and having three surfaces, and first, second, and third electrodes 737a, 737b, and 735 respectively formed on the three surfaces.

This element also includes a second member 731 consisting of a piezoelectric crystal and having two parallel surfaces. The second member 731 is fixed to the third electrode 735 via one of these two surfaces. A fourth electrode 736 is formed on the surface of one of the two surfaces of the second member 731. These piezoelectric members are respectively polarized in the directions indicated by arrows PD1 and PD2. The directions indicated by the arrows PD1 and PD2 are perpendicular to the surface of the electrode 735.

An AC voltage is applied between the electrodes 735 and 736. By obtaining the difference between a voltage signal output across the electrodes 737a and 735 and a voltage signal output across the electrodes 737b and 375, the strain amount of this element can be detected, and hence the angular velocity can be detected.

FIG. 31 shows a piezoelectric vibration angular velocity meter PED10 according to the 10th embodiment. This element includes a first member 832 consisting of a piezoelectric crystal and having a semicircular cross-section and a second member 831 consisting of a piezoelectric crystal and having a semicircular cross-section. The second member 831 is fixed to the first member 832. The cross-sections of the first and second members 832 and 831 constitute a circle. An electrode 835 is interposed between these members.

An AC voltage is applied between the electrode 835 and an electrode 836. By obtaining the difference between a voltage signal output across an electrode 837a and the electrode 835 and a voltage signal output across an electrode 837b and the electrode 835, the strain amount of this element can be detected, and hence the angular velocity can be detected.

If a columnar vibrator is vibrated under cantilever vibration conditions with one end of the vibrator being fixed, and the other end being set in a nonrestraint state, the vibrator can be easily fixed, and lead lines can be joined to electrode portions on the fixed portion which does not vibrate. Therefore, an almost ideal vibration state can be obtained. The present invention is based on such an idea.

According to the present invention, there is provided a piezoelectric vibration angular velocity meter comprising a columnar vibrator partly or completely made of a piezoelectric or electrostrictive member, an excitation means for exciting the vibrator, and a detection means for detecting a Coriolis force generated in the vibrator, wherein one end of the vibrator is fixed.

In addition, the vibrator of the piezoelectric vibration angular velocity meter of the present invention has a unimorph or bimorph structure. That is, there is provided a piezoelectric vibration angular velocity meter comprising a base member made of a metal or ceramic material in the form of a quadratic prism, and a vibrator made of a piezoelectric or electrostrictive material in the form of a quadratic prism and joined to the base member, or a vibrator constituted by a first member made of a piezoelectric or electrostrictive material in the form of a quadratic prism and a second member made of a piezoelectric or electrostrictive material in the form of a quadratic prism.

Cantilever vibration allows the vibrator to be easily fixed, and also allows lead lines to be connected to the fixed portion which does not vibrate so that an ideal vibration state can be easily attained.

The vibrator preferably has the shape of a quadratic prism, triangular prism, or column because it allows easy adjustment of resonance frequencies and easy formation of the vibrator.

Driving (excitation) of the vibrator and detection of a Coriolis force are performed by using the piezoelectric or electrostrictive effect.

In forming a vibrator by using a piezoelectric or electrostrictive ceramic material, a material in the form of a quadratic prism, e.g., a plate-like material, is preferably used because it facilitates polarization.

When a unimorph vibrator is to be used, a piezoelectric or electrostrictive element as an excitation means is arranged near the vibrator (on the vibrator or the support portion for fixing the vibrator), and a voltage is applied to the element to excite fundamental cantilever vibration of the unimorph vibrator.

When a bimorph vibrator is to be used, an inner electrode is used as a ground electrode, and a voltage is applied between the inner electrode and an outer electrode on a piezoelectric or electrostrictive member for a driving operation, i.e., excitation. With this operation, fundamental cantilever vibration of the bimorph vibrator is excited by using a so-called piezoelectric lateral effect.

In either the unimorph structure or the bimorph structure, vibration is caused in a direction perpendicular to the electrode surface. When the vibrator rotates about the axis of the vibrator, the vibrator is bent within the electrode surface owing to Coriolis forces. Of the signals generated in the two divided outer electrodes for detection, the signals originating from the Coriolis forces have opposite phases, but the signals originating from the driving operation are in phase. If, therefore, the differential signal between the two signals is obtained, only the signal almost originating from the Coriolis force can be obtained.

If the outer electrode on a piezoelectric or electrostrictive member is divided into three electrodes, the middle electrode is used for excitation to execute fundamental cantilever natural oscillation. If the electrodes on the two sides of the middle electrode are used for detection, and the differential voltage between the voltages generated in the two electrodes is obtained, a signal originating from a Coriolis force can be obtained.

If the vibrator has a square cross-section, and the resonance frequencies in the Coriolis force direction and the driving direction can be matched with each other, the vibrator can be driven at a frequency near the resonance frequency with a simple oscillation circuit by feeding back outputs from detection electrodes. Vibration based on a Coriolis force is set in a resonant state to improve the detection sensitivity.

In order to omit the cumbersome process of matching resonance frequencies, the vibrator has a rectangular cross-section to intentionally shift the resonance frequencies in the two directions. With this operation, a bimorph driving operation which allows a large amplitude without driving the vibrator in a resonant state can be realized, and the frequency of the AC voltage for this driving operation is used as the resonance frequency of the fundamental vibration in the Coriolis force direction. In addition, if the vibrator is driven at a frequency higher than the fundamental resonance frequency in a bimorph driving operation, vibration cannot be stably caused because of, e.g., coupling with a high-order mode. For this reason, the vibrator preferably has a rectangular cross-section shorter in the coriolis force direction than in the other direction.

In joining two piezoelectric or electrostrictive ceramic plates to each other, a metal plate as a so-called shim member can be inserted between the two plates to increase the displacement amount of the bimorph structure.

As described above, according to the present invention, a vibration angular velocity meter having an ideal vibration state can be easily provided.

In addition, inexpensive, compact vibrators can be manufactured in large quantities by forming a plurality of electrode patterns on a large ceramic plate by a printing technique, photolithography, or the like, joining a metal or ceramic plate thereto, and cutting the resultant structure.

As has been described above, the piezoelectric vibration angular velocity meter of the present invention includes a columnar unimorph or bimorph vibrator made of a piezoelectric or electrostrictive member, an excitation electrode for exciting the vibrator, and a detection electrode for detecting a Coriolis force generated in the vibrator. In the meter, an ideal vibration state can be attained by fixing one end of the vibrator.

The above-mentioned vibrational angular velocity meter is used as a vibrational angular velocity meter used for navigation systems and attitude control systems in aircraft, ship, automobile, and the like as well as for sensing manual blurring and vibration in still camera and video camera. The vibrational angular velocity meter is a kind of gyroscope which utilizes a dynamical phenomenon that, when a rotational angular velocity is supplied to a vibrating object, Coriolis force is generated in a direction perpendicular to the direction of vibration. In the following, the vibrator used in the vibrational angular velocity meter and the method of making thereof will be further explained.

Before explaining the vibrational angular velocity meters in accordance with the following embodiments, the principle of the vibrational angular velocity meter will be explained with reference to FIGS. 48 to 51.

Figure 48:
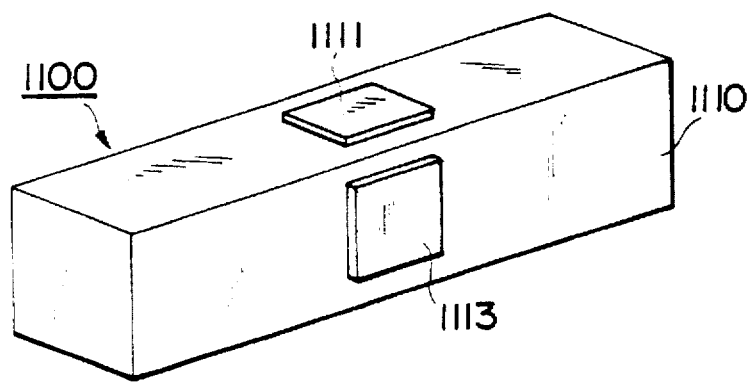
FIG. 48 is a perspective view of a vibrator of a comparative example.
Figure 49:
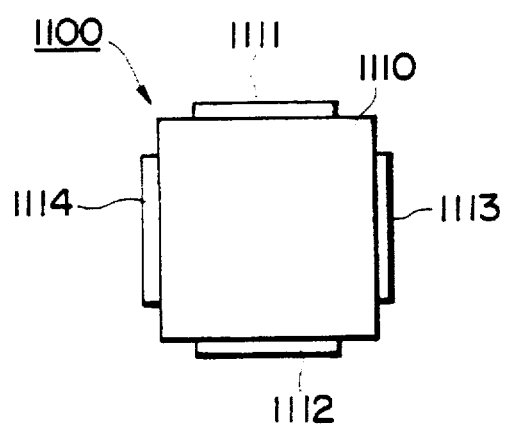
FIG. 49 is a front view of the vibrator shown in FIG. 48.

FIGS. 48 and 49 are views showing a vibrator 1100 of a comparative example. Namely, FIG. 48 is a perspective view thereof, whereas FIG. 49 is a front view observed from its longitudinal direction. In this vibrator 1100, a square pole member 1110 having a square cross section is made of an elinvar alloy whose elastic coefficient changes little with respect to change in temperature. Attached to the respective side surfaces of the square pole member 1100 are plates 1111, 1112, 1113, and 1114 each made of a piezoelectric material such as PZT (lead zirconate titanate) having silver paste electrodes (not depicted) formed on both sides thereof. Vibration voltages are applied to the PZT plates 1111 and 1112. As these PZT plates 1111 and 1112 vibrate due to an inverse piezoelectric effect of thus applied voltages, the square pole 1110 is subjected to a simple harmonic oscillation so as to have an amplitude in the vertical direction in FIG. 49. When the square pole member 1110 is rotated with a certain angular velocity around an axis which is in parallel to the longitudinal direction thereof while being subjected to this simple harmonic oscillation, Coriolis force is generated in the horizontal direction in FIG. 49. Due to this Coriolis force, the square pole member 1110 vibrates so as to have an amplitude in the horizontal direction in FIG. 49. Upon this vibration, voltages are generated at the PZT plates 1113 and 1114 due to a positive piezoelectric effect. When the differential between these voltages are detected, a signal which is in proportion to the magnitude of the angular velocity caused by the Coriolis force can be obtained.

Figure 50:
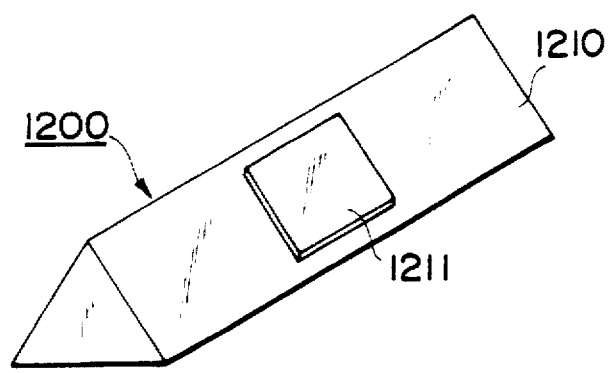
FIG. 50 is a perspective view of a vibrator of another comparative example.
Figure 51:
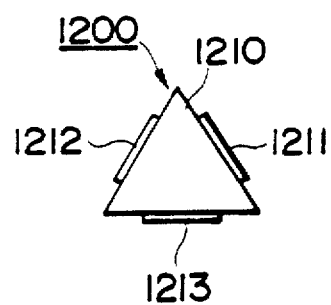
FIG. 51 is a front view of the vibrator shown in FIG. 50.

FIGS. 50 and 51 are views showing another conventional vibrator 1200. Namely, FIG. 50 is a perspective view thereof, whereas FIG. 51 is a front view observed from its longitudinal direction. This vibrator 1200 is a variation of the vibrator 1100 shown in FIGS. 48 and 49. In this vibrator 1200, to the respective side surfaces of a triangle pole member 1210 having a triangular cross section made of an elinvar alloy, PZT plates 1211, 1212, and 1213 similar to the PZT plates 1111, 1112, 1113, and 1114 shown in FIG. 49 are attached. A vibration voltage is applied to the PZT plate 1213. As this PZT plate 1213 vibrates due to an inverse piezoelectric effect of thus applied voltage, the triangle pole 1210 is subjected to a simple harmonic oscillation so as to have an amplitude in the vertical direction in FIG. 51. Though the PZT plates 1211 and 1212 are used for sensing Coriolis force like the PZT plates 1113 and 1114 in FIG. 49, since they are not disposed in a direction perpendicular to the direction of Coriolis force, they sense the direction cosine component of the Coriolis force.

These vibrators 1110 and 1200 respectively use the members 1110 and 1210 each made of an elinvar alloy. This elinvar alloy is an alloy mainly composed of iron, nickel, and chromium. This alloy is not easily processed, while an accuracy in size is necessary for the processing of its form when used as a vibrator. Also, in the above-mentioned conventional vibrators 1100 and 1200, the PZT plates 1111 to 1114 and 1211 to 1213 have to be attached to the side surfaces of the members 1110 and 1210, respectively, with a high accuracy. If this accuracy in attachment is low, the sensed signal will have an unfavorable balance. An enormous time may be needed for these processing and attachment steps. Also, it is difficult for the vibrators 1100 and 1200 to have a small size due to their configurations.

Figure 52:
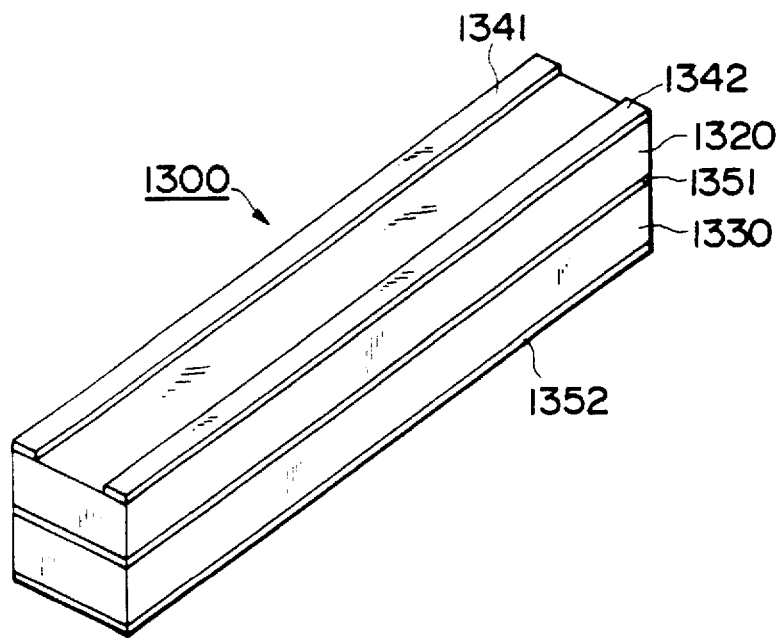
FIG. 52 is a perspective view of a vibrator of another embodiment.
Figure 53:
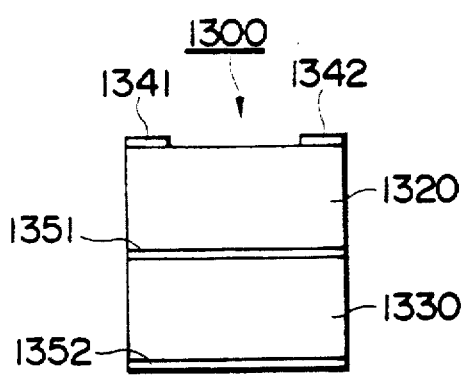
FIG. 53 is a front view of the vibrator shown in FIG. 52.

Accordingly, in place of these vibrators 1100 and 1200 for vibrational angular velocity meter, the inventors provide a vibrator for vibrational angular velocity meter shown in FIGS. 52 and 53 which can have a small size and can be easily manufactured.

FIGS. 52 and 53 are views showing this vibrator 1300. Namely, FIG. 52 is a perspective view thereof, whereas FIG. 53 is a front view observed from its longitudinal direction.

The vibrator 1300 is constituted by square pole-like members 1320 and 1330 each made of PZT which is a piezoelectric material; an electrode 1351 made of silver paste which is held between the lower surface of the member 1320 and the upper surface of the member 1330; electrodes 1341 and 1342 made of silver paste which are disposed on the upper surface of the member 1320 so as to extend in the longitudinal direction of the member 1320 while being positioned at the respective side ends of the member 1320 so as to be spaced from each other in the width direction of the member 1320; and an electrode 1352 made of silver paste which is disposed on the whole lower surface of the member 1330. The upper surface of the member 1320 is a simple plane without any indentation or the like formed thereon.

In this vibrator 1300, when a vibration voltage is applied between the electrodes 1352 and 1351 while the electrode 1351 is used as an earth electrode, the vibrator 1300 as a whole vibrates with its amplitude in a direction perpendicular to the surfaces of the electrodes 1351 and 1352. Assuming that the vibrator 1300 is rotated with a certain angular velocity around an axis which is in parallel to the longitudinal direction thereof, voltages corresponding to Coriolis force are generated at the electrodes 1341 and 1342. Though the voltages generated at the electrodes 1341 and 1342 include not only the voltages corresponding to the Coriolis force but also the voltages due to bending vibration (excitation) in a direction perpendicular to the surfaces of the electrodes 1341 and 1342, a signal corresponding to the Coriolis force can be obtained alone when the differential between the voltage of the electrodes 1341 and that of the electrode 1342 is determined so as to cancel the component attributable to the excitation, whereby the angular velocity of the vibrator 1300 can be measured.

Though the above-mentioned vibrator 1300 can attain a smaller size and a simpler manufacturing step as compared with the vibrators 1100 and 1200 shown in FIGS. 48 to 51, it still has the following points to be improved. Namely, in the vibrator 1300, the electrodes 1341 and 1342 have to be formed by screen printing of silver paste or the electrode attached to the whole upper surface of the member 1320 has to be masked so as to remove unnecessary portions thereof by sandblast or acid etching. In these techniques, however, it is difficult for the electrodes 1341 and 1342 to have sizes and areas which stably coincide with each other. Accordingly, the electrodes 1341 and 1342 may have sizes or areas different from each other, thereby yielding signal values, which should correspond to the Coriolis force, different from each other. As a result, the angular velocity may not be measured correctly. Also, when the removing technique based on acid etching is used, the residue of silver paste may remain between the electrodes 1341 and 1342, in particular, thereby yielding insufficient insulation therebetween.

The vibrators in accordance with the following embodiments, on the other hand, have small sizes and simple manufacturing steps thereof. Also, as compared with the vibrators of the comparative examples, those in accordance with the embodiments can measure the angular velocity more correctly while more securely attaining insulation between electrodes. Such a vibrator has an indentation (groove) between electrodes. Each vibrator is cut off from a cleavage plane of its constituent semiconductor crystal which acts as a boundary thereof. The processing of such a groove and cutting operation can be effected with a very high accuracy, for example, by means of a dicing saw, whereby a very high accuracy can be attained in the size, area, and position of a plurality of external electrodes. Accordingly, without any disadvantages such as those occurring in the vibrator shown in FIG. 52, the angular velocity can be measured correctly. Also, since the groove processing and cutting operations can be effected with a very high accuracy, for example, by means of a dicing saw, a very high accuracy can be attained in the processing amount of the groove processing operation (sizes such as width and depth of the groove). Accordingly, when the processing amount of the groove processing operation is set to a predetermined value, the normal frequencies in the longitudinal and transverse directions of the vibrator can substantially coincide with each other. Therefore, it may become totally unnecessary for the normal frequencies in the longitudinal and transverse directions of the vibrator to be subjected to a matching operation or, even if they do not coincide with each other, their deviation from each other will be so small that the matching operation becomes easy.

Figure 32:
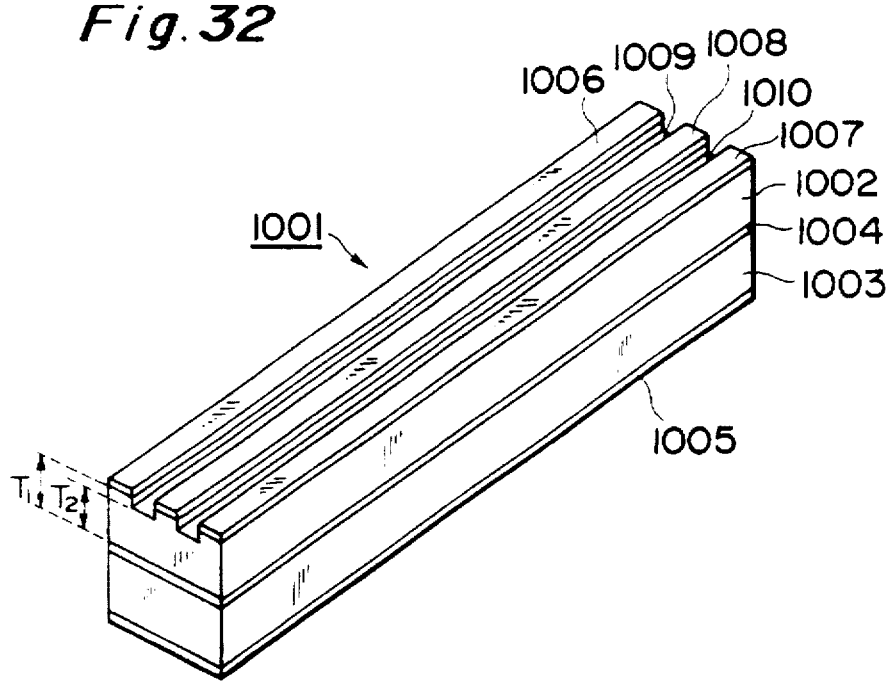
FIG. 32 is a perspective view of a vibrator in accordance with another embodiment.
Figure 33:
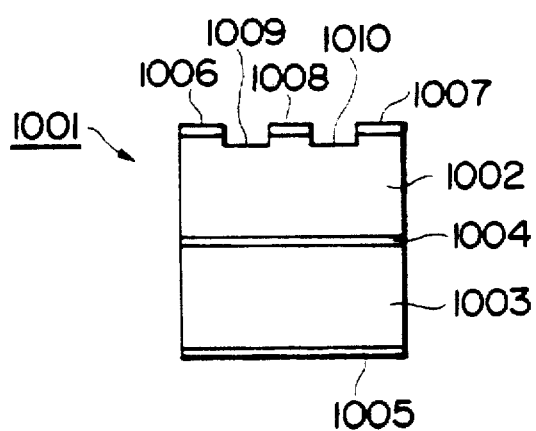
FIG. 33 is a front view of the vibrator shown in FIG. 32.

First, a vibrator 1001 having a groove which is used for a piezoelectric vibrational velocity meter (piezoelectric crystal element) will be explained with reference to FIGS. 32 and 33. FIG. 32 is a perspective view of the vibrator 1001, whereas FIG. 33 is a front view thereof observed from its longitudinal direction.

As shown in FIG. 32, the vibrator 1001 comprises first and second members (layers) 1002 and 1003 each shaped like a square pole (which may not strictly be a square pole) made of a piezoelectric material; an electrode 1004 held between a first surface (lower surface in FIG. 32) of the first member 1002 and a first surface (upper surface in FIG. 32) of the second member 1003; external electrodes 1006, 1007, and 1008 which are formed on a second surface (upper surface in FIG. 32) of the first member 1002 opposite to the first surface thereof so as to extend in parallel to each other in the longitudinal direction of the first member 1002 while having a space therebetween in the width direction (horizontal direction in FIG. 33) of the first member; and an electrode 1005 formed on a second surface (lower surface in FIG. 32) of the second member 1003 opposite to the first surface thereof. Between the electrodes 1006 and 1008 and between the electrodes 1007 and 1008 on the second surface of the first member 1002, indentations 1009 and 1010 are respectively formed. The electrodes 1006 and 1007 are respectively formed at both side end positions in the width direction of the first member 1002 with substantially the same area. The electrode 1008 is formed at substantially the center position in the width direction of the first member 1002. Here, distance $T_1$ between an interface, which is defined between the piezoelectric crystal layer 1002 and one of the electrodes 1006, 1007, and 1008, and the lower surface of the piezoelectric crystal layer 1002 is greater than distance $T_2$ between the bottom of the groove 1009 in the piezoelectric crystal layer 1002 and the lower surface of the piezoelectric crystal layer 1002.

In this embodiment, each of the first and second members 1002 and 1003 is made of a piezoelectric ceramic [e.g., lead titanate zirconate (PZT)] with a thickness of 0.5 mm, a width of 1 mm, and a length of 9 mm. The electrodes 1004, 1005, 1006, 1007, and 1008 are made of silver paste. The electrode 1004 is formed over the whole lower surface of the first member 1002 and the whole upper surface of the second member 1003. The electrode 1005 is formed on the whole lower surface of the second member 1003. Each of the electrodes 1006, 1007, and 1008 has a width of 0.2 mm. Also, each of the indentations (grooves) 1009 and 1010 has a width of 0.2 mm. However, the present invention should not be limited to such materials and sizes. Here, in this embodiment, the direction of polarization of the first and second members 1002 and 1003 is assumed to be substantially in their thickness direction (vertical direction in FIG. 33).

Next, an example of a method for making the vibrator 1001 will be explained with reference to FIGS. 34 to 39. These drawings are schematic perspective views showing manufacturing steps of the vibrator 1001.

Figure 34:
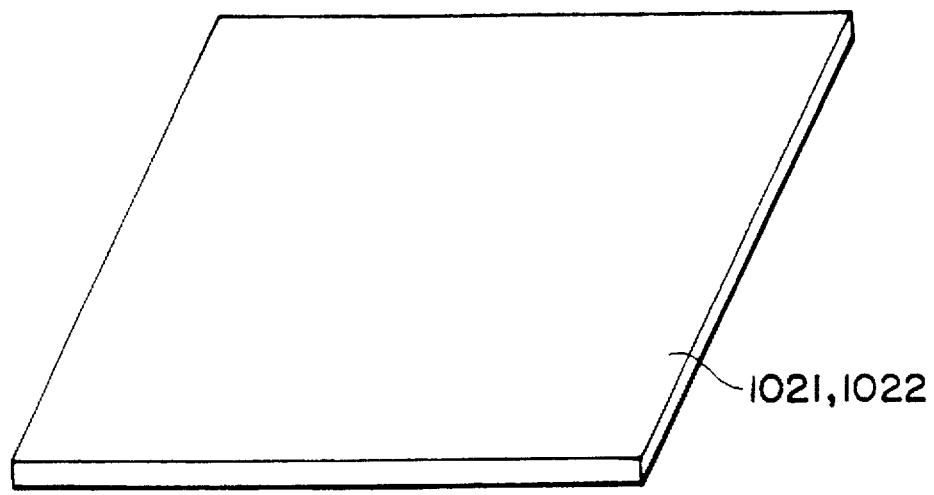
FIG. 34 is a schematic perspective view showing a manufacturing step of the vibrator shown in FIG. 32.

First, two planar members 1021 and 1022 each made of PZT having a thickness of 0.5 mm, a length of 7 cm, and a width of 7 cm are prepared. Then, electrodes; are formed with silver paste on the whole surfaces of both sides of each member, respectively. By means of these electrodes, both of the members 1021 and 1022 are subjected to polarizing processing in their thickness direction. FIG. 34 shows the planar member 1021 or 1022 on which the electrodes have been formed and which has been subjected to the polarizing processing. In FIG. 34, however, the electrodes are not depicted. Also, in FIGS. 35 to 39 and FIG. 43 which will be explained later, these electrodes are not depicted.

Figure 35:
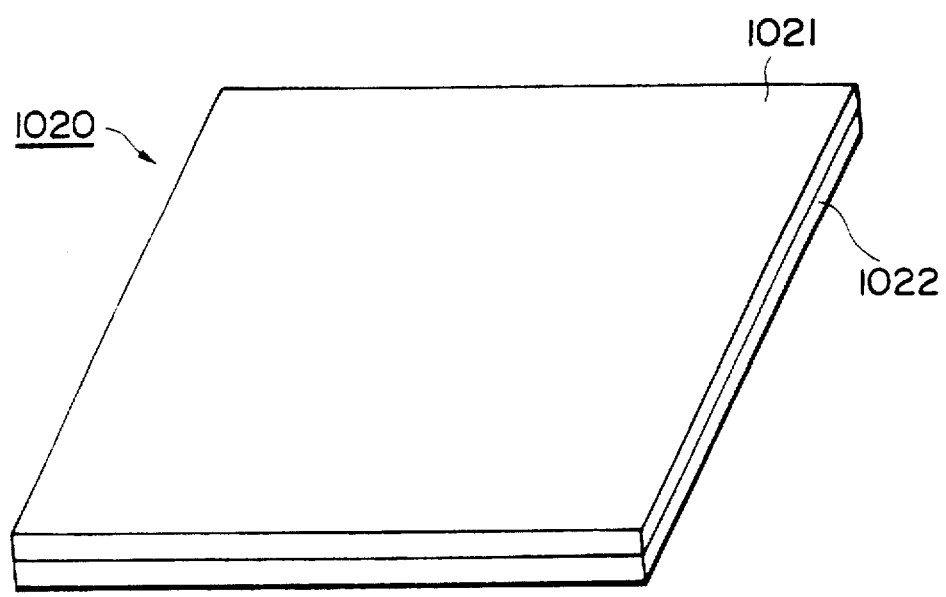
FIG. 35 is a perspective view of a vibrator intermediate product for explaining a manufacturing step of the vibrator shown in FIG. 32 which is subsequent to the step shown in FIG. 34.

Next, as shown in FIG. 35, the planar members 1021 and 1022 with the electrodes subjected to the polarizing processing are bonded together with an adhesive (not depicted) such as epoxy adhesive so as to form a bonded member 1020. As the adhesive used at this time, that having a low viscosity without making a thick adhesive layer is selected. Such an adhesive is selected in order to secure electric connections between minute irregularities on the silver paste electrodes on the surfaces of the members 1021 and 1022 and in order to secure uniformity in the thickness of the bonded member 1020 without generating uneven thickness in the adhesive upon bonding. These features are attained when the adhesive is uniformly applied and heat-treated at a predetermined temperature while a uniform load is supplied to the bonded member 1020 during the heat treatment.

Then, by means of wax (or other adhesives from which they can be later separated from each other), the surface of bonded member 1020 on the side of the member 1022 is temporarily bonded to a non-depicted supporting plate such as a plane glass plate having a size larger than that of the bonded member 1020 and a secured flatness. Also, this bonding operation is effected at a predetermined temperature and a uniform load so as to secure a bonding accuracy. Namely, the upper surface of the bonded member 1020 is made accurately in parallel to the upper surface (reference surface) of the supporting plate.

When the adhesive used for bonding the planar members 1021 and 1022 together necessitates a heat treatment at a high temperature, the polarization of the planar members 1021 and 1022 may be weakened due to this heat treatment. In this case, when a polarizing processing is effected again between the bonded electrode portion and the electrode opposed thereto, the polarization of the planar members 1021 and 1022 can be easily revived. The polarizing processing may be effected after the bonding operation alone without subjecting the planar members 1021 and 1022 to the polarizing processing prior to the bonding operation.

Figure 36:
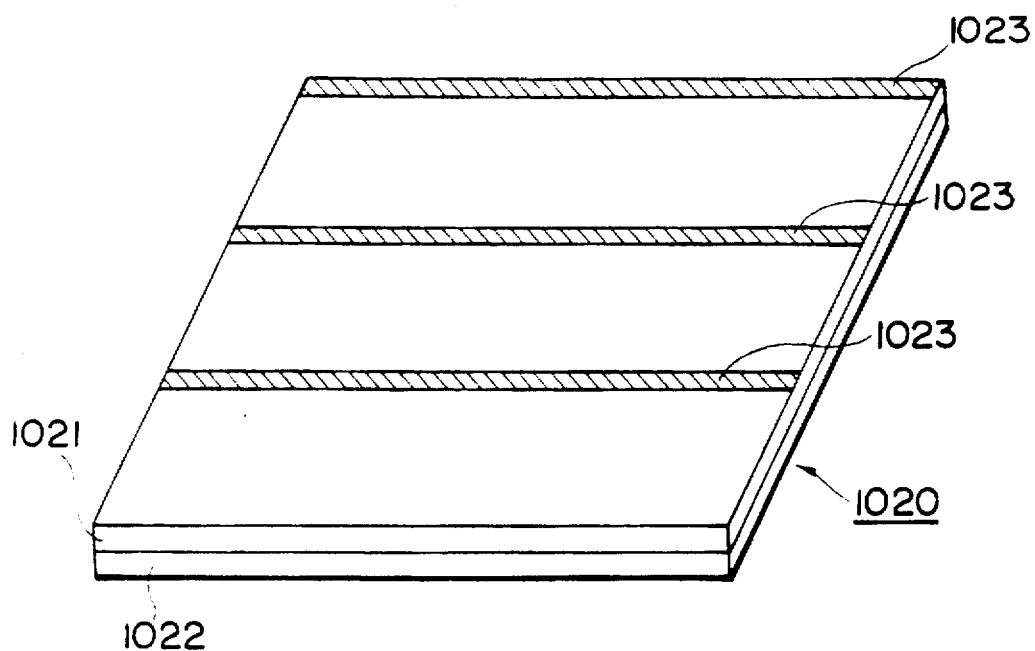
FIG. 36 is a perspective view of a vibrator intermediate product for explaining a manufacturing step of the vibrator shown in FIG. 32 which is subsequent to the step shown in FIG. 35.

Thereafter, as shown in FIG. 36, on the electrode formed on the upper surface of the bonded member 1020, cream solder bands each having a width of 0.5 mm are formed by screen printing so as to extend in the transverse direction in parallel to each other with a space therebetween of 9.2 mm including the length of the vibrator 1001, 9 mm, and a cut margin, 0.2 mm, for a dicing saw. They are subjected to a heat treatment at a predetermined temperature so as to form solder bands 1023. For the convenience of understanding, only three solder bands 1023 are depicted, seven bands are actually formed. These solder bands 1023 facilitate soldering of leads to the electrodes 1006, 1007, and 1008 which will be effected later. However, it is not always necessary to form such solder bands 1023 in the present invention.

Figure 37:
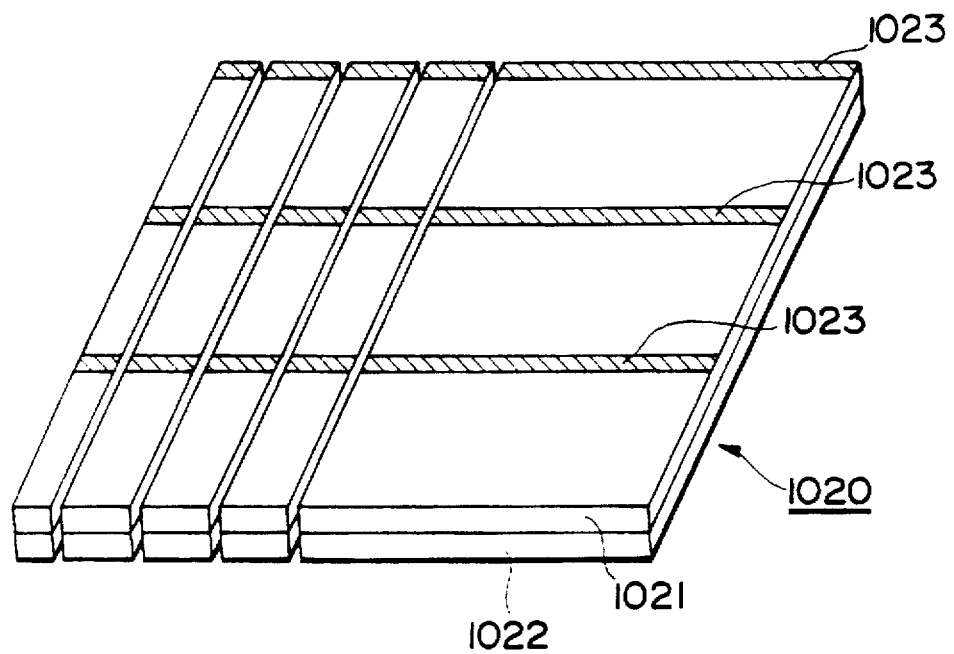
FIG. 37 is a perspective view of a vibrator intermediate product for explaining a manufacturing step of the vibrator shown in FIG. 32 which is subsequent to the step shown in FIG. 36.

Subsequently, as shown in FIG. 37, with a predetermined pitch in a direction perpendicular to the solder bands 1023, the dicing saw cuts into the bonded member 1020 so as to nearly reach the surface of the supporting plate, thereby severing the bonded member 1020. This pitch is defined, in view of the thickness of the cutting blade of the dicing saw, such that the width of the severed strip becomes the width of the vibrator 1001, namely, 1 mm. Each of the severed strips is fixedly held by the supporting plate since wax bonds them together. Accordingly, the cutting and groove processing operations shown in FIGS. 38 and 39, which will be explained later, can be performed accurately.

Figure 38:
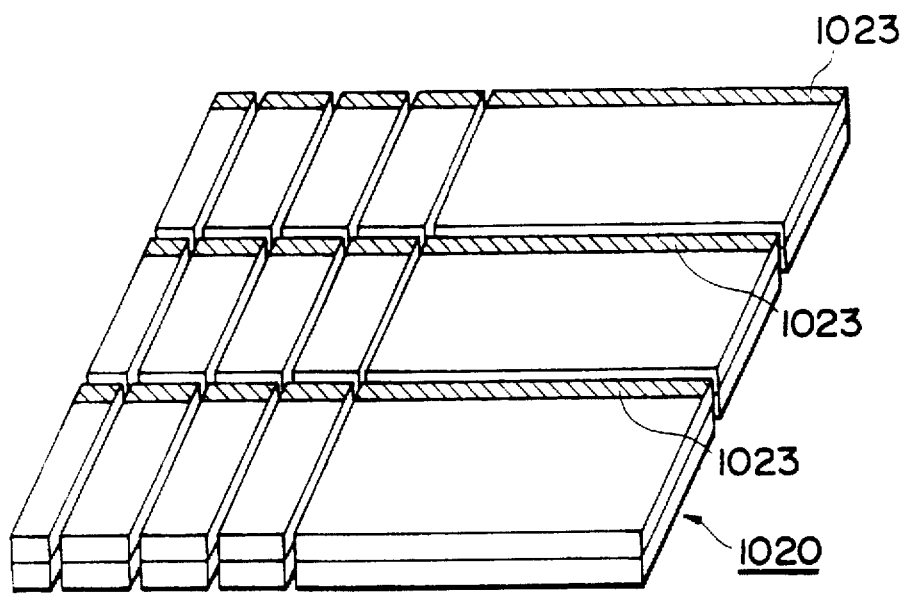
FIG. 38 is a perspective view of a vibrator intermediate product for explaining a manufacturing step of the vibrator shown in FIG. 32 which is subsequent to the step shown in FIG. 37.

Then, as shown in FIG. 38, the dicing saw cuts in the bonded member 1020 along a side of each solder band 1023 so as to nearly reach the surface of the supporting plate, thereby severing the bonded member 1020. The pitch of this cutting operation is set such that the length of the severed strip becomes a predetermined length of the vibrator 1001.

Figure 39:
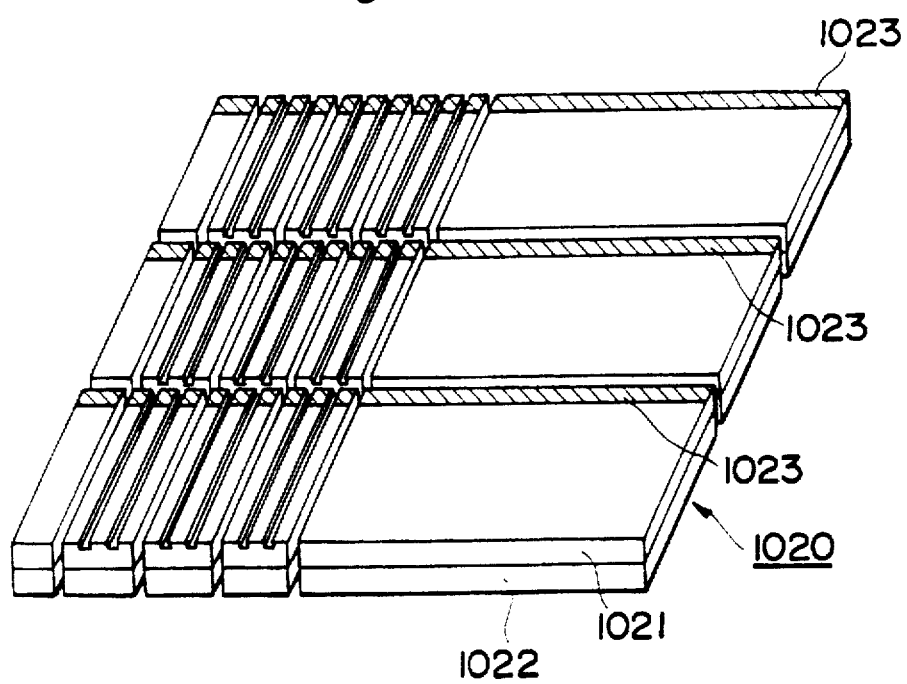
FIG. 39 is a perspective view of a vibrator intermediate product for explaining a manufacturing step of the vibrator shown in FIG. 32 which is subsequent to the step shown in FIG. 38.

Thereafter, as shown in FIG. 39, with the blade of the same dicing saw being adjusted so as to attain a cut-in depth of 30 μm from the upper surface of the bonded member 1020, cut-in grooves (corresponding to the indentations 1009 and 1010 in FIG. 32) are formed in parallel to the cutting line which is perpendicular to the solder bands 1023, such that the electrodes 1006 and 1008 of the vibrator 1001 have the identical width of 0.2 mm. Since each strip of the bonded member 1020 is fixed to the supporting plate by wax, this groove processing operation can be effected with a very high accuracy inherent in the dicing saw. When the width of the groove is to be increased, the groove processing operation is effected with the width of the blade of the dicing saw being changed. When the PZT portion below the electrode is shaved off so as to form the groove, unnecessary silver paste electrode portions between the electrodes 1006, 1007, and 1008 can be securely removed, thereby securing insulations between the electrodes 1006, 1007, and 1008. Then, as explained in conjunction with FIGS. 37 to 39, as the cutting and groove processing operations of the bonded member 1020 can be effected by the dicing saw with a very high accuracy, the accuracy in size, area, and position of the electrodes 1006, 1007, and 1008 becomes quite high.

After the foregoing processing operations are completed, the supporting plate is heated to dissolve wax. Then, each strip of the bonded member 1020 is separated from the supporting plate and washed with an organic solvent so as to remove the wax attached thereto. Accordingly, each strip of the bonded member 1020 becomes the vibrator 1001, thereby completing the manufacture thereof.

According to the foregoing processes, a large number of small vibrators 1001 for vibrational angular velocity meter shown in FIG. 32, each having a width of 1 mm, a thickness of 1 mm, and a length of 9 mm, can be manufactured at once. Namely, since the vibrator 1001 in accordance with this embodiment can be manufactured by the foregoing processes, it can attain a smaller size and simpler manufacturing steps as compared with the above-mentioned vibrators shown in FIGS. 48 to 51.

While the cutting and groove processing operations are successively performed by the steps shown in FIGS. 36, 37, 38, and 39 in this embodiment, the order of these steps can be altered arbitrarily. Also, while the planar members 1021 and 1022 each of which has electrodes formed on both sides thereof are used in order to prepare the bonded member 1020 shown in FIG. 35, one of the planar members 1021 and 1022 may have only one electrode formed on one surface thereof. In this case, the surface of the one planar member which does not have an electrode is bonded to the electrode surface of the other planar member so as to attain the bonded member 1020 shown in FIG. 35.

Here, the depth of the indentations 1009 and 1010 in FIG. 32 is depicted deeper than their actual depth in order to facilitate the understanding thereof. While the cross section of each of the indentations 1009 and 1010 in this embodiment is rectangular, it may be, for example, shaped like V or arc without being restricted thereto. Also, the solder bands 1023 are not shown in FIG. 32.

Preferably, the normal frequency (or resonance frequency) of the vibrator 1001 in the longitudinal direction (thickness direction) thereof and the normal frequency (or resonance frequency) in the transverse direction (width direction) thereof are set so as to coincide with each other. This frequency matching operation is normally performed, for example, as the side surfaces of the vibrator 1001 are shaven with laser or the like, while the vibrator 1001 is vibrated, so as to adjust its frequency. In this embodiment, since a very high accuracy can be attained in the amount of processing (sizes such as width and depth of the groove) due to the fact that the above-mentioned groove processing and cutting operations of the bonded member 1020 can be performed with a very high accuracy, the normal frequencies in the longitudinal and transverse directions of the vibrator 1001 can substantially coincide with each other when the amount of processing is set to a predetermined value. Accordingly, it may become totally unnecessary for the normal frequencies in the longitudinal and transverse directions of the vibrator 1001 to be subjected to a matching operation or, even if they do not coincide with each other, their deviation from each other will be so small that the matching operation becomes easy. When the vibrator 1001 in accordance with this embodiment was actually made, possibly because of the narrow and shallow grooves formed thereby, no difference was observed between the normal frequencies in the longitudinal and transverse directions, thereby making it unnecessary to effect any frequency matching operation.

In the following, an example of a vibrational angular velocity meter using the vibrator 1001 in accordance with this embodiment will be explained with reference to FIG. 40. This drawing is a configurational view showing this vibrational angular velocity meter.

Figure 40:
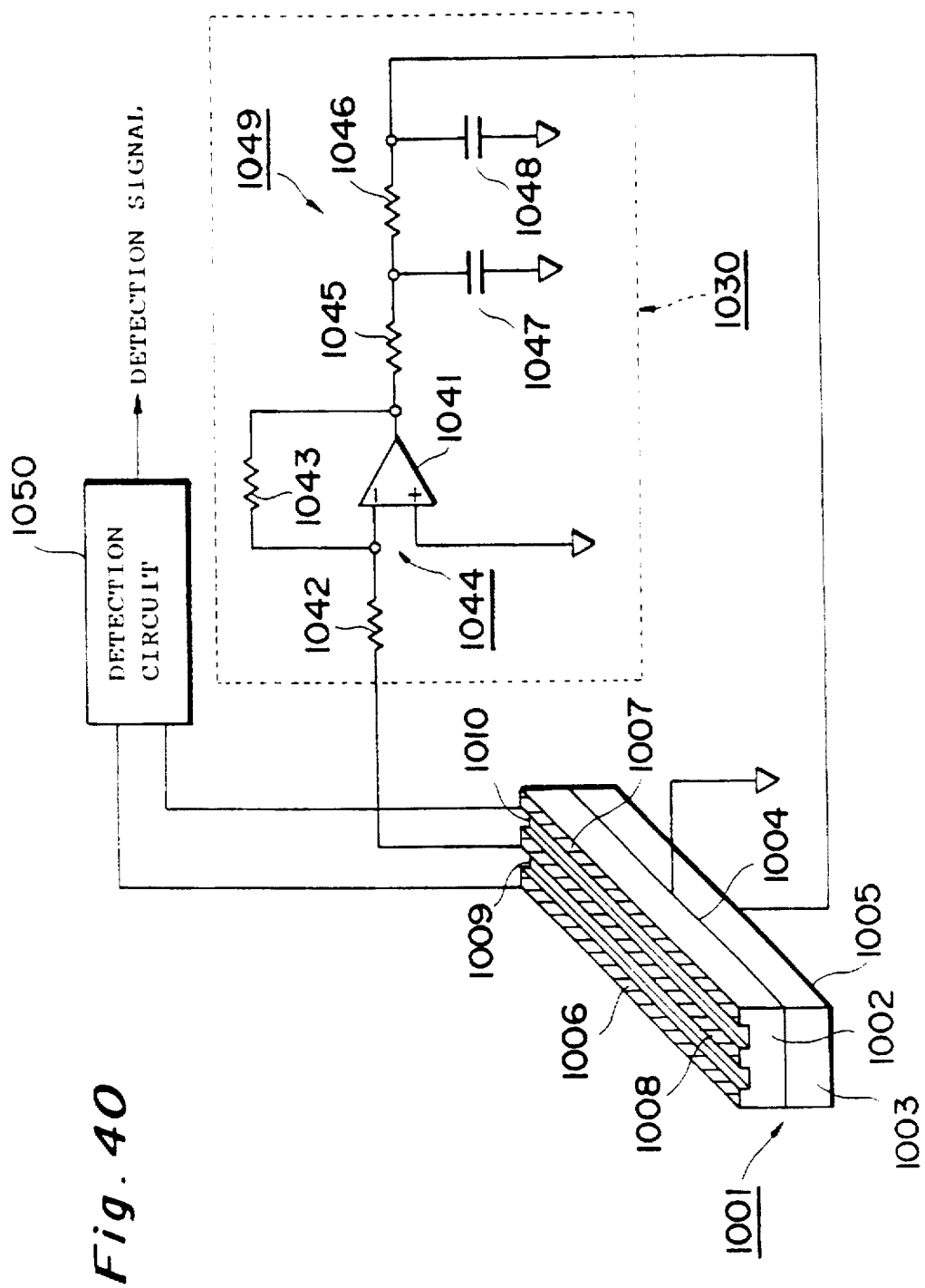
FIG. 40 is a configurational view showing a vibrational angular velocity meter using the vibrator shown in FIG. 32.

As shown in FIG. 40, this vibrational angular velocity meter comprises, in addition to the vibrator 1001, a self-excitation circuit 1030 which drives the vibrator 1001 in a self-excitation manner and a detection circuit 1050 for attaining, based on a signal from the vibrator 1001, a detection signal corresponding to Coriolis force which acts on the vibrator 1001.

The electrode 1004 of the vibrator 1001 is used as a reference electrode (earth electrode), to which the output terminal of the self-excitation circuit 1030 is connected. The input terminal of the self-excitation circuit 1030 is connected to the electrode 1008. The two input terminals of the detection circuit 1050 are respectively connected to the electrodes 1006 and 1007. These connections to the electrodes 1006, 1007, and 1008 are effected as leads are soldered to portions corresponding to the solder bands 1023.

When the self-excitation circuit 1030 applies an excitation voltage (driving voltage) between the electrodes 1004 and 1005, the second member 1003 of the vibrator 1001 is subjected to bending vibration (simple harmonic oscillation) in a direction (vertical direction in FIG. 33) perpendicular to the surfaces of the electrodes 1004 and 1005, whereby the vibrator 1001 as a whole is subjected to bending vibration in this direction. When the vibrator 1001 rotates around an arbitrary axis extending in the longitudinal direction of the members 1002 and 1003 so as to yield an angular velocity, Coriolis force is generated in the width direction of the members 1002 and 1003. Due to this Coriolis force, bending vibration of the vibrator 1001 occurs in this direction. Upon this bending vibration, signals (voltages) corresponding to the Coriolis force are generated in opposite phases at electrodes 1006 and 1007, respectively. The voltages generated at the electrodes 1006 and 1007 include not only these signals but also, in the same phase, the voltages caused by the bending vibration (excitation) of the vibrator 1001 in a direction perpendicular to the surfaces of the electrodes 1004 and 1005.

The detection circuit 1050 detects the differential between the signal of the electrode 1006 and the signal of the electrode 1007 so as to cancel the component caused by the excitation, thereby attaining the signal corresponding to the Coriolis force alone. Then, it demodulates the envelope of the resulting differential waveform and outputs thus demodulated signal as the detection signal of the Coriolis force. As a result, the rotational speed (angular velocity) of the vibrator 1001 can be measured. Here, it is easy for one skilled in the art to design a specific circuit configuration of the detection circuit 1050 in view of the disclosure of this specification.

The self-excitation circuit 1030 is constituted by an inverting amplifier 1044 composed of an operational amplifier 1041 and resistors 1042 and 1043 and a low-pass filter 1049 composed of two steps of RC filters comprising resistors 1045 and 1046 and capacitors 1047 and 1048. The output voltage from the electrode 1008 is inversely amplified by the inverting amplifier 1044. The phase of thus amplified voltage is adjusted by the low-pass filter 1049 so as to be supplied to the electrode 1005 as a driving voltage. As a result, a positive feedback is provided so as to attain a loop gain of 1 or higher, whereby the vibrator 1001 is driven in a self-excitation manner.

Preferably, the electrodes 1006 and 1007 of the vibrator 1001 have areas identical to each other. When their areas differ from each other, the signal voltages generated at the electrodes 1006 and 1007 due to the Coriolis force with opposite phases may lose their balance, whereby the angular velocity cannot be measured correctly. Preferably, the electrode 1008 is disposed correctly at the center in the width direction of the member 1002. In the case where the position of the electrode deviates from the center in the width direction of the member 1002, when there exists Coriolis force, the signal input into the self-excitation circuit 1030 may change in response to this Coriolis force, whereby the self-excitation cannot be attained accurately and the angular velocity cannot be measured correctly. In the vibrator 1001 in accordance with this embodiment, since the accuracy in the size, area, and position of the electrodes 1006, 1007, and 1008 is very high, the electrodes 1006 and 1007 of the vibrator 1001 can correctly have the same area, while the electrode 1008 can be correctly disposed at the center in the width direction of the member 1002, whereby the angular velocity can be correctly measured.

Though the bonded member 1020 is temporarily bonded to the supporting plate in the above-mentioned manufacturing method of the vibrator 1001, it is not always necessary to do so in the present invention.

In the following, a vibrator 1060 for vibrational angular velocity meter in accordance with another embodiment will be explained with reference to FIGS. 41 and 42.

Figure 41:
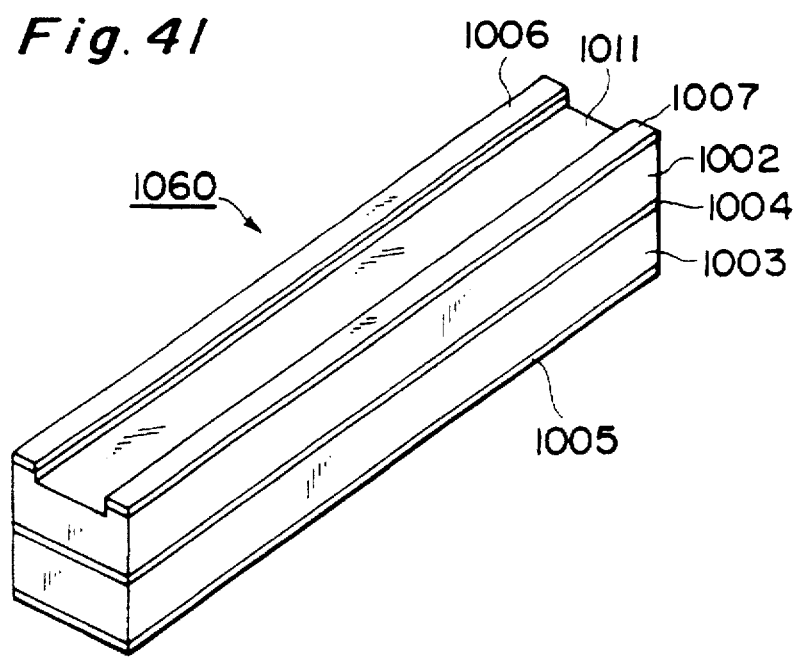
FIG. 41 is a perspective view of another vibrator.
Figure 42:
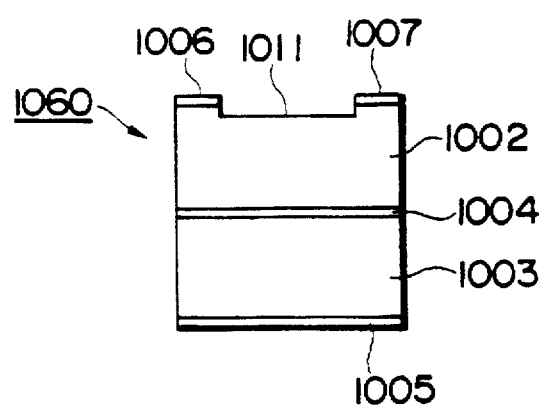
FIG. 42 is a front view of the vibrator shown in FIG. 41.

FIGS. 41 and 42 are views showing the vibrator 1060 in accordance with this embodiment. Namely, FIG. 41 is a perspective view thereof, whereas FIG. 42 is a front view thereof observed from its longitudinal direction. In FIGS. 41 and 42, elements identical or corresponding to those shown in FIG. 32 are referred to with marks identical thereto, without repeating their explanations.

The vibrator 1060 in accordance with this embodiment differs from the vibrator 1001 shown in FIG. 32 only in that, without forming the electrode 1008 shown in FIG. 32, an indentation 1011, which is a single groove with a large width, is formed between the electrodes 1006 and 1007.

Figure 43:
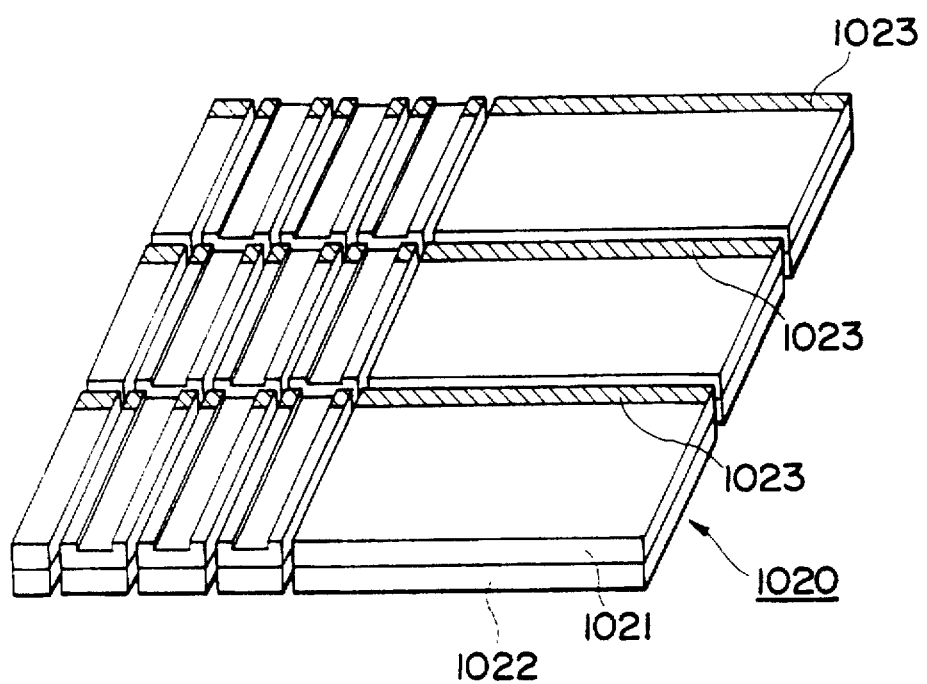
FIG. 43 is a perspective view of a vibrator intermediate product for explaining a manufacturing step of the vibrator shown in FIG. 41.

Next, an example of a method of manufacturing this vibrator 1060 will be explained with reference to FIG. 43 in addition to the above-mentioned FIGS. 34 to 39. FIG. 43 is a perspective view showing a manufacturing step of the vibrator 1060.

A part of the method of manufacturing this vibrator 1060 is the same as that of the vibrator 1001 shown in FIG. 32. First, the steps explained in conjunction with FIGS. 34 to 39 are performed such that the bonded member 1020 attached to the non-depicted supporting plate by means of wax attains a state shown in FIG. 39. Here, however, the cutting pitch of the bonded member 1020 in FIG. 37 is made larger than that for forming the vibrator 1001 shown in FIG. 32 by 0.05 mm.

After the step explained in conjunction with FIG. 39, as shown in FIG. 41, the groove formed in the step shown in FIG. 39 is used as an auxiliary groove so as to form, by a dicing saw, a groove corresponding to the indentation 1011 between the electrodes 1006 and 1007 shown in FIG. 41. Since the width of this groove is remarkably as wide as 0.5 mm in this embodiment, the cutting blade cannot be used. Accordingly, a wide blade is used in place of the cutting blade so as to effect shaving processing. At this time, since the narrow groove formed at the step shown in FIG. 39 acts as the auxiliary groove, the width of the groove can be processed into 0.5 mm, while the portions of the member 1021 where the electrodes 1006 and 1007 have been formed are prevented from chipping off. When the width and height of the vibrator 1060 are set identical to each other, the normal frequencies in the longitudinal and transverse directions differ from each other due to the groove processing shown in FIG. 43. Accordingly, as mentioned above, a margin of about 0.05 mm is provided in the width direction beforehand, while the depth and width processing amounts of the groove processing are appropriately set, thereby making the normal frequencies in both directions coincide with each other. In this embodiment, when a depth of 50 μm is shaved with a groove width of 0.5 mm, the normal frequencies in both directions coincide with each other, whereby the frequency matching operation becomes unnecessary.

After the foregoing processing operations are completed, the supporting plate is heated to dissolve wax. Then, each strip of the bonded member 1020 is separated from the supporting plate and washed with an organic solvent so as to remove the wax attached thereto. Accordingly, each strip of the bonded member 1020 becomes the vibrator 1060, thereby completing the manufacture thereof.

Though the groove has a width as large as 0.5 mm in this embodiment, after the state shown in FIG. 38, is attained, the cutting blade of the dicing saw having a width of 0.2 mm may be used, as it is, for processing the groove so as to form a single narrow groove having a width of 0.2 mm in the width direction so as to form the electrodes 1006 and 1007. In this case, as long as the depth of the groove is not made large, it is unnecessary to provide the above-mentioned margin of 0.05 mm in order to make the normal frequencies in the longitudinal and transverse directions coincide with each other. Also, without necessitating the exchange of dicing saw blades, a large number of vibrators 1060 can be manufactured in simpler steps.

Next, an example of a vibrational angular velocity meter using the vibrator 1060 of this embodiment will be explained with reference to FIG. 44. This drawing is a configurational view showing this vibrational angular velocity meter.

Figure 44:
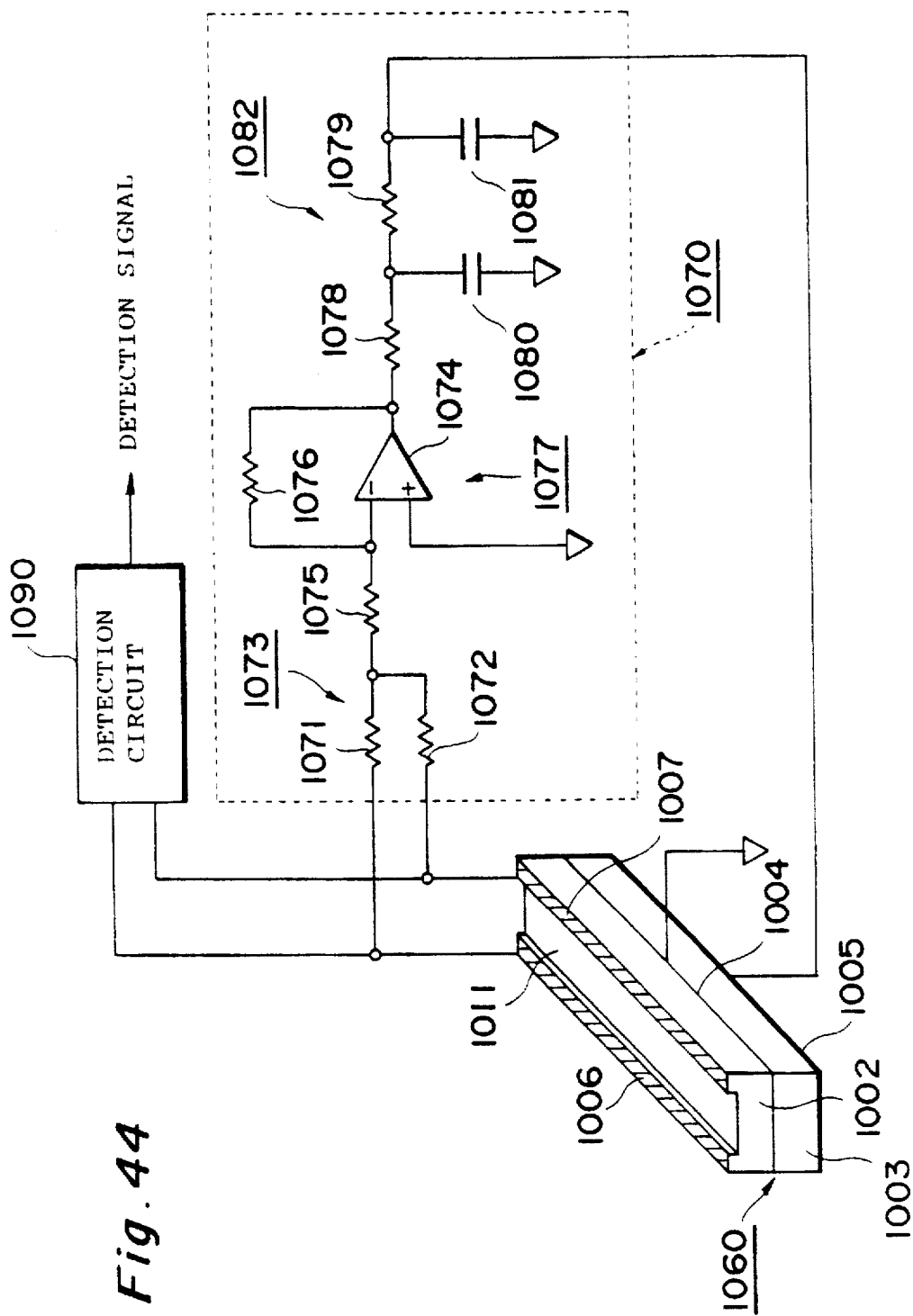
FIG. 44 is a configurational view showing a vibrational angular velocity meter using the vibrator shown in FIG. 41.

As shown in FIG. 44, this vibrational angular velocity meter comprises, in addition to the vibrator 1060, a self-excitation circuit 1070 which drives the vibrator 1060 in a self-excitation manner and a detection circuit 1090 for attaining, based on a signal from the vibrator 1060, a detection signal corresponding to Coriolis force which acts on the vibrator 1060.

The electrode 1004 of the vibrator 1060 is used as a reference electrode (earth electrode). The output terminal of the self-excitation circuit 1070 is connected to the electrode 1005. The two input terminals of the detection circuit 1070 are respectively connected to the electrodes 1006 and 1007. Also, the two input terminals of the detection circuit 1090 are respectively connected to the electrodes 1006 and 1007.

When the self-excitation circuit 1070 applies an excitation voltage (driving voltage) between the electrodes 1004 and 1005, the second member 1003 of the vibrator 1060 is subjected to bending vibration (simple harmonic oscillation) in a direction (vertical direction in FIG. 42) perpendicular to the surfaces of the electrodes 1004 and 1005, whereby the vibrator 1060 as a whole is subjected to bending vibration in this direction. When the vibrator 1060 rotates around an arbitrary axis extending in the longitudinal direction of the members 1002 and 1003 so as to yield an angular velocity, Coriolis force is generated in the width direction of the members 1002 and 1003. Due to this Coriolis force, bending vibration of the vibrator 1060 occurs in this direction. Upon this bending vibration, signals (voltages) corresponding to the Coriolis force are generated in opposite phases at electrodes 1006 and 1007, respectively. The voltages generated at the electrodes 1006 and 1007 include not only these signals but also, in the same phase, the voltages caused by the bending vibration (excitation) of the vibrator 1001 in a direction perpendicular to the surfaces of the electrodes 1004 and 1005.

The detection circuit 1090 detects the differential between the signal of the electrode 1006 and the signal of the electrode 1007 so as to cancel the component caused by the excitation, thereby attaining the signal corresponding to the Coriolis force alone. Then, it demodulates the envelope of the resulting differential waveform and outputs thus demodulated signal as the detection signal of the Coriolis force. As a result, the rotational speed (angular velocity) of the vibrator 1060 can be measured. Here, a specific circuit configuration of the detection circuit 1090 itself is well-known.

The self-excitation circuit 1070 is constituted by an adder 1073 composed of resistors 1071 and 1072; an inverting amplifier 1074 composed of an operational amplifier 1074 and resistors 1075 and 1076; and a low-pass filter 1082 composed of two steps of RC filters comprising resistors 1078 and 1079 and capacitors 1080 and 1081. As the adder 1073 adds the signal from the electrode 1006 and the signal from the electrode 1007 together so as to cancel the signal component corresponding to the Coriolis force, a signal of the component caused by excitation alone is obtained. This signal is inversely amplified by the inverting amplifier 1077. The phase of thus amplified voltage is adjusted by the low-pass filter 1082 so as to be supplied to the electrode 1005 as a driving voltage. As a result, a positive feedback is provided so as to attain a loop gain of 1 or higher, whereby the vibrator 1060 is driven in a self-excitation manner.

Also, in this embodiment, the electrodes 1006 and 1007 of the vibrator 1060 preferably have areas identical to each other. When their areas differ from each other, as in the case of the vibrator shown in FIG. 32, the signal voltages generated at the electrodes 1006 and 1007 due to the Coriolis force with opposite phases may lose their balance, whereby the angular velocity cannot be measured correctly. Also, in the case where the areas of the electrodes 1006 and 1007 differ from each other, when there exists Coriolis force, the output signal of the adder 1073 may change in response to this Coriolis force, whereby the self-excitation cannot be attained accurately and the angular velocity cannot be measured correctly. In the vibrator 1060 in accordance with this embodiment, like the vibrator 1001 shown in FIG. 32, since the accuracy in the size, area, and position of the electrodes 1006, 1007, and 1008 is very high, the electrodes 1006 and 1007 of the vibrator 1060 can correctly have the same area, whereby the angular velocity can be correctly measured.

It is clear that the advantages similar to those of the vibrator 1001 shown in FIG. 32 can be attained in accordance with this embodiment in addition to those mentioned above.

In the following, a vibrational angular velocity meter 1095 in accordance with another embodiment will be explained with reference to FIGS. 45 and 46.

Figure 45:
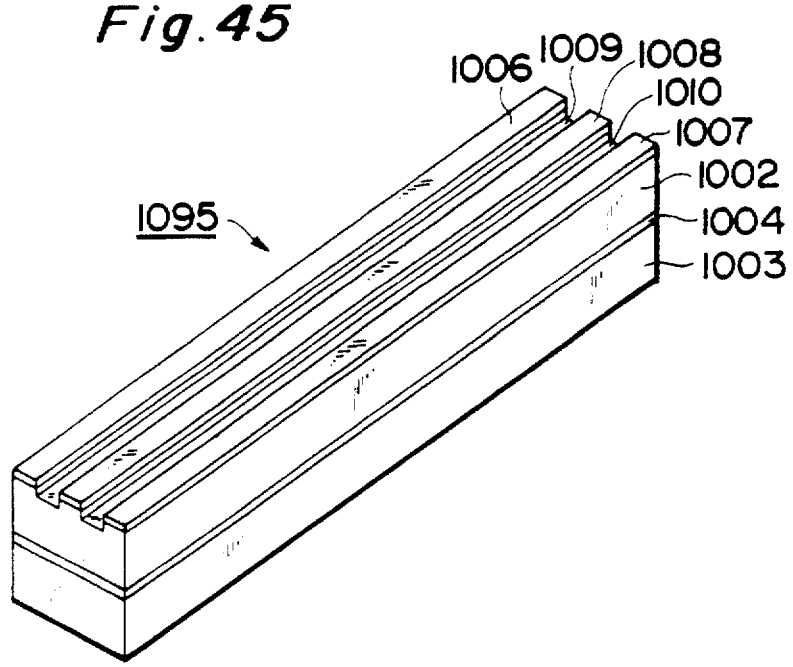
FIG. 45 is a perspective view of another vibrator.
Figure 46:
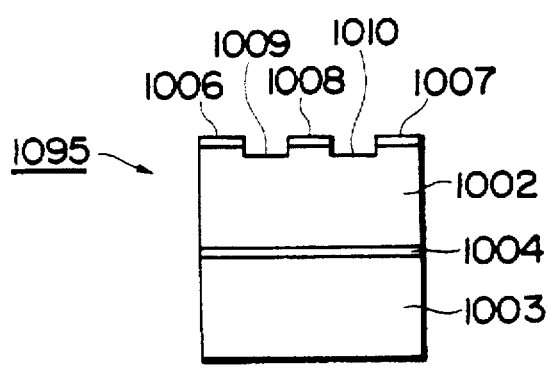
FIG. 46 is a front view of the vibrator shown in FIG. 45.

FIGS. 45 and 46 are views showing the vibrator 1095 in accordance with this embodiment. Namely, FIG. 45 is a perspective view thereof, whereas FIG. 46 is a front view thereof observed from its longitudinal direction. In FIGS. 45 and 46, elements identical or corresponding to those shown in FIG. 32 are referred to with marks identical thereto, without repeating their explanations.

The vibrator 1095 in accordance with this embodiment differs from the vibrator 1001 shown in FIG. 32 only in that the electrode 1005 shown in FIG. 32 is omitted. Here, in this embodiment, since the piezoelectric phenomenon of the member 1003 is not utilized at all and thus the member 1003 is piezoelectrically inactive, not only piezoelectric materials but also inherently piezoelectrically inactive materials such as alumina and glass can be used as the material for the member 1003.

Since the vibrator 1095 is different from the vibrator 1001 only in that the electrode 1005 is eliminated, the vibrator 1095 can be manufactured in a manner similar to the vibrator 1001.

Next, an example of a vibrational angular velocity meter using the vibrator 1095 in accordance with the present invention will be explained with reference to FIG. 47. This drawing is a configurational view showing this vibrational angular velocity meter.

Figure 47:
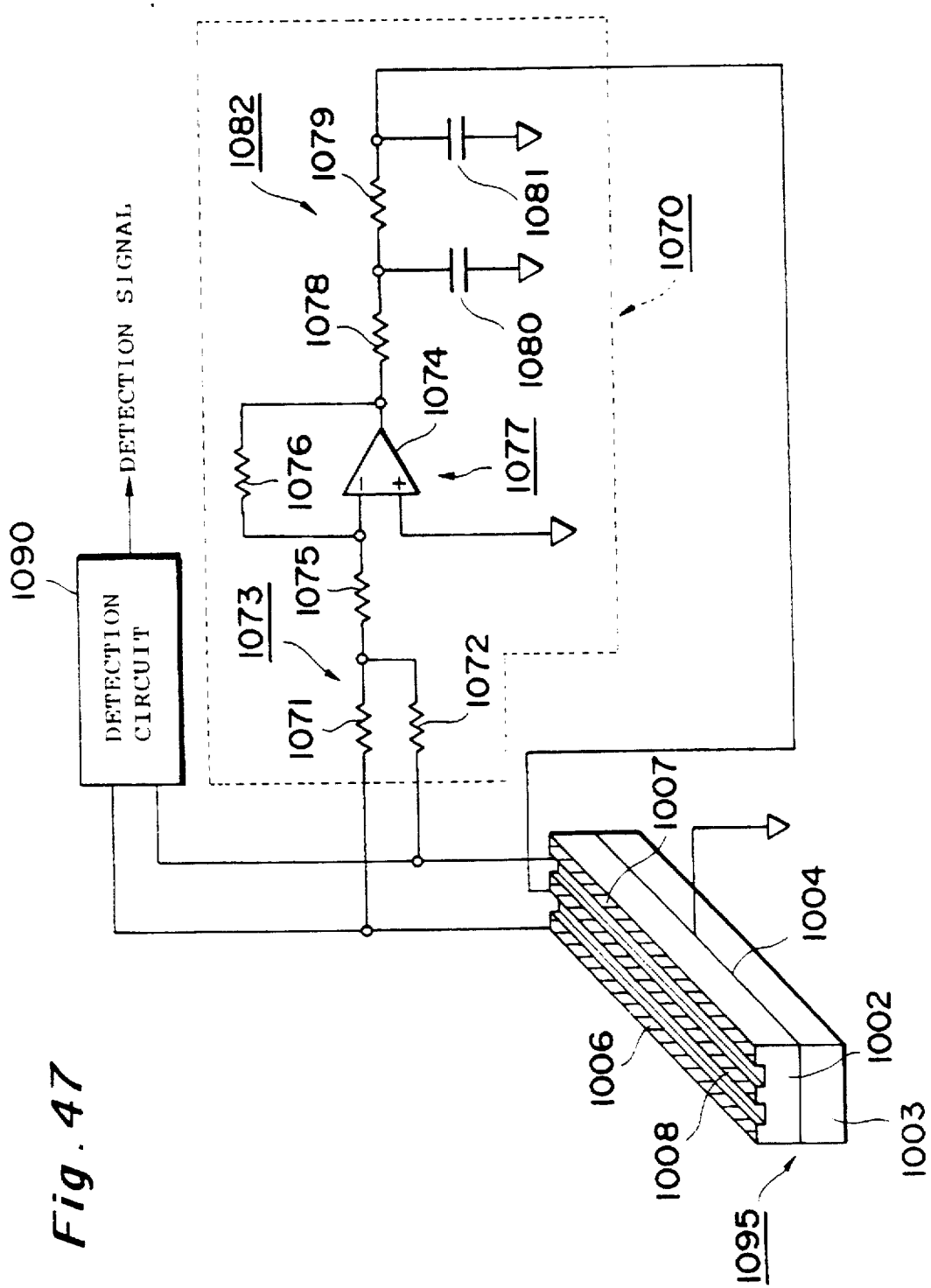
FIG. 47 is a configurational view showing a vibrational angular velocity meter using the vibrator shown in FIG. 45.

As shown in FIG. 47, this vibrational angular velocity meter comprises, in addition to the vibrator 1095, a self-excitation circuit 1070 which drives the vibrator 1095 in a self-excitation manner and a detection circuit 1090 for attaining, based on a signal from the vibrator 1060, a detection signal corresponding to Coriolis force which acts on the vibrator 1095.

Since the self-excitation circuit 1070 and detection circuit 1090 are totally the same as those shown in FIG. 44, their constituents identical to each other are referred to with marks identical to each other, without repeating their explanations. Here, in this vibrational angular velocity meter, however, the electrode 1004 of the vibrator 1095 is used as a reference electrode (earth electrode), while the output terminal of the self-excitation circuit 1070 is connected to the electrode 1008 and the two input terminals of the self-excitation circuit 1070 are respectively connected to the electrodes 1006 and 1007. Also, the two input terminals of the detection circuit 1090 are respectively connected to the electrodes 1006 and 1007.

In this vibrational angular velocity meter, when the self-excitation circuit 1070 applies an excitation voltage (driving voltage) between the electrodes 1004 and 1008, the first member 1002 of the vibrator 1060 is subjected to bending vibration (simple harmonic oscillation) in a direction (vertical direction in FIG. 46) perpendicular to the surfaces of the electrodes 1004 and 1005, whereby the vibrator 1095 as a whole is subjected to bending vibration in this direction. Thus, while only the method of exciting the vibrator 1095 is different, other operations in this embodiment are similar to those in the above-mentioned vibrational angular velocity meter shown in FIG. 44.

It is clear that the advantages similar to those of the vibrator 1001 shown in FIG. 32 can be attained in the vibrator 1095 in accordance with this embodiment. As explained in the foregoing, when a bonded member is prepared and then subjected to cutting and groove processing operations, a plurality of vibrators can be manufactured at once. Accordingly, both smaller size and simpler manufacturing steps can be attained. Also, insulation between electrodes can be securely attained, while the angular velocity can be correctly measured. Further, in accordance with the present invention, it may become totally unnecessary for the normal frequencies in the longitudinal and transverse directions of the vibrator to be subjected to a matching operation or, even if they do not coincide with each other, their deviation from each other will be so small that the matching operation becomes easy.

In the following, a piezoelectric vibrational angular velocity meter in accordance with another embodiment will be explained. A vibrator used in this angular velocity meter has a column for supporting it. As this column is fixedly attached to the vibrator at a nodal point portion of a resonance vibration of the vibrator, the piezoelectric vibrational angular velocity meter can have a smaller size.

This piezoelectric vibrational angular velocity meter detects a piezoelectric voltage caused by Coriolis force so as to detect a rotational angular velocity of an object. This piezoelectric vibrational angular velocity meter comprises a columnar vibrator which can vibrate in two directions perpendicular to each other and a supporting member which is fixedly bonded to the columnar vibrator at a nodal point portion of resonance vibration of the columnar vibrator so as to support the columnar vibrator.

Figure 54:
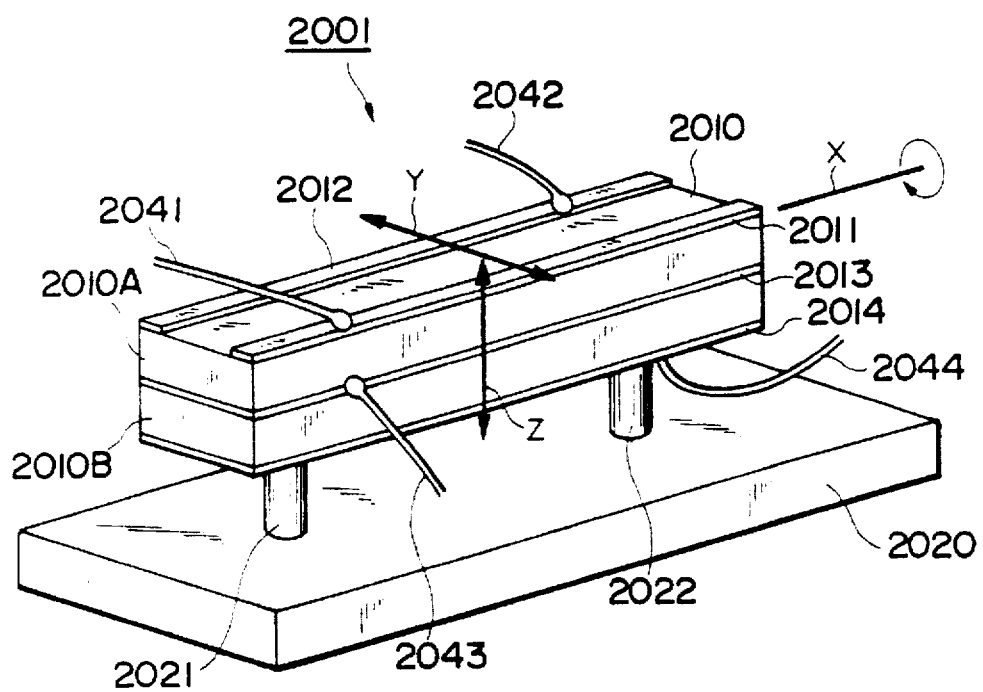
FIG. 54 is a perspective view showing a piezoelectric vibrational angular velocity meter of another embodiment.

FIG. 54 is a perspective view of such a piezoelectric vibrational angular velocity meter 2001. This piezoelectric vibrational angular velocity meter 2001 comprises a vibrator (columnar vibrator) 2010 which is constituted by a piezoelectric ceramic member (piezoelectric member), lead zirconate titanate (referred to as "PZT" hereinafter), which will be explained later. By means of a silicone adhesive, the vibrator 2010, at a nodal point portion of its resonance vibration, is attached to an end of each of columns (supporting members) 2021 and 2022 composed of a silicone resin (rubber-like elastic insulating material) which will be explained later. The other end of each of the columns 2021 and 2022 is fixedly attached, by means of a silicone adhesive, to a substrate 2020 composed of alumina.

Without being restricted to PZT, any piezoelectric ceramic materials can be used for constituting the vibrator as long as they have a high Q value (sharpness of resonance).

Figure 55:
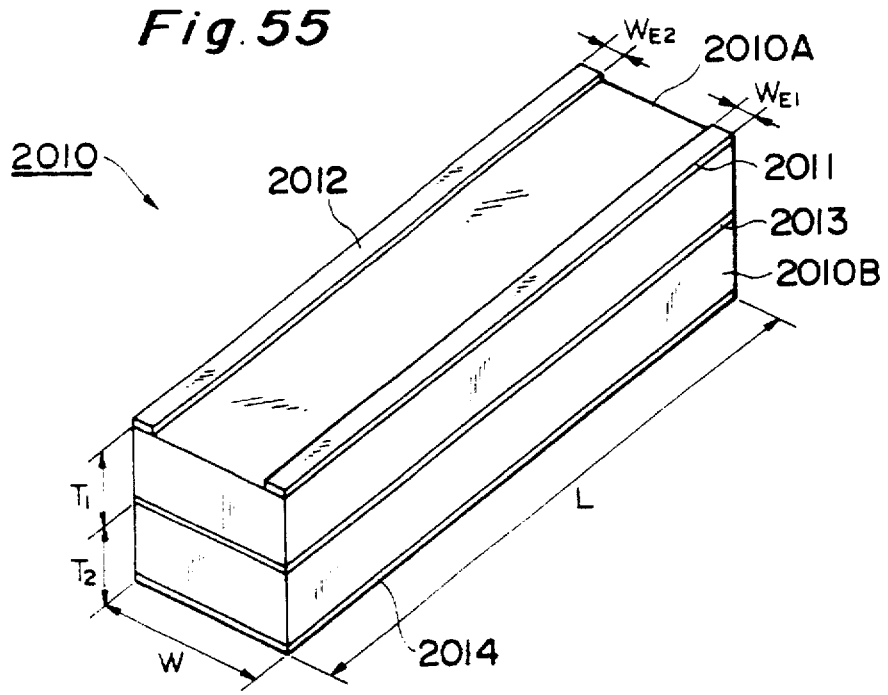
FIG. 55 is a perspective view showing a configuration of a vibrator 2010 shown in FIG. 54.
Figure 56:
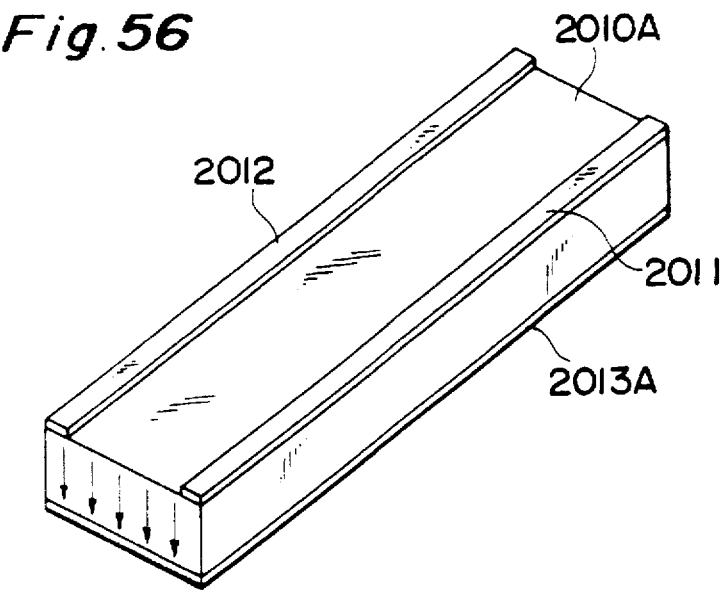
FIG. 56 is a perspective view showing a configuration of a piezoelectric member 2010A constituting the vibrator 2010 shown in FIG. 55.
Figure 57:
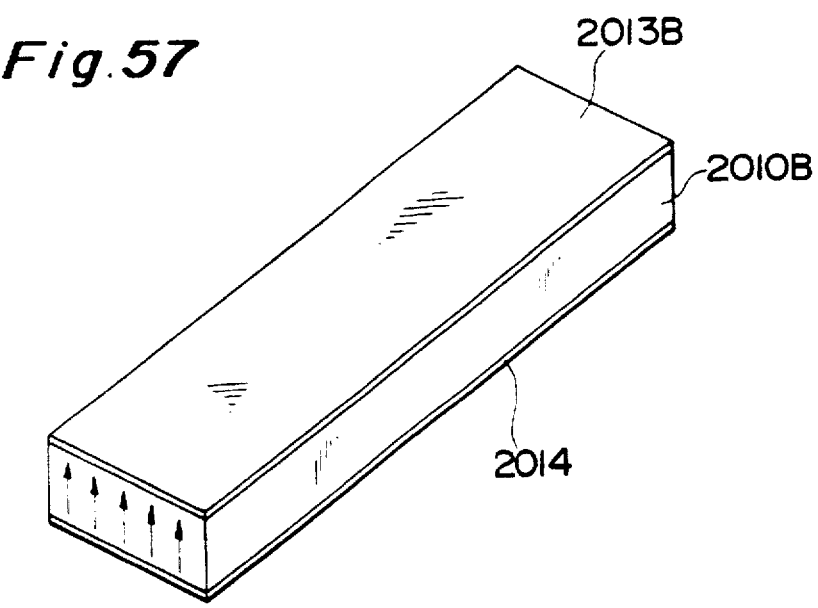
FIG. 57 is a perspective view showing a configuration of a piezoelectric member 2010B constituting the vibrator 2010 shown in FIG. 55.

FIG. 55 is a perspective view showing a configuration of the vibrator 2010 shown in FIG. 54. FIGS. 56 and 57 are perspective views respectively showing piezoelectric members 2010A and 2010B constituting the vibrator 2010. The piezoelectric members 2010A and 2010B are constituted by PZT. Each of the piezoelectric members 2010A and 2010B is a rectangular parallelopiped having a width (W) of 1.0 mm, a thickness ($T_1$, $T_2$) of 0.5 mm (i.e., having a rectangular cross section), and a length (L) of 9.0 mm. Also, the piezoelectric member 2010A is polarized in a direction from its upper surface to lower surface (thickness direction), whereas the piezoelectric member 2010B is polarized in a direction from its lower surface to upper surface. This polarizing processing may be effected after the vibrator is formed.

An electrode 2011 (third electrode) having a width $W_{E1}$ of 0.3 mm and an electrode 2012 (fourth electrode) having a width $W_{E2}$ of 0.3 mm are respectively formed at both ends of the upper surface of the piezoelectric member 2010A as silver paste is applied thereto in parallel to the longitudinal direction thereof. On the other hand, an electrode 2013A is formed on the lower surface (surface opposite to the upper surface) of the piezoelectric member 2010A. The electrode 2013A is formed as the whole lower surface of the piezoelectric member 2010A is coated with silver paste (FIG. 56).

On the upper surface of the piezoelectric member 2010B, an electrode 2013B is formed. This electrode 2013B is formed as the whole upper surface of the piezoelectric member 2010B is coated with silver paste. On the lower surface of the piezoelectric member 2010B, an electrode 2014 (second electrode) is formed. In a manner similar to the way the upper surface is formed, the electrode 2014 is formed as the whole lower surface of the piezoelectric member 2010B is coated with silver paste (FIG. 57).

As the lower surface of the piezoelectric member 2010A and the upper surface of the piezoelectric member 2010B are bonded together, the vibrator 2010 is constituted. As mentioned above, the silver-pasted electrodes 2013A and 2013B are respectively formed on the lower surface of the piezoelectric member 2010A and the upper surface of the piezoelectric member 2010B Microscopically, the surfaces of these electrodes 2013A and 2013B have many irregularities. When the piezoelectric members 2010A and 2010B are to be bonded together, in order to bring the protrusions on the electrode 2013A and those on the electrode 2013B into contact with each other, the layer of an adhesive therebetween has to be made thin. Accordingly, an epoxy adhesive having a low viscosity is used therefor. Between the piezoelectric member 2010A and the piezoelectric member 2010B, a single electrode 2013 (first electrode) constituted by the electrodes 2013A and 2013B is formed. Accordingly the electrode 2013 is exposed to the side surfaces of the vibrator 2010 so that contact can be made therewith from the outside.

This vibrator is constituted as the lower and upper surfaces of the respective piezoelectric members 2010A and 2010B, which have the same shape, are bonded together. The vertical cross section of each of the piezoelectric members 2010A and 2010B is rectangular such that the cross section of the vibrator 2010 constituted by thus bonded members becomes square. Accordingly, the normal frequencies of the vibrator 2010 in its width and thickness directions are equal to each other.

Alternatively, this vibrator 2010 may be constituted by piezoelectric members having rectangular cross sections with sizes different from each other. In this case, after the vibrator is constituted, the side surfaces of the vibrator are shaven with laser or the like, while the vibrator is vibrated, so as to adjust the normal frequencies of the vibrator in its width and thickness directions with respect to each other. As a result, the cross section of the vibrator 2010 becomes substantially square.

As shown in FIG. 54, first ends of thin conductors (leads) 2041 and 2042 are respectively soldered onto the electrodes 2011 and 2012, which are formed on the upper surface of the vibrator 2010, in the proximity of nodal point portions of the resonance vibration of the vibrator 2010. A thin conductor 2043 is soldered to the exposed portion of the electrode 2013, which is formed at the bonding surface between the piezoelectric members 2010A and 2010B, at a nodal point portion of the resonance vibration of the vibrator 2010. Also, a thin conductor 2044 is soldered onto the electrode 2014, which is formed on the lower surface of the vibrator 2010, at a nodal point portion of the vibration of the vibrator 2010. Accordingly, the vibration characteristic of the vibrator 2010 is not deteriorated due to the connection of the thin conductors 2041 to 2044 thereto. Here, as well as in the following embodiments, the thin conductors 2041 to 2044 may be soldered to any of nodal point portions of the resonance vibration of the vibrator 2010.

Second ends of the thin conductors (leads) 2041 and 2042 are connected to a non-depicted detection circuit so as to respectively transmit voltages generated at electrodes 2011 and 2012 to the detection circuit. The other end of the thin conductor 2044 is connected to a non-depicted oscillation circuit such that a driving AC voltage for subjecting the vibrator 2010 to bending vibration is transmitted from the oscillation circuit to the electrode 2014. The electrode 2013 is a reference electrode, while the thin conductor 2043 is used as a reference potential line.

Also, since deterioration of the vibration characteristic of the vibrator 2010 has to be minimized, the above-mentioned thin conductors 2041 to 2044 should not be highly elastic. Accordingly, they are constituted by a soft material which has been annealed upon heat treatment or the like.

Unlike supporting metal wires, the end surfaces of the columns 2021 and 2022 are bonded to the vibrator 2010, whereby their bonding areas have to be made larger than the welding areas of the supporting metal wires. Accordingly, if the columns 2021 and 2022 are constituted by highly rigid materials, the vibration characteristic of the vibrator 2010 will be deteriorated. Therefore, the columns 2021 and 2022 are composed of a silicone resin material which is an electrically insulating material having a rubber-like elasticity. Also, if an adhesive used when the columns 2021 and 2022 are bonded to the vibrator 2010 is a hard adhesive, the vibration characteristic of the vibrator 2010 will be deteriorated. Accordingly, a silicone adhesive having a relatively low modules of elasticity is used when the columns 2021 and 2022 are bonded to the vibrator 2010.

Figure 58:
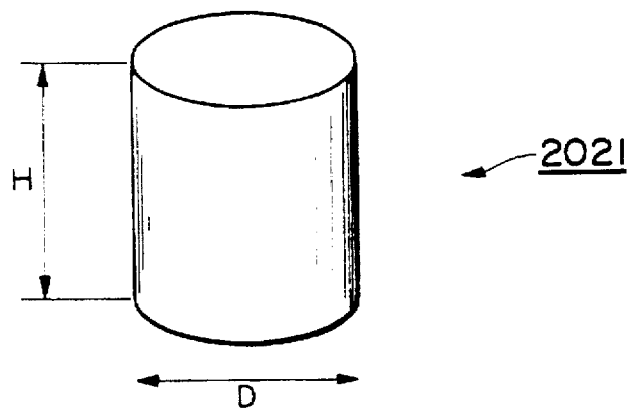
FIG. 58 is a perspective view showing a configuration of a column 2021 shown in FIG. 54.

FIG. 58 is a perspective view showing a configuration of the column 2021. The column 2021 is formed as a column whose horizontal cross section is a circle having a diameter D of 0.5 mm while its height H is 0.5 mm. Also, both end surfaces of the column 2021 are made flat so as to be easily bonded to the vibrator 2010 and the substrate 2020, respectively. The column 2022 is formed like the column 2021.

Next, the step for installing the columns 2021 and 2022 will be explained. Initially, first ends of the columns 2021 and 2022 are bonded to the substrate 2020 by a silicone adhesive, while being separated from each other by a nodal point distance of the resonance vibration of the vibrator 2010. Subsequently, the other end of each of the columns 2021 and 2022 is bonded to the bottom surface of the vibrator 2010 in the proximity of a nodal point portion thereof.

Accordingly, no welding processing is necessary for supporting the vibrator, whereby the piezoelectric vibrational angular velocity meter can have a further smaller size. Further, thermal denaturation of the piezoelectric member can be suppressed. Also, since each of the columns 2021 and 2022 supports the vibrator 2010 by a predetermined single surface alone, the space occupied by the columns 2021 and 2022 decreases such that the size of the piezoelectric vibrational angular velocity meter can be further reduced.

Here, in order to prevent the vibration characteristic of the vibrator 2010 from deteriorating, care must be taken so as to prevent the silicone adhesive, which is used when the vibrator is bonded to the columns 2021 and 2022, from projecting onto the bonding surface of the vibrator 2010.

In the following, the operation of the piezoelectric vibrational angular velocity meter 2001 shown in FIG. 54 will be explained. First, a driving AC voltage for bending vibration of the vibrator 2010 is applied to the electrode 2014 from the non-depicted oscillation circuit by way of the thin conductor 2044. Consequently, the vibrator 2010 is subjected to bending vibration in its thickness direction (direction of arrow Z).

In this case, when the piezoelectric vibrational angular velocity meter 2001 rotates around an axis X which is in the longitudinal direction of the vibrator 2010, Coriolis force is generated in the width direction (direction of arrow Y) of the vibrator 2010, thereby subjecting the vibrator 2010 to bending vibration in this direction. Then, a piezoelectric voltage due to the bending vibration of the vibrator 2010 in the direction of arrow Y (piezoelectric voltage due to Coriolis force) is generated at each of the electrodes 2011 and 2012. The piezoelectric voltages respectively generated at the electrodes 2011 and 2012 due to the bending vibration of the vibrator 2010 in the direction of arrow Y have the same amplitude, while their phases are opposite to each other. Namely, when the piezoelectric voltage generated at the electrode 2011 due to the bending vibration in the direction of arrow Y is +(−)A, the piezoelectric voltage generated at the electrode 2012 due to the bending vibration in the direction of arrow Y becomes −(+)A. Also, at this time, piezoelectric voltages having the same amplitude and phase are respectively generated at the electrodes 2011 and 2012 due to the bending vibration of the vibrator 2010 in the direction of arrow Z.

The piezoelectric voltages generated at the electrodes 2011 and 2012 are input into the non-depicted detection circuit by way of the thin conductors 2041 and 2042, respectively. Then, when the differential between these two piezoelectric voltages are determined, the piezoelectric voltage due to the Coriolis force alone can be taken out as being doubled, whereby the rotational angular velocity can be detected.

Figure 59:
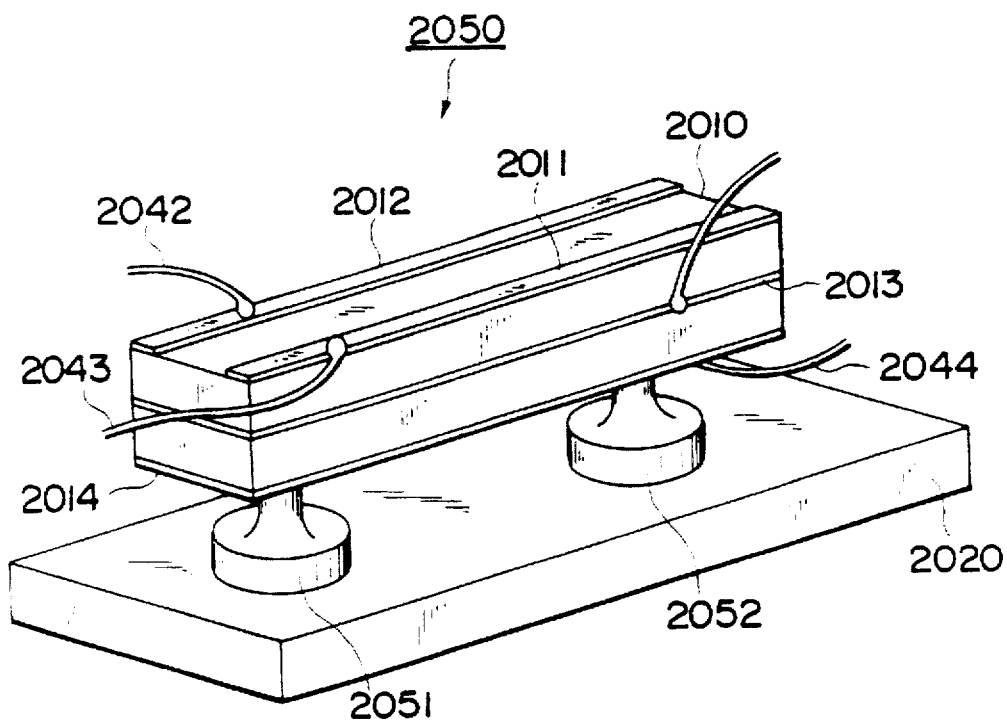
FIG. 59 is a perspective view showing a piezoelectric vibrational angular velocity meter of another embodiment.

FIG. 59 is a perspective view of a piezoelectric vibrational angular velocity meter 2050 of another embodiment. While the basic configuration of the piezoelectric vibrational angular velocity meter 2050 is similar to that of the piezoelectric vibrational angular velocity meter 2001 shown in FIG. 54, columns 2051 and 2052 for supporting the vibrator 2010 are configured differently therefrom.

Figure 60:
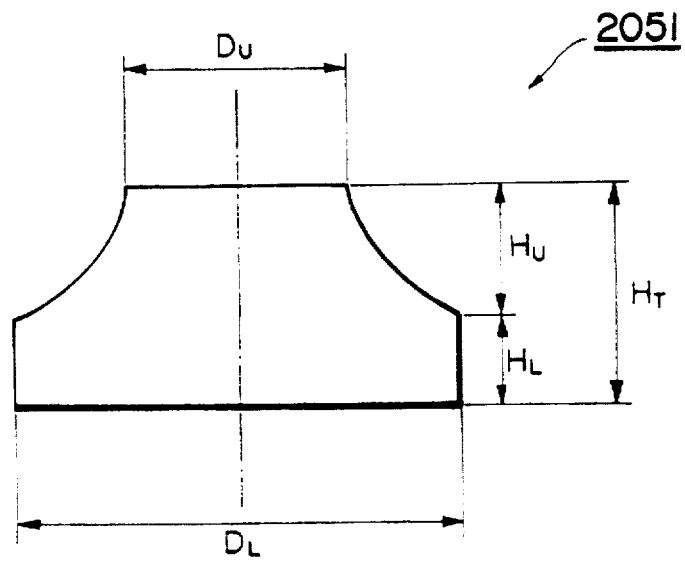
FIG. 60 is a side view showing a configuration of a column 2051 shown in FIG. 59.
Figure 61:
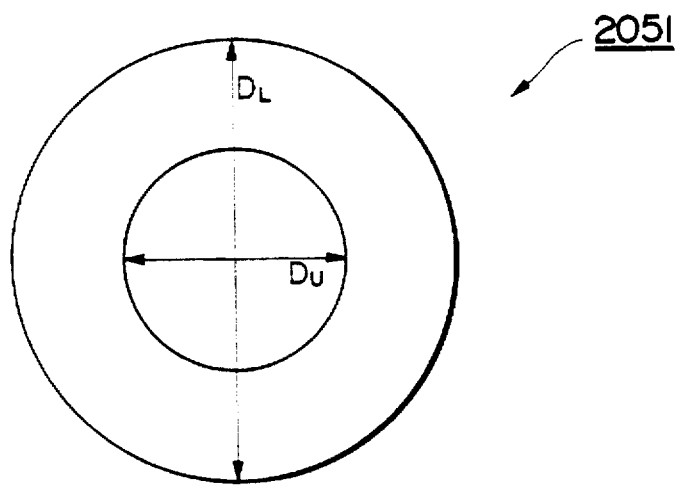
FIG. 61 is a plan view showing a configuration of the column 2051 shown in FIG. 59.

FIG. 60 is a side view of the column 2051 shown in FIG. 59, whereas FIG. 61 is a plan view thereof observed from just thereabove. The column 2051 is constituted by a silicone resin as in the case of the column 2021 shown in FIG. 58, while its lower portion formed like a cylinder and upper portion formed like a truncated cone are integrally molded together. The truncated cone of the upper portion has a convex cross section. The upper end surface of the column 2051 bonded to the vibrator 2010 by means of a silicone adhesive is a circle having a diameter $D_U$ of 0.5 mm, whereas its lower end surface bonded to the substrate 2020 by means of a silicone adhesive is a circle having a diameter $D_L$ of 1.0 mm. The cylinder in the lower portion of the column 2051 has a height $H_L$ of 0.2 mm, whereas the truncated cone of its upper portion has a height $H_L$ of 0.3 mm, whereby the column 2051 has a height $H_T$ of 0.5 mm. Here, the form of the column 2052 is similar to that of the column 2051.

The columns 2051 and 2052 are bonded to the substrate 2020 by a larger area as compared with the columns 2021 and 2022 shown in FIG. 54, thereby improving the reliability in vibration characteristic of the vibrator 2010.

Figure 62:
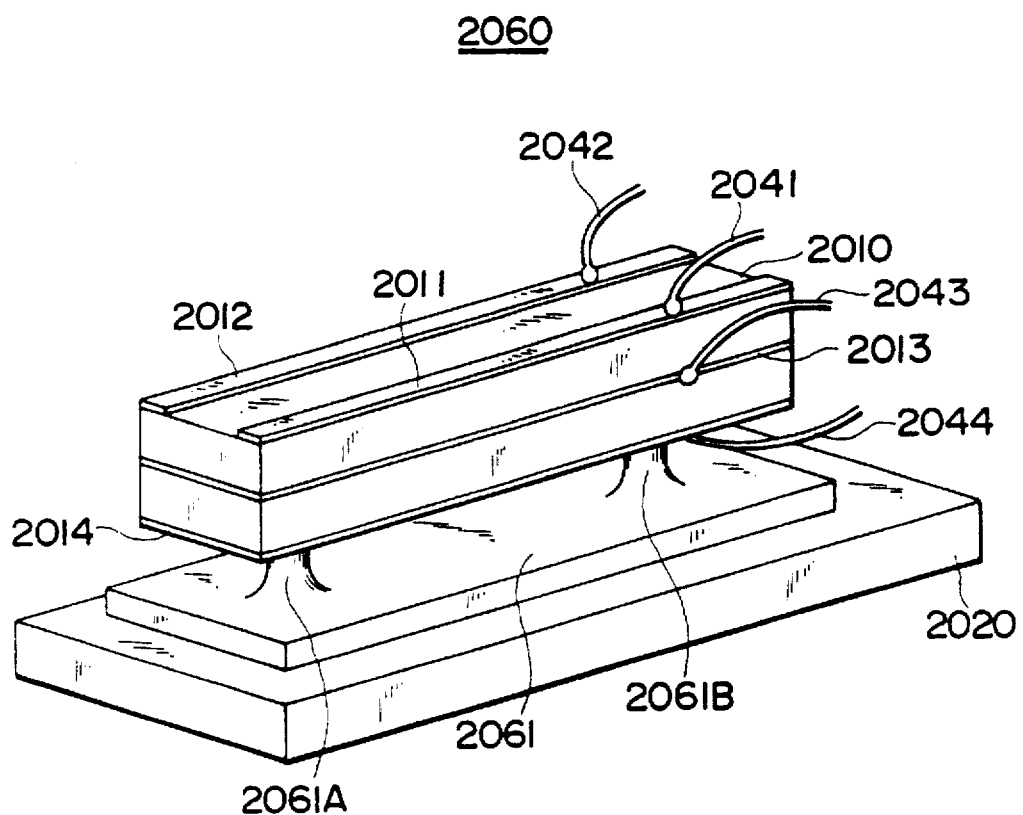
FIG. 62 is a perspective view showing a piezoelectric vibrational angular velocity meter of another embodiment.

FIG. 62 is a perspective view of a piezoelectric vibrational angular velocity meter 2060 of another embodiment. While the basic configuration of the piezoelectric vibrational angular velocity meter 2060 is similar to the piezoelectric vibrational angular velocity meter 2001 shown in FIG. 54, a supporting member 2061 for supporting the vibrator 2010 is configured differently therefrom.

The supporting member 2061 is constituted by a silicone resin, such that columnar portions 2061A and 2061B are integrally molded on an upper portion of a rectangular parallelopiped member which functions as a substrate. Each of the columnar portions 2061A and 2061B are formed like the column 2021 shown in FIG. 58. Also, the distance between the positions at which the columnar portions 2061A and 2061B are disposed is equal to the nodal point distance of the vibrator 2010 at the time of vibration thereof. The bottom surface of the rectangular parallelopiped member, as the substrate for the supporting member 2061, is bonded to the substrate 2020 by means of a silicone adhesive. Each of the upper end surfaces of the columnar portions 2061A and 2061B is connected to the supporting member 2010 by means of a silicone adhesive at a nodal point portion of the resonance vibration.

In the piezoelectric vibrational angular velocity meter 2060, the supporting portions 2061A and 2061B directly supporting the vibrator 2010 are not directly bonded to the substrate but integrally formed with the rectangular parallelopiped member which functions as the substrate for the supporting portions 2061A and 2061B. Since the bottom surface of this rectangular parallelopiped member is bonded to the substrate 2020, the bonding area becomes larger, thereby further improving the reliability in vibration characteristic of the vibrator 2010. Also, since the distance between the positions at which the supporting portions 2061A and 2061B are disposed is determined at the time of forming the supporting member 2061, the vibrator 2010 can be securely supported at nodal point portions of its resonance vibration.

Figure 63:
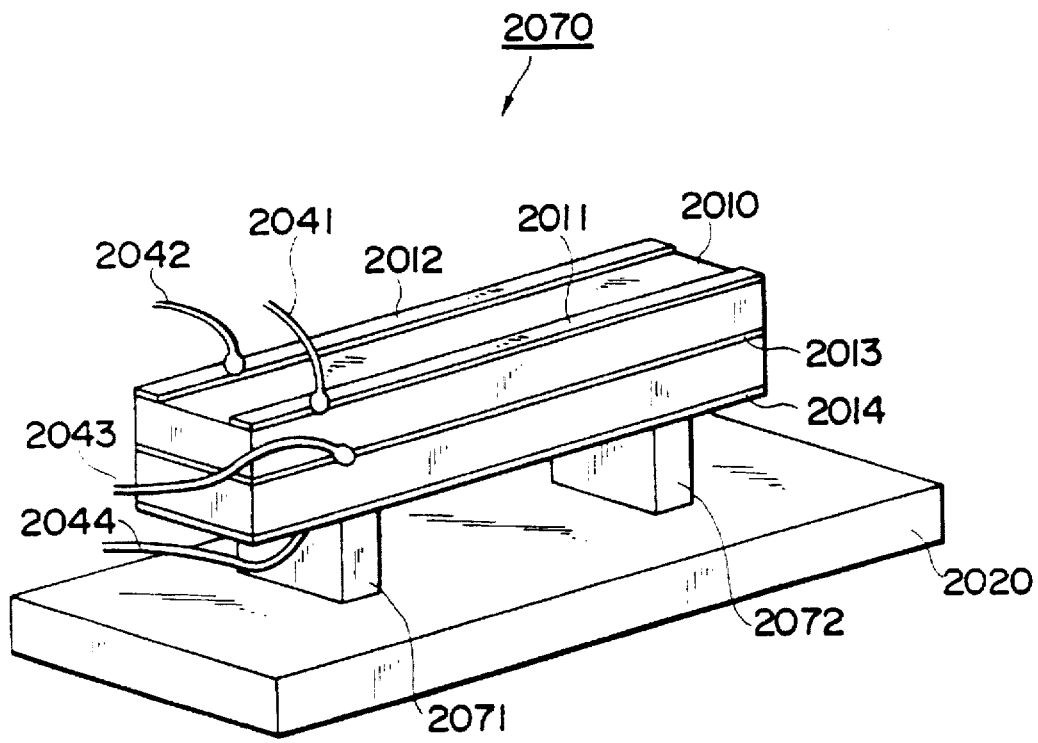
FIG. 63 is a perspective view showing a piezoelectric vibrational angular velocity meter of another embodiment.

FIG. 63 is a perspective view showing a piezoelectric vibrational angular velocity meter 2070 of another embodiment. While the basic configuration of the piezoelectric vibrational angular velocity meter 2070 is similar to the piezoelectric vibrational angular velocity meter 2001 shown in FIG. 54, supporting members 2071 and 2072 are configured differently therefrom.

Figure 64:
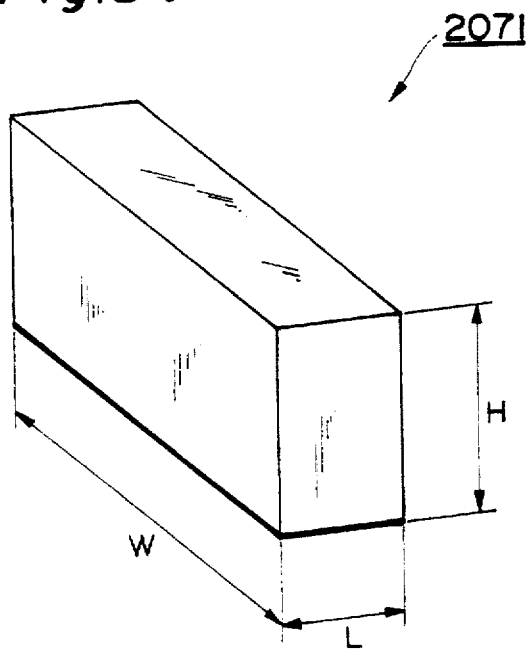
FIG. 64 is a perspective view showing a configuration of a supporting member 2071 shown in FIG. 63.
Figure 103:
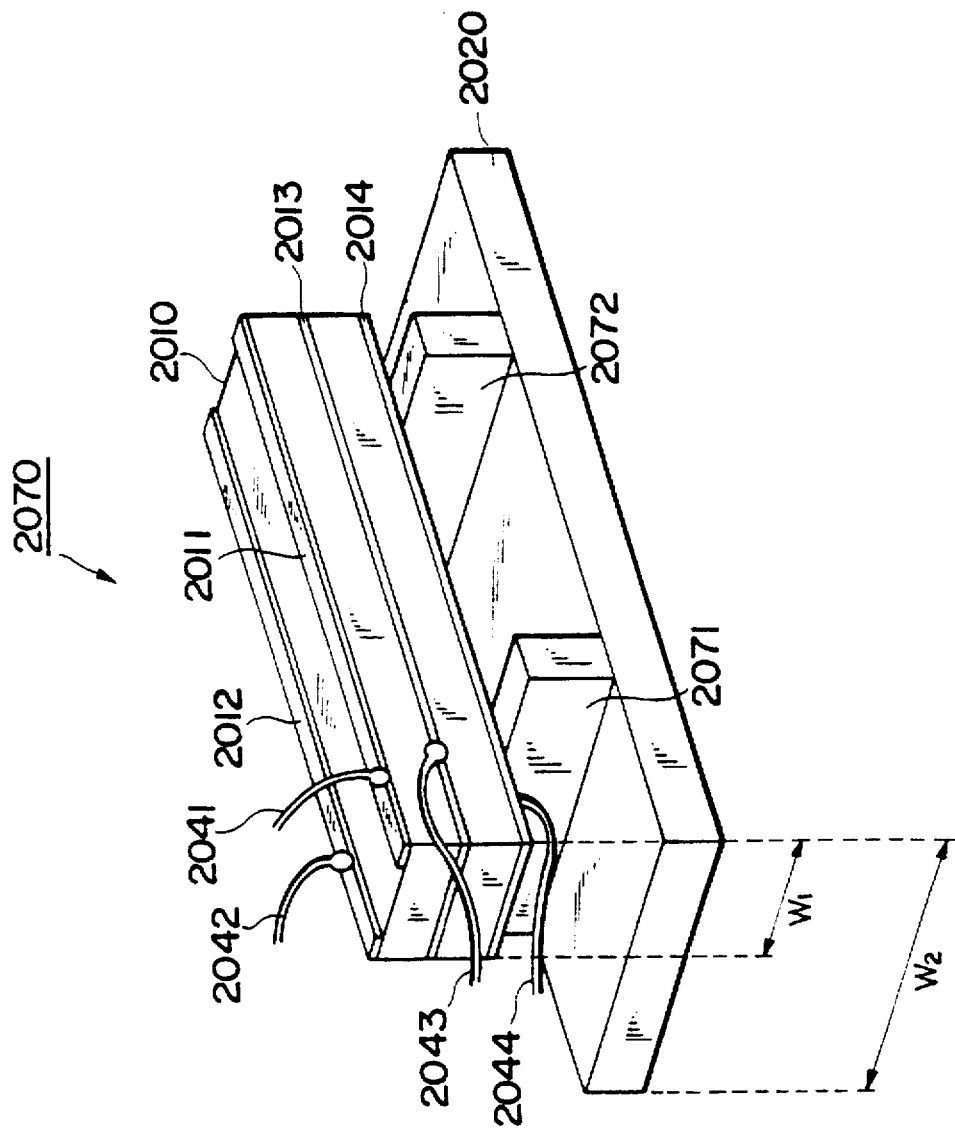

FIG. 64 is a perspective view showing in configuration of the supporting member 2071 shown in FIG. 63. The supporting member 2071 is formed as a rectangular parallelopiped having a rectangular cross section, in which one side has a length W of 1.0 mm and the other side has a length L of 0.3 mm, with a height H of 0.5 mm. Also, as shown in FIG. 103, the supporting member 2071 may have a width $W_2$ which is larger than width $W_1$ of the vibrator 2010. Here, the width $W_2$ of the supporting member 2071 is equal to the width of the substrate 2020. In the case where such a configuration is to be formed, initially, a plurality of long supporting members are disposed in parallel to each other on a substrate having a large area and then bonded thereto so as to form an intermediate for supporting members. Subsequently, this intermediate is cut along a direction perpendicular to the longitudinal direction of the supporting members. Thereafter, the substrate for the intermediate is cut along a direction parallel to the longitudinal direction of thus cut supporting member such that a set of supporting members remain on the substrate. In this manner, the side surfaces of the supporting members and those of the substrate can be simultaneously formed. Here, the form of the supporting member 2072 is similar to that of the supporting member 2071.

Each of the upper end surfaces of the supporting members 2071 and 2072 is bonded to the vibrator 2010 in the proximity of a nodal point portion of the resonance vibration of the vibrator 2010 by a silicone adhesive, whereas their lower end surfaces are bonded to the substrate 2020 by a silicone adhesive. In this case, one side of the rectangular upper end surface of each of the supporting members 2071 and 2072 bonded to the vibrator 2010 has a length W of 1.0 mm which substantially coincides with the width (W=1.0 mm) of the vibrator 2010. Accordingly, the vibrator 2010 is supported by the supporting members 2071 and 2072 at nodal point portions of its resonance vibration over the whole width thereof. Thus, since the vibrator 2010 is supported with a high supporting capacity, its vibration characteristic is improved.

Here, the thin conductors 2041 to 2044 are respectively soldered onto the electrodes 2011 to 2014 near nodal point portions of the resonance vibration of the vibrator 2010. Also, since the supporting members 2071 and 2072 support the vibrator 2010 over its whole width, they should have a notch for securing a position to which the thin conductor 2044 for transmitting a driving AC voltage to the electrode 2014 is soldered.

Figure 65:
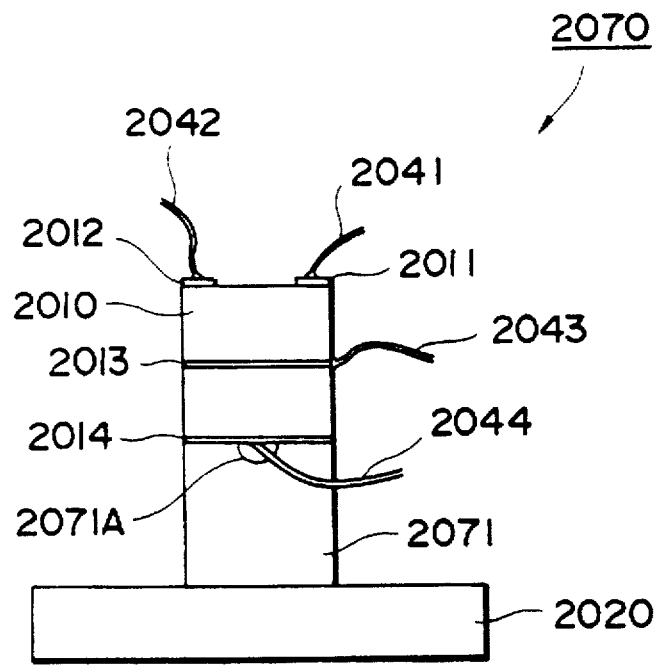
FIG. 65 is a front view of a piezoelectric vibrational angular velocity meter 2070 shown in FIG. 63.
Figure 66:
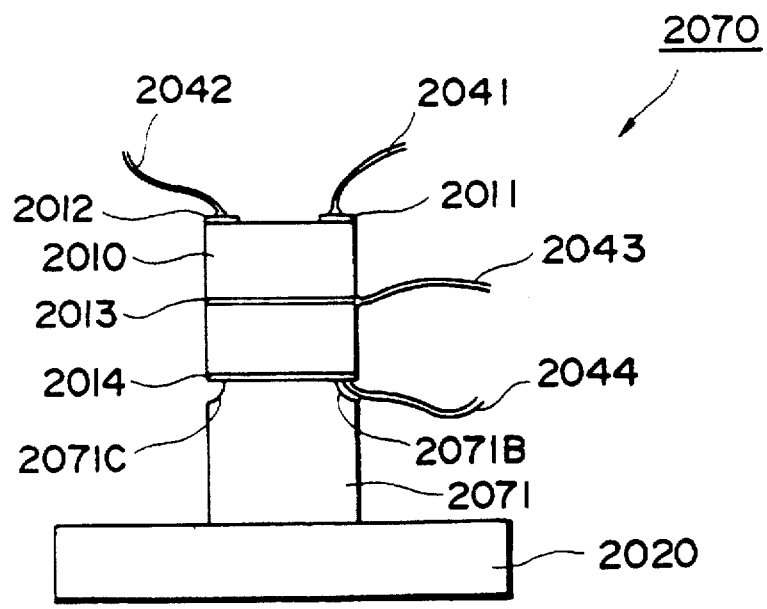
FIG. 66 is a front view of a piezoelectric vibrational angular velocity meter 2070 shown in FIG. 63.

FIG. 65 is a front view of the piezoelectric vibrational angular velocity meter 2070 shown in FIG. 63. Here, the supporting member 2071 has a notch 2071A at which the thin conductor 2044 is soldered to the electrode 2014. Also, FIG. 66 is a front view of the piezoelectric vibrational angular velocity meter 2070 shown in FIG. 63, in which the supporting member 2071 has notches 2071B and 2071C respectively at both ends of its vibrator bonding portion. At the place where this notch 2071B is formed, the thin conductor 2044 is soldered to the electrode 2014.

Figure 67:
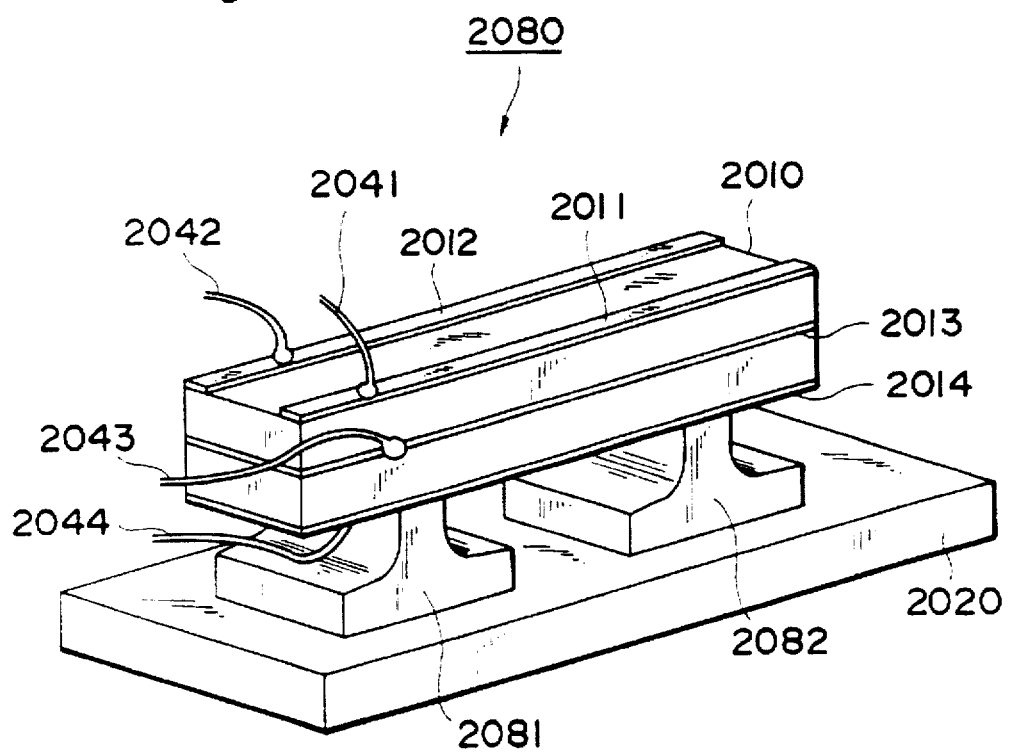
FIG. 67 is a perspective view showing a piezoelectric vibrational angular velocity meter of another embodiment.

FIG. 67 is a perspective view showing a piezoelectric vibrational angular velocity meter 2080 of another embodiment. While the basic configuration of the piezoelectric vibrational angular velocity meter 2080 is similar to the piezoelectric vibrational angular velocity meter 2001 shown in FIG. 54, supporting members 2081 and 2082 are configured differently therefrom.

Figure 68:
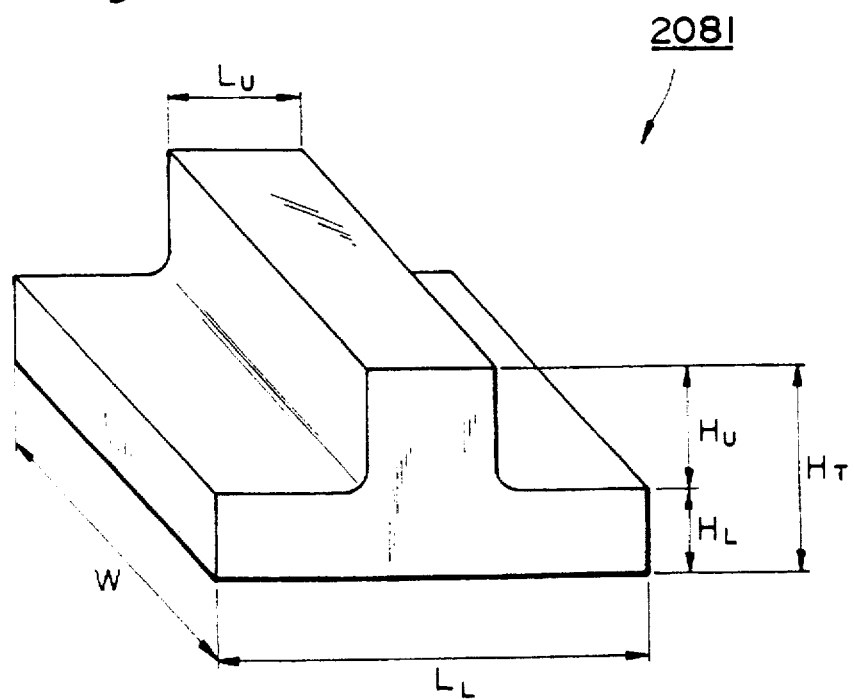
FIG. 68 is a perspective view showing a configuration of a supporting member 2081 shown in FIG. 67.

FIG. 68 is a perspective view showing a configuration of a supporting member 2081. The upper portion of the supporting member 2081 is a rectangular parallelopiped having a rectangular horizontal cross section, in which one side has a length W of 1.0 mm and the other side has a length $L_U$ of 0.3 mm, with a height $H_U$ of 0.3 mm. On the other hand, its lower portion is integrally molded with the upper rectangular parallelopiped portion as a rectangular parallelopiped having a square cross section, whose each side has a length $L_L$ of 1.0 mm, with a height $H_L$ of 0.2 mm so as to function as a substrate for the supporting member 2081. Accordingly, this supporting member 2081 has a height $H_T$ of 0.5 mm.

Here, the form of the supporting member 2082 is similar to the form of the supporting member 2081.

Each of the upper end surfaces of the supporting members 2081 and 2082 is bonded to the vibrator 2010 in the proximity of a nodal point portion of the resonance vibration of the vibrator 2010 by a silicone adhesive, whereas their lower end surfaces are bonded to the substrate 2020 by a silicone adhesive. Since the bonding area of the supporting members 2081 and 2082 to the substrate 2020 is larger than that of the supporting members 2071 and 2072 shown in FIG. 63, the reliability in vibration characteristic of the vibrator 2010 is improved.

Also, in this embodiment, in order to solder the thin conductor 2044 to the electrode 2014 of the vibrator 2010, the vibrator bonding portion of the supporting member 2081 or 2082 is subjected to the notch-forming process shown in FIG. 65 or 66.

Figure 69:
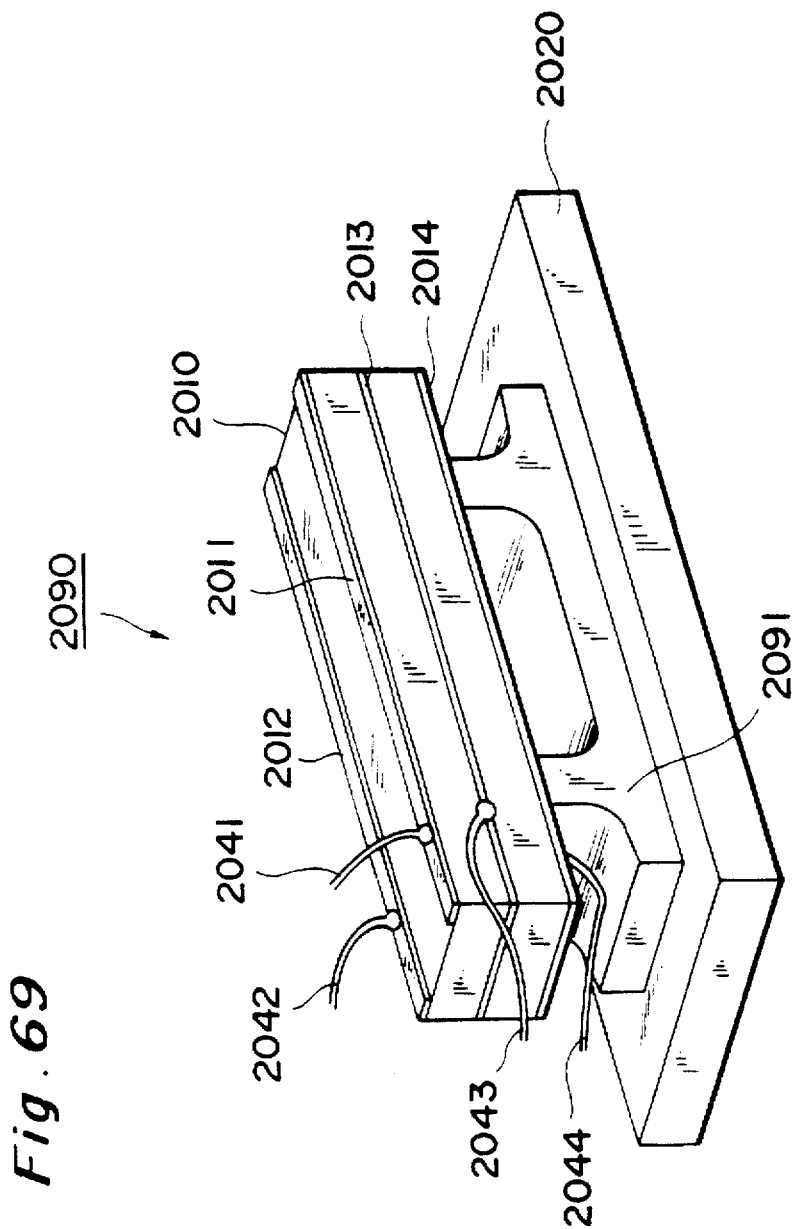
FIG. 69 is a perspective view showing a piezoelectric vibrational angular velocity meter of another embodiment.

FIG. 69 is a perspective view showing a piezoelectric vibrational angular velocity meter 2090 of another embodiment. While the basic configuration of the piezoelectric vibrational angular velocity meter 2090 is similar to the piezoelectric vibrational angular velocity meter 2001 shown in FIG. 54, a supporting member 2091 is configured differently therefrom.

The basic form of the supporting member 2091 is similar to the forms of the supporting members 2081 and 2082 shown in FIG. 67, while the rectangular parallelepipeds constituting the lower portions of the supporting members 2081 and 2082 are united together. When the supporting member 2091 is configured in this manner, the distance between the positions at which the two upper parallelopiped portions directly supporting the nodal points of the vibrator 2010 upon its vibration is determined beforehand at the time of forming the supporting member. Accordingly, the supporting member 2091 can securely support the vibrator 2010 in the proximity of nodal point portions of the resonance vibration thereof.

In the piezoelectric vibrational angular velocity meter of the present invention, the vibrator can be configured differently from the foregoing embodiments.

Figure 70:
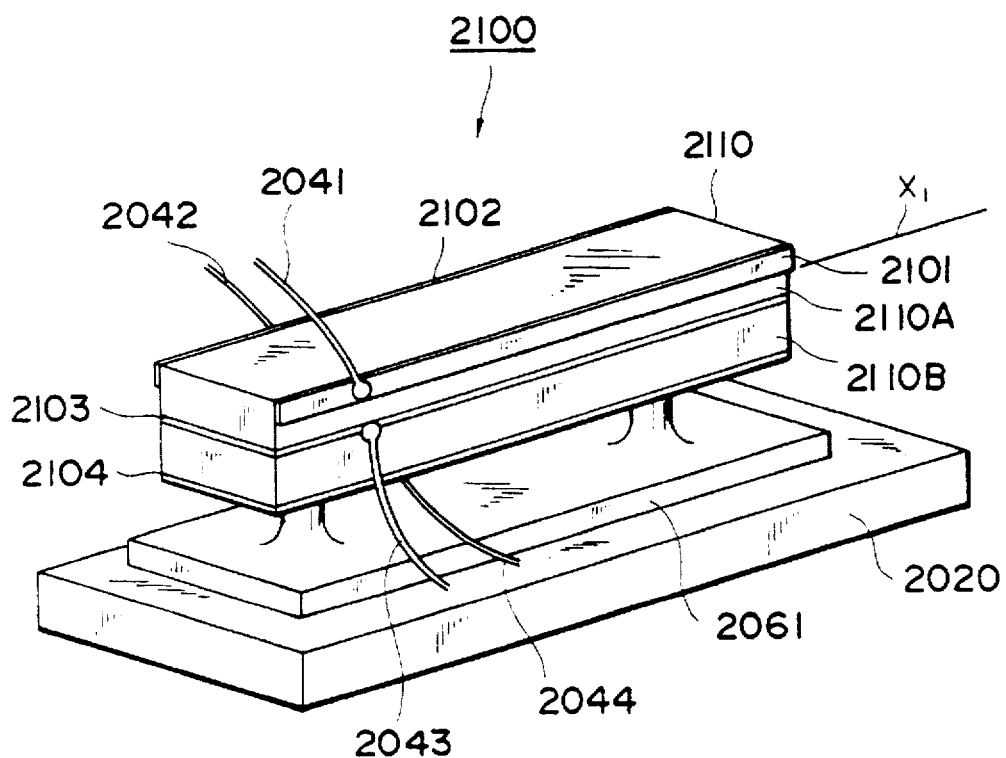
FIG. 70 is a perspective view showing a piezoelectric vibrational angular velocity meter of another embodiment.

FIG. 70 is a perspective view showing a piezoelectric vibrational angular velocity meter 2100 of another embodiment. While the basic configuration of the piezoelectric vibrational angular velocity meter 2100 is similar to the piezoelectric vibrational angular velocity meter 2060 shown in FIG. 62, a vibrator 2110 is configured differently therefrom.

Figure 71:
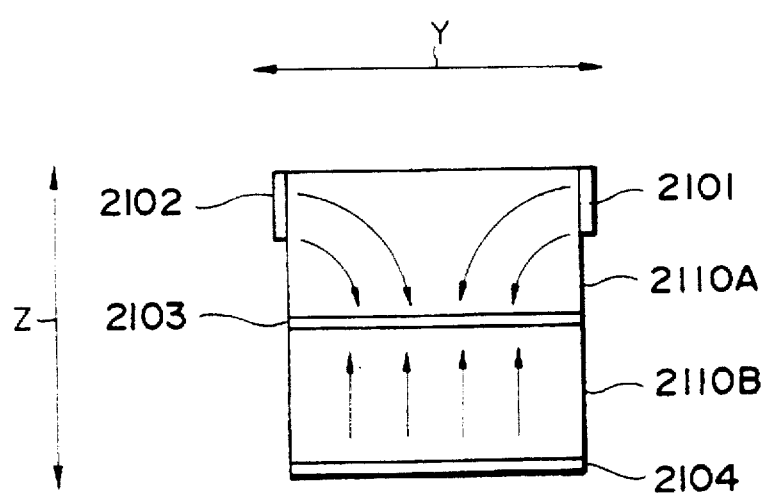
FIG. 71 is a front view of a vibrator 2110 shown in FIG. 70.

FIG. 71 is a front view of the vibrator 2110. While the vibrator 2110 has basic configuration and sizes similar to those of the vibrator 2010 shown in FIGS. 55 to 57, positions at which its electrodes are formed are arranged differently therefrom. The whole lower surface of a piezoelectric member 2110A is coated with silver paste, while the whole upper and lower surfaces of a piezoelectric member 2110B are coated with silver paste. As the lower surface of the piezoelectric member 2110A and the upper surface of the piezoelectric member 2110B are bonded together by means of an epoxy adhesive, the vibrator 2110 is constituted. Namely, an electrode 2103 is formed at the bonding surface between the piezoelectric members 2110A and 2110B, whereas an electrode 2104 is formed on the lower surface of the piezoelectric member 2110B.

Also, each of electrodes 2101 and 2102 is formed by silver paste, with a width W of 0.3 mm, on an upper portion of a side surface of the piezoelectric member 2110A constituting the upper portion of the vibrator 2110 in parallel to the longitudinal direction of the vibrator 2110.

These piezoelectric members 2110A and 2110B are not polarized beforehand but have to be subjected to a polarizing processing, after their electrodes are formed, with a voltage being applied between these electrodes. Accordingly, while using the electrode 2103 as a reference, voltages are respectively applied to the electrodes 2101, 2102, and 2104 so as to effect polarization.

When a driving AC voltage is applied to the electrode 2104, the vibrator 2110 is subjected to bending vibration in the vertical direction (direction of arrow Z in FIG. 71). At this time, when the piezoelectric vibrational angular velocity meter 2100 rotates around an axis X, Coriolis force is generated in the direction of arrow Y, whereby the vibrator 2110 is subjected to bending vibration in the direction of arrow Y. At this time, piezoelectric voltages having opposite phases and identical amplitudes are generated at the electrodes 2101 and 2102 due to the Coriolis force and then output to a non-depicted detection circuit by way of the thin conductors 2041 and 2042, respectively. Then, when the differential between these voltages are determined, the piezoelectric voltage due to the Coriolis force can be detected as being doubled, whereby the rotational angular velocity of the piezoelectric vibrational velocity meter 2100 can be detected.

Though the vibrator 2110 is supported by the supporting member 2061, any of the columns 2021 and 2022, columns 2051 and 2052, supporting members 2071 and 2072, supporting members 2081 and 2082, and supporting member 2091 may support the vibrator 2110.

Figure 72:
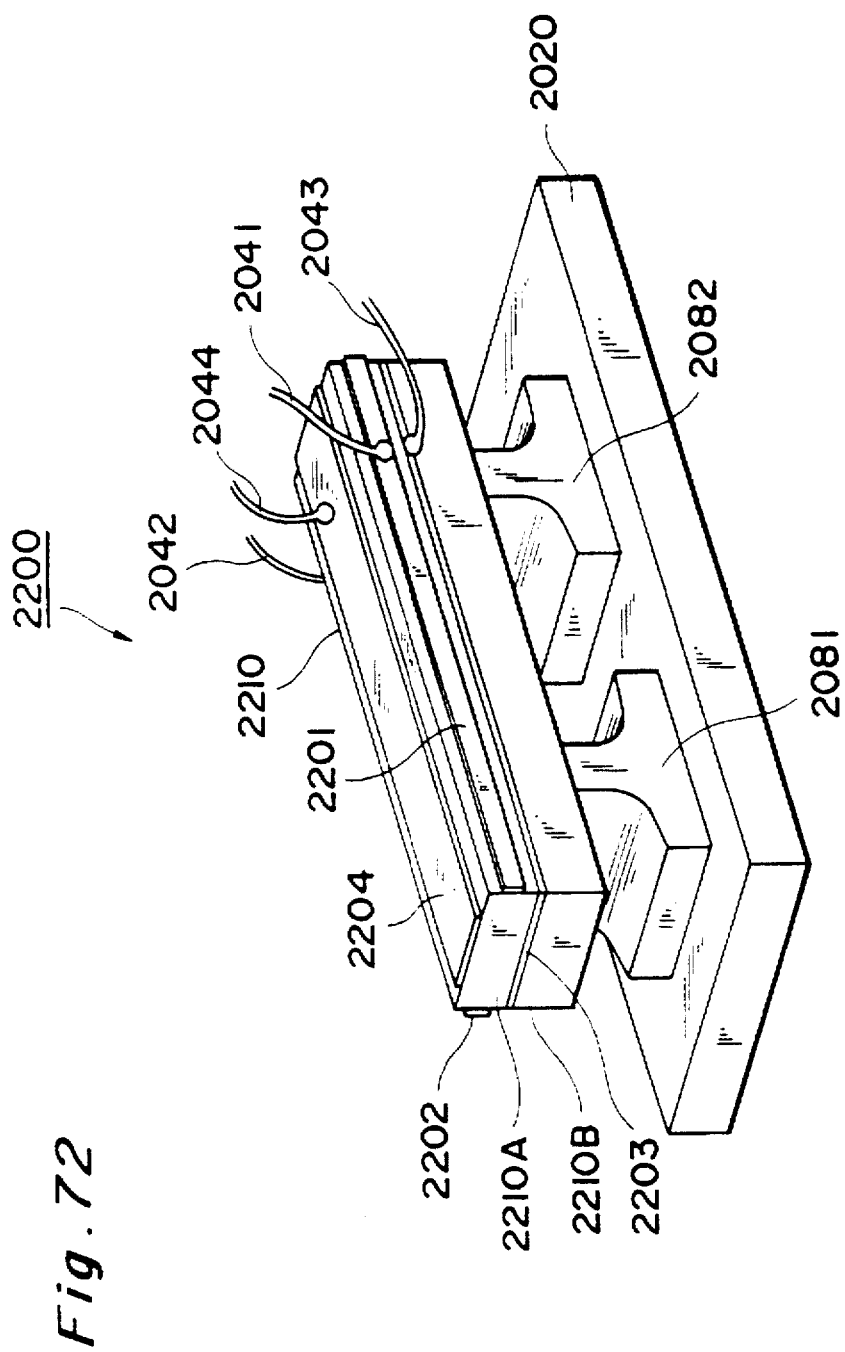
FIG. 72 is a perspective view showing a piezoelectric vibrational angular velocity meter of another embodiment.

FIG. 72 is a perspective view showing a piezoelectric vibrational angular velocity meter 2200 of another embodiment. While the basic configuration of the piezoelectric vibrational angular velocity meter 2200 is similar to the piezoelectric vibrational angular velocity meter 2080 shown in FIG. 67, a vibrator 2210 is configured differently therefrom.

Figure 73:
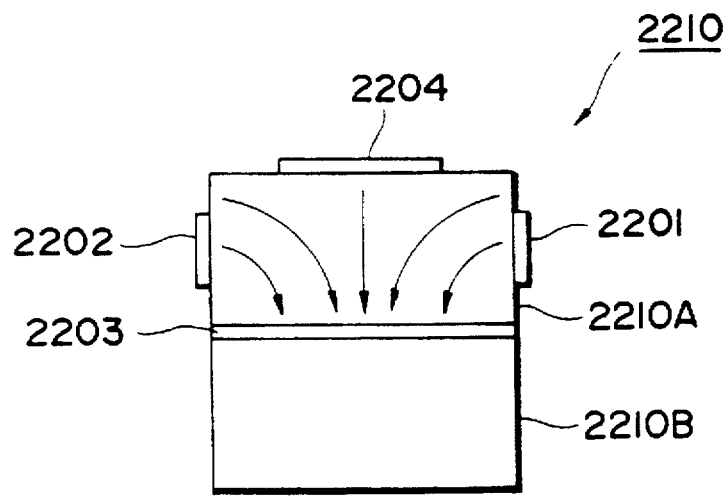
FIG. 73 is a front view of a vibrator shown in FIG. 72.
Figure 74:
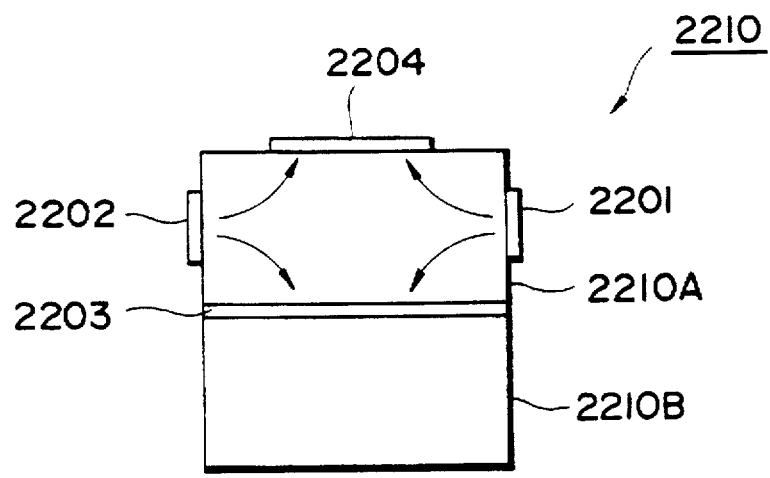
FIG. 74 is a front view of the vibrator shown in FIG. 72.

FIGS. 73 and 74 are front views of the vibrator 2210. While the vibrator 2210 has basic configuration and sizes similar to those of the vibrator 2010 shown in FIGS. 55 to 57, positions at which its electrodes are formed are arranged differently therefrom. The whole lower surface of a piezoelectric member 2210A is coated with silver paste, while the whole upper surface of a piezoelectric member 2110B is coated with silver paste. As the lower surface of the piezoelectric member 2210A and the upper surface of the piezoelectric member 2210B are bonded together by means of an epoxy adhesive, the vibrator 2210 is constituted. Namely, an electrode 2203 is formed at the bonding surface between the piezoelectric members 2210A and 2210B.

Also, an electrode 2204 is formed by silver paste, with a predetermined width, coated on the upper surface of the piezoelectric member 2210A. Electrodes 2201 and 2202 are formed by silver paste coated on center portions of both side surfaces of the piezoelectric member 2201A, respectively. Here, the whole upper surface of the piezoelectric member 2201A may be coated with silver paste so as to form the electrode 2204.

These piezoelectric members 2210A and 2210B are not polarized beforehand but have to be subjected to polarizing processing, after their electrodes are formed, with a voltage being applied between the electrodes. Accordingly, while using the electrode 2203 as a reference, voltages are respectively applied to the electrodes 2201, 2202, and 2204 so as to effect polarization (FIG. 73). Alternatively, while using the electrodes 2203 and 2204 as references, voltages may be applied to the electrodes 2201 and 2202 so as to effect polarization (FIG. 74). In this case, the piezoelectric member 2210B constituting the lower portion of the vibrator 2210 is piezoelectrically inactive. Accordingly, the piezoelectric member 2210B may be constituted by a ceramic material other than piezoelectric materials as well.

Also, the thin conductors 2041 to 2044 are respectively soldered to the electrodes 2201 to 2204 formed on the piezoelectric member 2210A constituting the upper portion of the vibrator 2210. Accordingly, in this embodiment, notches such as those shown in FIGS. 65 and 66 do not have to be formed in the supporting members 2081 and 2082.

Though the vibrator 2110 is supported by the supporting members 2081 and 2082, any of the columns 2021 and 2022, columns 2051 and 2052, supporting member 2061, supporting members 2071 and 2072, and supporting member 2091 may support the vibrator 2210.

Figure 75:
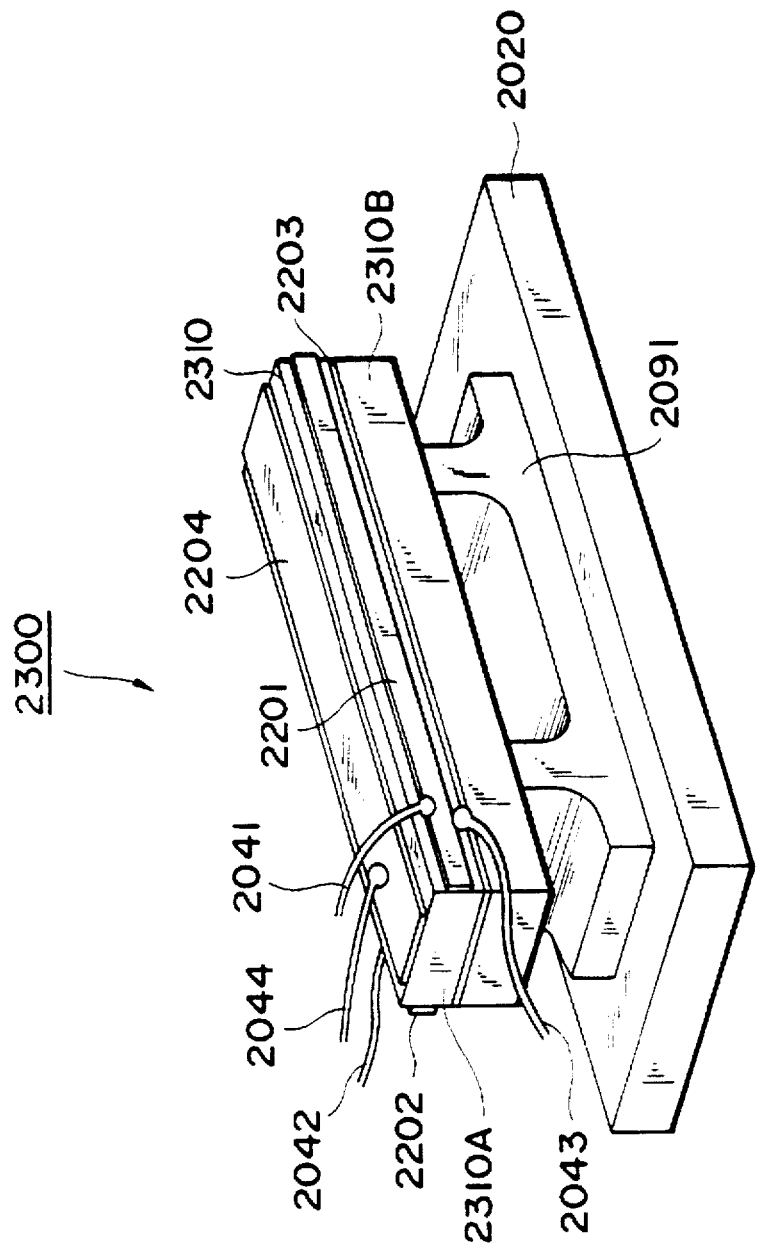
FIG. 75 is a perspective view showing a piezoelectric vibrational angular velocity meter of another embodiment.

FIG. 75 is a perspective view showing a piezoelectric vibrational angular velocity meter 2300 of another embodiment. While the basic configuration of the piezoelectric vibrational angular velocity meter 2300 is similar to the piezoelectric vibrational angular velocity meter 2080 shown in FIG. 67, a vibrator 2310 is configured differently therefrom.

The configuration of a piezoelectric member 2310A constituting the upper portion of the vibrator 2310 is similar to the piezoelectric member 2210A constituting the upper portion of the vibrator 2210 shown in FIG. 72 or 73, whereas the lower portion of the vibrator 2310 is constituted by a metal member 2310B composed of phosphor bronze or the like so as to be piezoelectrically inactive.

Accordingly, also in this case, no notch has to be formed at the surface of the supporting member 2091 bonded to the vibrator 2301.

Since the piezoelectric member 2310A and the metal member 2310B have densities different from each other, normal frequencies of the vibrator 2310 in the width and thickness directions thereof have to be matched with respect to each other. Accordingly, as mentioned above, their cross sections are processed into desired forms by means of laser or the like.

Though the vibrator 2110 is supported by the supporting member 2091, any of the columns 2021 and 2022, columns 2051 and 2052, supporting member 2061, supporting members 2071 and 2072, and supporting members 2081 and 2082 may support the vibrator 2310.

Also, in the foregoing embodiments, in the case where one end of a thin conductor is soldered to the vibrator at one nodal point portion thereof, when a wiring terminal for connecting the other end of the thin conductor is additionally provided, the piezoelectric vibrational angular velocity meter can have a further smaller size.

Though each electrode is formed by silver paste in the foregoing embodiments, it may be formed as a nickel electrode by electroless plating. Also, it may be formed as an aluminum electrode by vacuum deposition, sputtering, or the like.

The above-mentioned piezoelectric vibrational angular velocity meter in which the supporting member for supporting the columnar vibrator is fixedly bonded to the columnar vibrator at a nodal point portion of its resonance vibration can have a size smaller than that without it.

Figure 76:
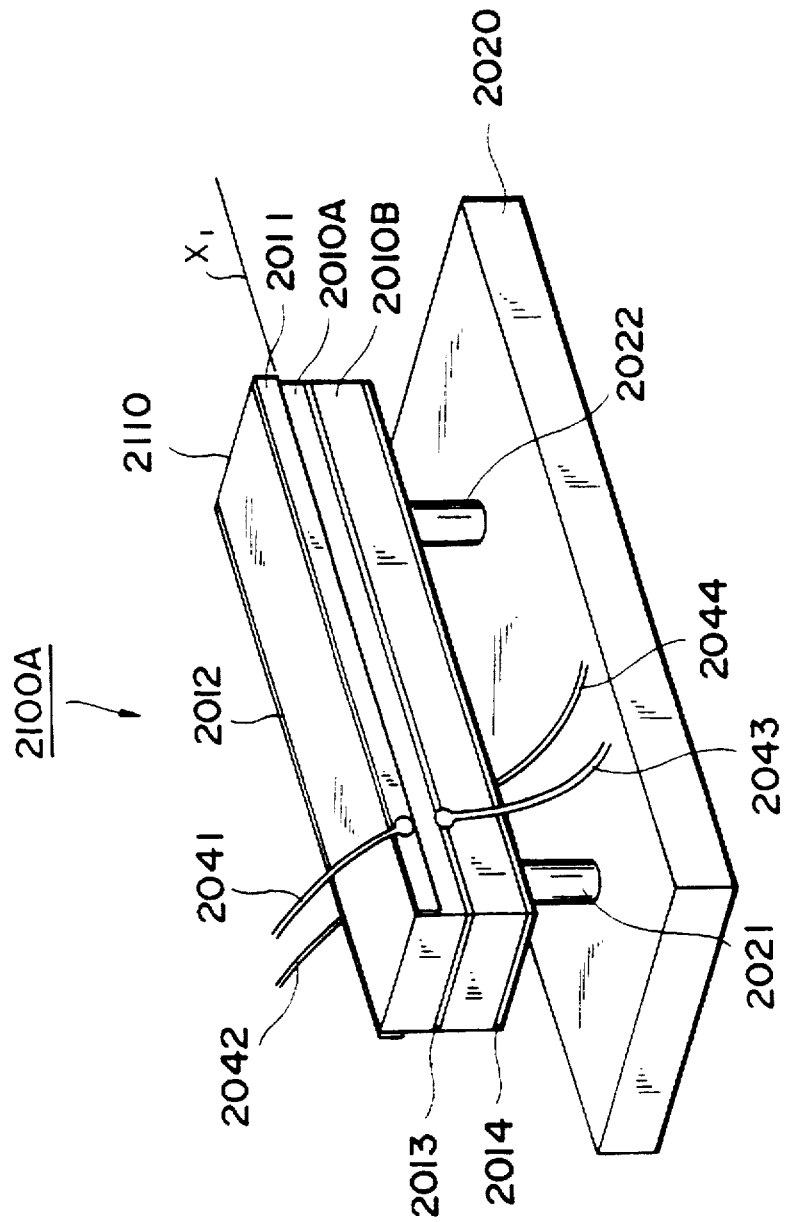
FIG. 76 is a perspective view showing a piezoelectric vibrational angular velocity meter of another embodiment.

FIG. 76 is a perspective view showing a piezoelectric vibrational angular velocity meter 2100A of another embodiment. While the basic configuration of the piezoelectric vibrational angular velocity meter 2100A is similar to the piezoelectric vibrational angular velocity meter 2001 shown in FIG. 54, a vibrator 2110 is configured differently therefrom.

While the basic configuration of the vibrator 2110 is similar to the configuration of the vibrator 2010 shown in FIG. 55, positions at which the electrodes 2011 and 2012 are formed are different from those shown in FIG. 55. Here, the electrodes 2011 and 2012 are respectively formed, with a width of 0.4 mm each, at upper portions of both side surfaces of the piezoelectric member 2010A in parallel to the longitudinal direction thereof.

Figure 77:
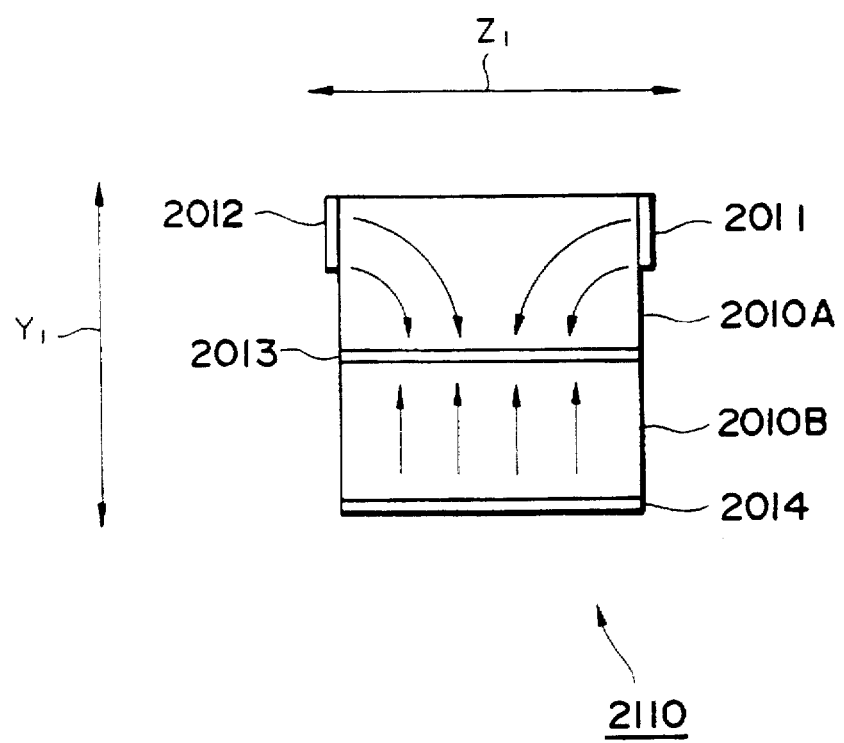
FIG. 77 is a front view of a vibrator 2110 shown in FIG. 76.

The vibrator 2110 of this embodiment has to be subjected to polarizing processing after the formation thereof. Namely, as shown in FIG. 77, the vibrator 2110 is polarized as voltages are applied between the electrodes 2013 and 2014, between the electrodes 2013 and 2012, and between the electrodes 2013 and 2011.

The operation of the piezoelectric vibrational angular velocity meter 2100A in this embodiment is similar to that of the piezoelectric vibrational angular velocity meter 2001 shown in FIG. 54.

Figure 78:
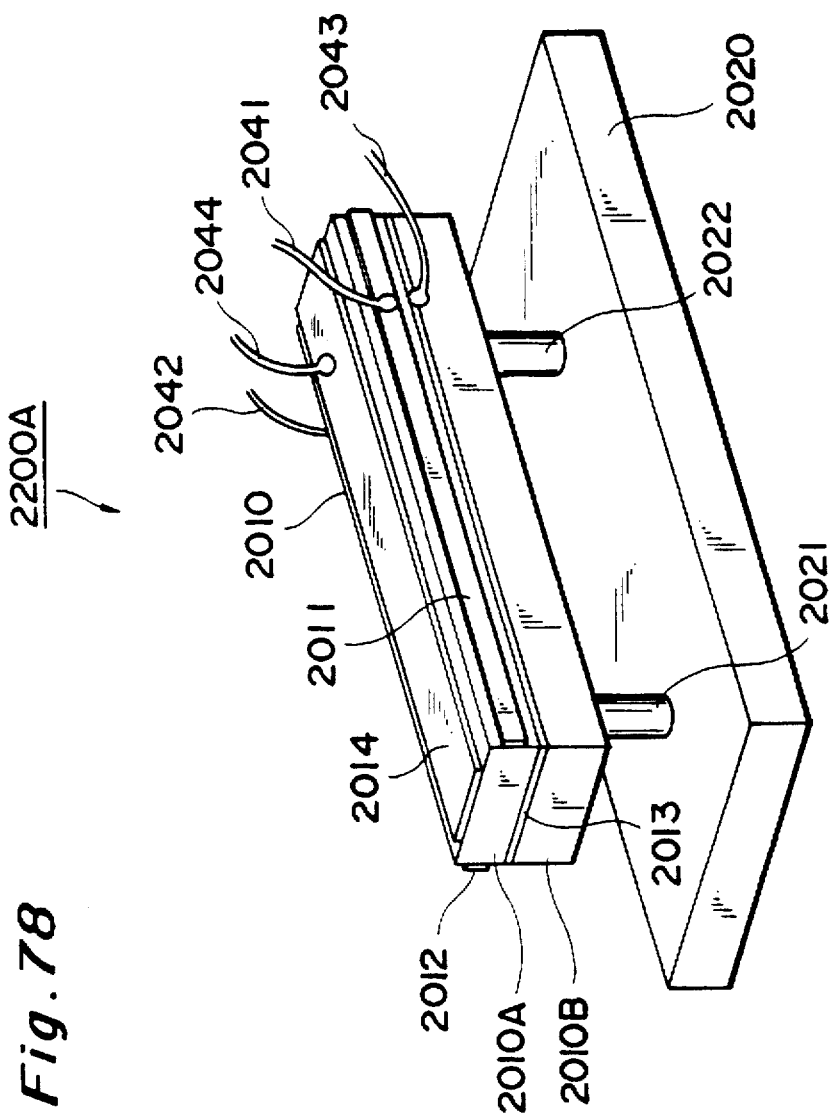
FIG. 78 is a perspective view showing a piezoelectric vibrational angular velocity meter of another embodiment.

FIG. 78 is a perspective view showing a piezoelectric vibrational angular velocity meter 2200A of another embodiment. While the basic configuration of the piezoelectric vibrational angular velocity meter 2200A is similar to the piezoelectric vibrational angular velocity meter 2001 shown in FIG. 54, a vibrator 2210 is configured differently therefrom.

While the basic configuration of the vibrator 2210 is similar to the configuration of the vibrator 2010 shown in FIG. 55, positions at which the electrodes 2011, 2012, and 2014 are formed are different from those shown in FIG. 55. Here, the electrodes 2011 and 2012 are respectively formed, each with a width of 0.4 mm, at center portions of both side surfaces of the piezoelectric member 2010A in parallel to the longitudinal direction thereof. The electrode 2014 is formed with a predetermined width at the center portion of the upper surface of the piezoelectric member 2010A in parallel to the longitudinal direction thereof.

Also in this configuration, since the electrodes 2011 to 2014 are exposed to the outside at nodal point portions of the resonance vibration of the vibrator 2210, the thin conductors 2041 to 2044 are respectively connected to the electrodes 2011 to 2014 at nodal point portions of the resonance vibration of the vibrator 2210. Accordingly, the vibration characteristic of the vibrator 2210 can be prevented from deteriorating.

Figure 79:
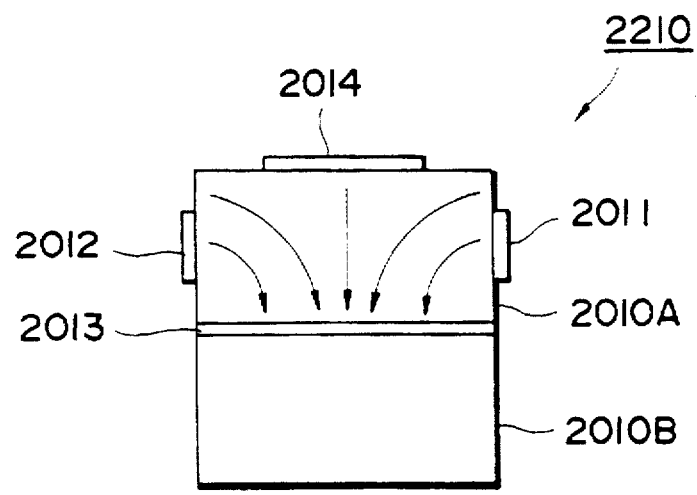
FIG. 79 is a front view of a vibrator 2210 shown in FIG. 78.
Figure 80:
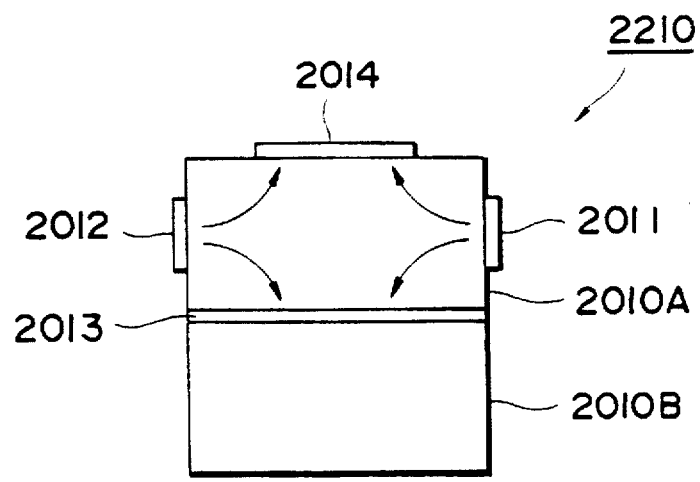
FIG. 80 is a front view of the vibrator 2210 shown in FIG. 78.

As in the case of the vibrator 2110 shown in FIG. 76, the vibrator 2210 has to be subjected to polarizing processing after the formation thereof. Namely, as shown in FIG. 79, the vibrator 2210 is polarized as voltages are applied between the electrodes 2013 and 2011, between the electrodes 2013 and 2012, and between the electrodes 2013 and 2014. Alternatively, as shown in FIG. 80, it may be polarized as voltages are applied between the electrodes 2013 and 2011, between the is electrodes 2013 and 2012, between the electrodes 2014 and 2011, and between the electrodes 2014 and 2012.

The operation of the piezoelectric vibrational angular velocity meter 2210 in this embodiment is similar to that of the piezoelectric vibrational angular velocity meter 2001 shown in FIG. 54.

Since the piezoelectric member 2010B (ceramic member) is piezoelectrically inactive, it is not necessarily be composed of PZT, which is a piezoelectric ceramic member, but can be constituted by piezoelectrically inactive ceramic materials such as quartz glass and alumina. In this case, since the materials (densities) of the piezoelectric members 2010A and 2010B may differ from each other, after the vibrator 2210 is formed, the vibrator 2210 has to be shaped into a desired form by means of laser or the like, while being vibrated, in order to make normal frequencies of the vibrator 2210 in the width and thickness directions thereof coincide with each other.

Though each of the electrodes 2011 to 2014 is formed by silver paste in the foregoing embodiments, it may be formed as a nickel electrode by electroless plating. Also, it may be formed as an aluminum electrode by vacuum deposition, sputtering, or the like.

In these piezoelectric vibrational angular velocity meters, each electrode is formed in the columnar vibrator 2100 such that contact therewith from the outside can be made a nodal point portion of the resonance vibration thereof, while the leads 2041 to 2044 are respectively connected to the electrodes 2011 to 2014 at nodal point portions of the columnar vibrator, whereby the vibration characteristic of the columnar vibrator can be prevented from deteriorating.

Figure 90:
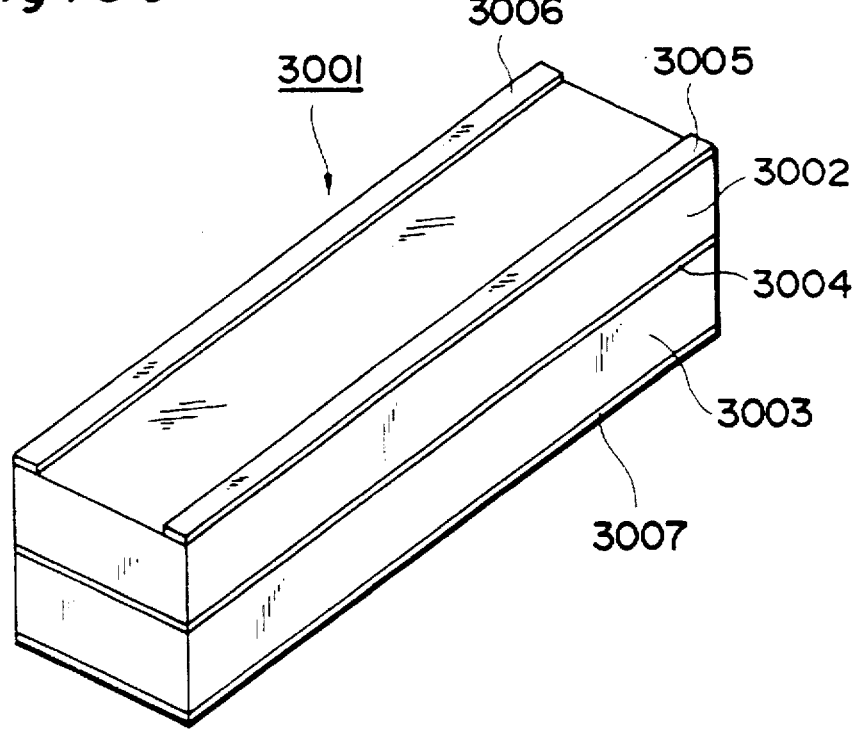
FIG. 90 is a perspective view of a vibrator.
Figure 91:
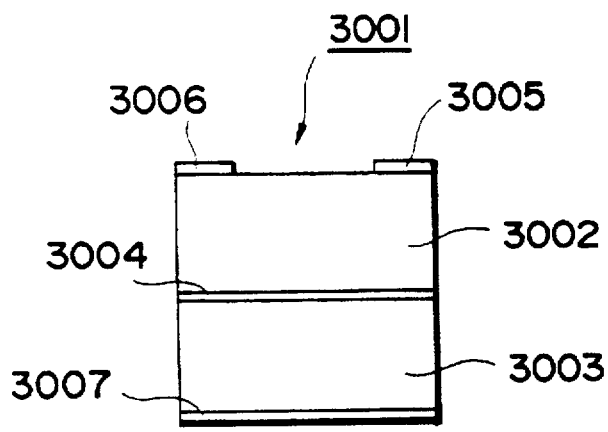
FIG. 91 is a front view of the vibrator shown in FIG. 90.

Next, another vibrator will be explained. FIG. 90 is a perspective view showing a configuration of a bimorph type vibrator 3001, whereas FIG. 91 is a front view thereof.

The vibrator 3001 is prepared as first and second members 3002 and 3003 each having a parallelopiped form composed of lead zirconate titanate (PZT), which is a piezoelectric material, are bonded together. The first member 3002 has a size defined by a width of 1 mm, a thickness of 0.5 mm, and a length of 9 mm. An electrode 3004 is formed by silver paste on the whole surface of a first side surface (lower surface in FIG. 90) of the first member 3002. At both side positions of a second side surface (upper surface in FIG. 90) of the first member 3002 opposite to the first side surface, electrodes 3005 and 3006 are respectively formed by silver paste in the longitudinal direction. The second member 3003 has the size same as that of the first member 3002. The electrode 3004 is also formed at the whole surface of a first side surface (upper surface in FIG. 90) of the second member 3003, whereas an electrode 3007 is formed by silver paste on the whole surface of a second side surface (lower surface in FIG. 90) of the second member 3003. The first member 3002 and the second member 3003 are bonded together by an adhesive such that the electrodes 3004 are assembled into a single electrode. Thus, the vibrator 3001 is completed. Also, the direction of polarization of the first member 3002 is the upward direction in FIG. 91, whereas the direction of polarization of the second member 3003 is the downward direction in FIG. 91.

Figure 92:
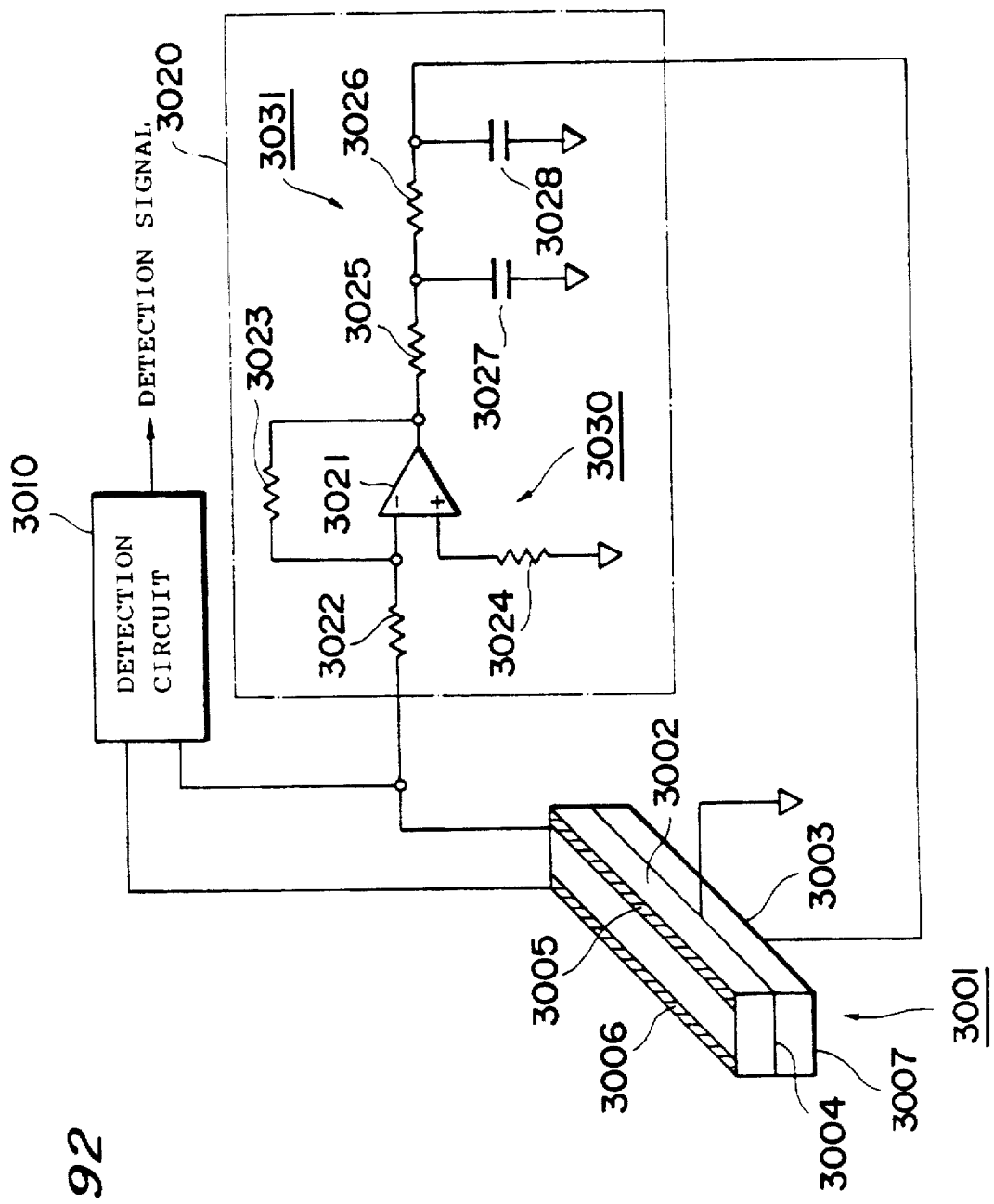
FIG. 92 is a view showing a piezoelectric vibrational angular velocity meter.

FIG. 92 shows a piezoelectric vibrational angular velocity meter using this vibrator 3001. This piezoelectric vibrational angular velocity meter comprises, in addition to the vibrator 3001, a self-excitation circuit 3020 which drives the vibrator 3001 in a self-excitation manner and a detection circuit 3010 for attaining, based on a signal from the vibrator 3001, a detection signal corresponding to Coriolis force which acts on the vibrator 3001.

The electrode 3004 of the vibrator 3001 is used as a reference electrode (earth electrode). The output terminal of the self-excitation circuit 3020 is connected to the electrode 3007. The input terminal of the self-excitation circuit 3020 is connected to the electrode 3005. The two input terminals of the detection circuit 3010 are respectively connected to the electrodes 3005 and 3006.

When the self-excitation circuit 3020 applies an excitation voltage (driving voltage) between the electrodes 3004 and 3007, the second member 3003 of the vibrator 3001 is subjected to bending vibration in a direction (vertical direction in FIG. 91) perpendicular to the surfaces of the electrodes 3004 and 3007, whereby the vibrator 3001 as a whole is subjected to bending vibration in this direction. When the vibrator 3001 rotates around an arbitrary axis extending in the longitudinal direction of the members 3002 and 3003 so as to yield an angular velocity, Coriolis force is generated in the width direction of the members 3002 and 3003. Due to this Coriolis force, bending vibration of the vibrator 3001 occurs in this direction. Upon this bending vibration, signals (voltages) corresponding to the Coriolis force are generated in opposite phases at the electrodes 3005 and 3006, respectively. The voltages generated at the electrodes 3005 and 3006 include not only these signals but also, in the same phase, the voltages caused by the bending vibration (excitation) of the vibrator 3001 in a direction perpendicular to the surfaces of the electrodes 3004 and 3007.

The detection circuit 3010 detects the differential between the signal of the electrode 3005 and the signal of the electrode 3006 so as to cancel the component caused by the excitation, thereby attaining the signal corresponding to the Coriolis force alone. Then, it demodulates the envelope of the resulting differential waveform and outputs thus demodulated signal as the detection signal of the Coriolis force. As a result, the rotational speed (angular velocity) of the vibrator 3001 can be measured.

Here, a specific circuit configuration of the detection circuit 3010 itself is well known.

The self-excitation circuit 3020 is constituted by an inverting amplifier 3030 composed of an operational amplifier 3021 and resistors 3022 to 3024 and a low-pass filter 3031 composed of two steps of RC filters comprising resistors 3025 and 3026 and capacitors 3027 and 3028. The output voltage from the electrode 3005 is inversely amplified by the inverting amplifier 3030. The phase of thus amplified voltage is adjusted by the low-pass filter 3031 so as to be supplied to the electrode 3007 as a driving voltage. As a result, a positive feedback is provided so as to attain a loop gain of 1 or higher, whereby the vibrator 3001 is driven in a self-excitation manner.

However, the piezoelectric vibrational angular velocity meter using the vibrator 3001 has the following points to be improved.

Namely, when Coriolis force acts on the vibrator 3001, the amplitude of the output voltage from the electrode 3005 may fluctuate in response to the Coriolis force. As thus fluctuated vibrational voltage is input into the self-excitation circuit 3020, the self-excited vibration of the vibrator 3001 may become unstable. Also, since the electrode 3005 is connected to both input terminals of the detection circuit 3010 and self-excitation circuit 3020 such that the output voltage of the electrode 3005 is used for both detection circuit 3010 for detecting the Coriolis force and self-excitation circuit 3020 for self-excitation of the vibrator 3001, these circuits 3010 and 3020 cannot be prevented from interacting with each other.

As a method for inputting a signal from the vibrator 3001 into the self-excitation circuit 3020, the sum of the outputs of the electrodes 3005 and 3006 may be determined so as to be input into the self-excitation circuit 3020. When this method is adopted, since the amounts of change in amplitude in the electrodes 3005 and 3006 due to the Coriolis force have phases opposite to each other, they are supposed to cancel each other. Actually, however, due to the difference in areas of the electrodes 3005 and 3006 or partial unevenness in characteristics of PZT, the difference in magnitudes of change due to the Coriolis force in amplitude between the electrodes 3005 and 3006 in their output voltages cannot be nullified, whereby the amount of change in the amplitude due to the Coriolis force cannot be completely cancelled. Also, even when the above-mentioned method is used, the interaction between the detection circuit 3010 and the self-excitation circuit 3020 similarly exists, thereby its influence cannot be neglected.

The following piezoelectric vibrational angular velocity meter can stabilize the self-excitation vibration of the vibrator, while preventing the detection circuit for detecting Coriolis force and the self-excitation driving circuit for self-excitation of the vibrator from interacting with each other.

This vibrator 3041 has an electrode 3047 disposed at nearly the center position of the second side surface of a first member 3042. Since this electrode 3047 is formed at nearly the center position, even when Coriolis force acts on the vibrator, the amplitude of the signal from this electrode is always constant without being subjected to amplitude modulation due to the Coriolis force. Accordingly, when this electrode is used for the self-excitation circuit while another predetermined electrode is used for the detection circuit, the self-excited vibration of the vibrator 3041 is stabilized while the detection circuit for detecting Coriolis force and the self-excitation driving circuit for self-excitation of the vibrator are prevented from interacting with each other. In the following, this vibrator will be explained in detail.

Figure 81:
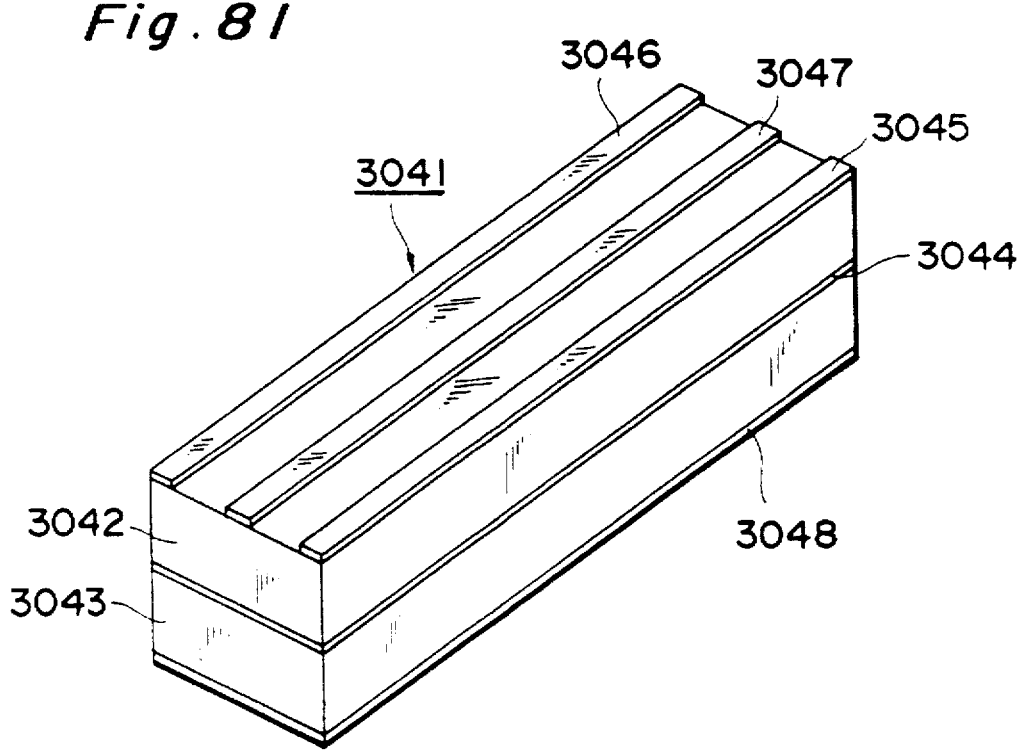
FIG. 81 is a perspective view of a vibrator.
Figure 82:
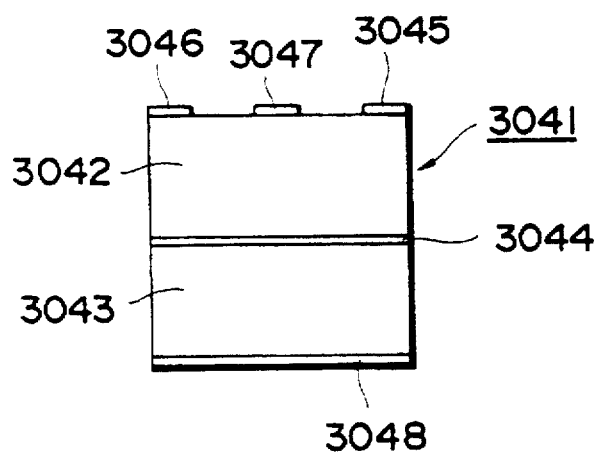
FIG. 82 is a front view of the vibrator shown in FIG. 81.

FIG. 81 is a perspective view of the vibrator 3041, whereas FIG. 82 is a front view thereof.

As shown in FIG. 81, the vibrator 3041 comprises first and second members 3042 and 3043 each made of a rectangular parallelopiped piezoelectric material (which may not exactly be a parallelopiped); an electrode 3044 formed so as to be held between a first side surface (lower surface in FIG. 81) of the first member 3042 and a first side surface (upper surface in FIG. 81) of the second member 3043; electrodes 3045 and 3046 respectively formed at both side positions on a second surface (upper surface in FIG. 81) of the first member 3042 opposite to the first side surface of the first member 3042; the electrode 3047 formed at nearly the center position at the second side surface of the first member 3042; and an electrode 3048 formed at a second side surface (lower surface in FIG. 81) of the second member 3043 opposite to the first side surface of the second member 3043.

In this embodiment, each of the first and second members 3042 and 3043 is made of a piezoelectric ceramic [e.g., lead zirconate titanate (PZT)] with a thickness of 0.5 mm, a width of 1.0 mm, and a length of 9.0 mm. The present invention should not be restricted to such a size, however. The electrodes 3045 and 3046 are formed by silver paste, each with a width of 0.2 mm, at both side portions on the upper surface of the first member 3042 in the longitudinal direction thereof. The electrode 3047 is formed by silver paste, with a width of 0.2 mm, at the center portion in the width direction of the upper surface of the first member 3042 so as to extend in the longitudinal direction of the first member 3042. The electrode 3048 is formed by silver paste on the whole lower surface of the second member 3043. The electrode 3044 has a configuration in which the silver paste formed on the whole lower surface of the first member 3042 beforehand and the silver paste formed on the whole upper surface of the second member 3043 beforehand are bonded together by means of an adhesive such as an epoxy adhesive (not depicted). In order to minimize the influence of the adhesive upon the vibration of the vibrator, an adhesive having a low viscosity is preferably used therefor. Here, even when the adhesive itself does not have any conductivity, there are a number of minute areas at which the silver paste formed on the lower surface of the first member 3042 and the silver paste formed on the upper surface of the second member 3043 are directly brought into contact with each other when an appropriate pressure is applied thereto at the time of bonding, thereby electrically connecting each other. Of course, a conductive adhesive may be used therefor.

Figure 83:
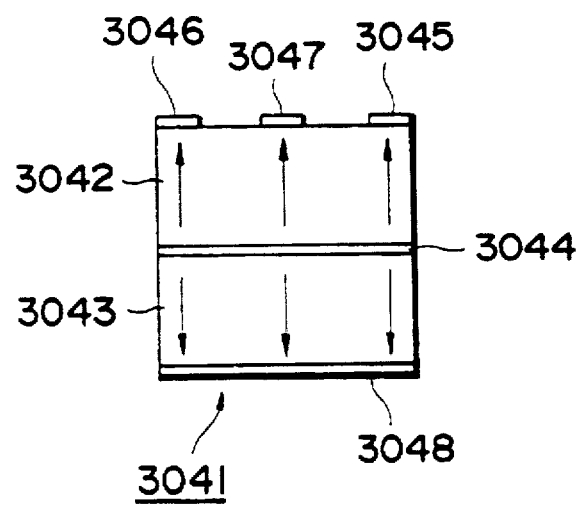
FIG. 83 is an explanatory view explaining a state of polarization of the vibrator.
Figure 84:
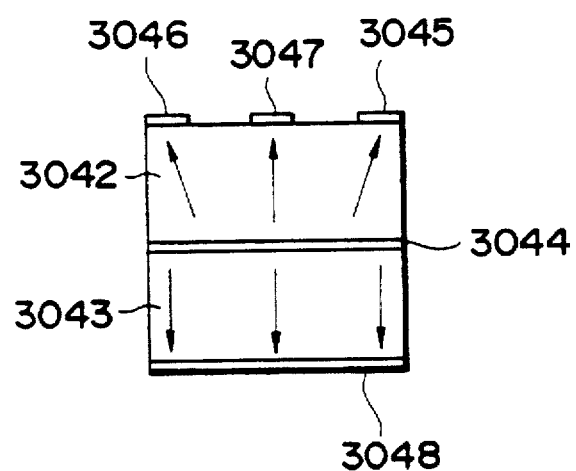
FIG. 84 is an explanatory view explaining a state of polarization of the vibrator.

Also, the directions of polarization of the first and second members 3042 and 3043 are supposed to be in substantially the thickness direction thereof (vertical direction in FIG. 81). Each of the first and second members 3042 and 3043 may be subjected to polarization processing in the thickness direction thereof beforehand. Alternatively, after the members 3042 and 3043 are bonded together, with the electrode 3044 as a reference, voltages may be applied between the electrode 3044 and each of the electrodes 3045, 3046, 3047, and 3048 so as to effect polarization processing. FIG. 83 shows an example of the state of polarization of the members 3042 and 3043 subjected to the polarization processing by the former method, whereas FIG. 84 shows an example of the state of polarization of the members 3042 and 3043 subjected to the polarization processing by the latter method.

Though each of the electrodes 3045, 3046, and 3047 has the same width of 0.2 mm, it is not necessary for them to do so. While the electrodes 3045 and 3046 preferably have widths identical to each other, the width of the electrode 3047 may be larger or smaller than these widths.

In order to effectively vibrate the vibrator 3041 upon application of a driving voltage thereto and in order to attain a high voltage generated by the vibration of the vibrator 3041, a piezoelectric material having a large Q is selected as a material for each of the members 3042 and 3043. Also, the vibrator 3041 preferably has resonance frequencies in its thickness and width directions which substantially coincide with each other. When they coincide with each other, the cross section of the vibrator 3041 (i.e., the whole cross section of the members 3042 and 3043 holding the electrode 3044 therebetween which is in parallel to the end surfaces of the member 3042) becomes substantially square. This frequency-matching operation is effected, for example, when, while the vibrator 3041 is vibrated, its side surface is shaven by laser or the like so as to adjust the resonance frequency thereof.

Since the vibrator 3041 has the configuration as mentioned above, a large number of such vibrators can be manufactured at once. Namely, when a piezoelectric plate on which a number of electrode patterns for the electrodes 3045, 3046, and 3047 and electrode patterns constituting a part of the electrode 3044 corresponding to a number of vibrators 3041 have been formed and a piezoelectric plate on which a number of electrode patterns for the electrode 3048 and electrode patterns constituting the other part of the electrode 3044 have been formed are bonded together and then thus bonded plate is cut into the individual vibrators 3041, a large number of the vibrators 3041 can be manufactured at once. Also, when electrode patterns are formed by a reactive etching and the bonded plate is cut by a precision cutting machine, the vibrator 3041 having a small size can be manufactured with a favorable reproducibility.

Figure 85:
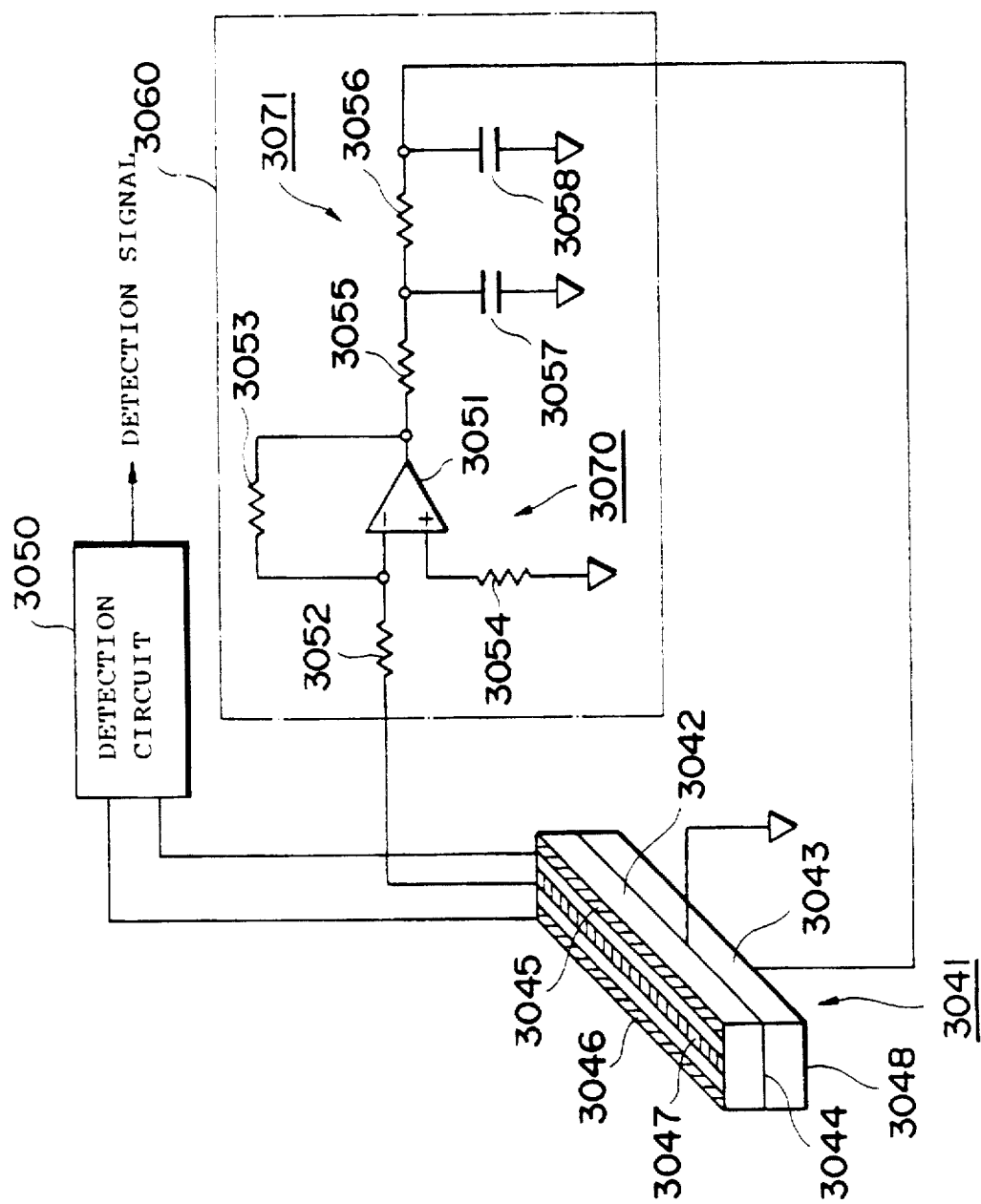
FIG. 85 is a perspective view showing a piezoelectric vibrational angular velocity meter of another embodiment.

FIG. 85 shows an example of a piezoelectric vibrational angular velocity meter using the vibrator 3041. This vibrational angular velocity meter comprises, in addition to the vibrator 3041, a self-excitation circuit 3060 which drives the vibrator 3041 in a self-excitation manner and a detection circuit 3050 for attaining, based on a signal from the vibrator 3041, a detection signal corresponding to Coriolis force which acts on the vibrator 3041.

The electrode 3044 of the vibrator 3041 is used as a reference electrode (earth electrode). The output terminal of the self-excitation circuit 3060 is connected to the electrode 3048. The input terminal of the self-excitation circuit 3060 is connected to the electrode 3047. The two input terminals of the detection circuit 3050 are respectively connected to the electrodes 3045 and 3046.

When the self-excitation circuit 3060 applies an excitation voltage (driving voltage) between the electrodes 3044 and 3048, the second member 3043 of the vibrator 3041 is subjected to bending vibration in a direction (vertical direction in FIG. 82) perpendicular to the surfaces of the electrodes 3044 and 3048, whereby the vibrator 3041 as a whole is subjected to bending vibration in this direction. Namely, the vibrator 3041 generates self-excitation. Under this condition, when the vibrator 3041 rotates around an arbitrary axis extending in the longitudinal direction of the members 3042 and 3043 so as to yield an angular velocity, Coriolis force is generated in the width direction (horizontal direction in FIG. 82) of the members 3042 and 3043. Due to this Coriolis force, bending vibration of the vibrator 3041 occurs in this direction.

Figure 86:
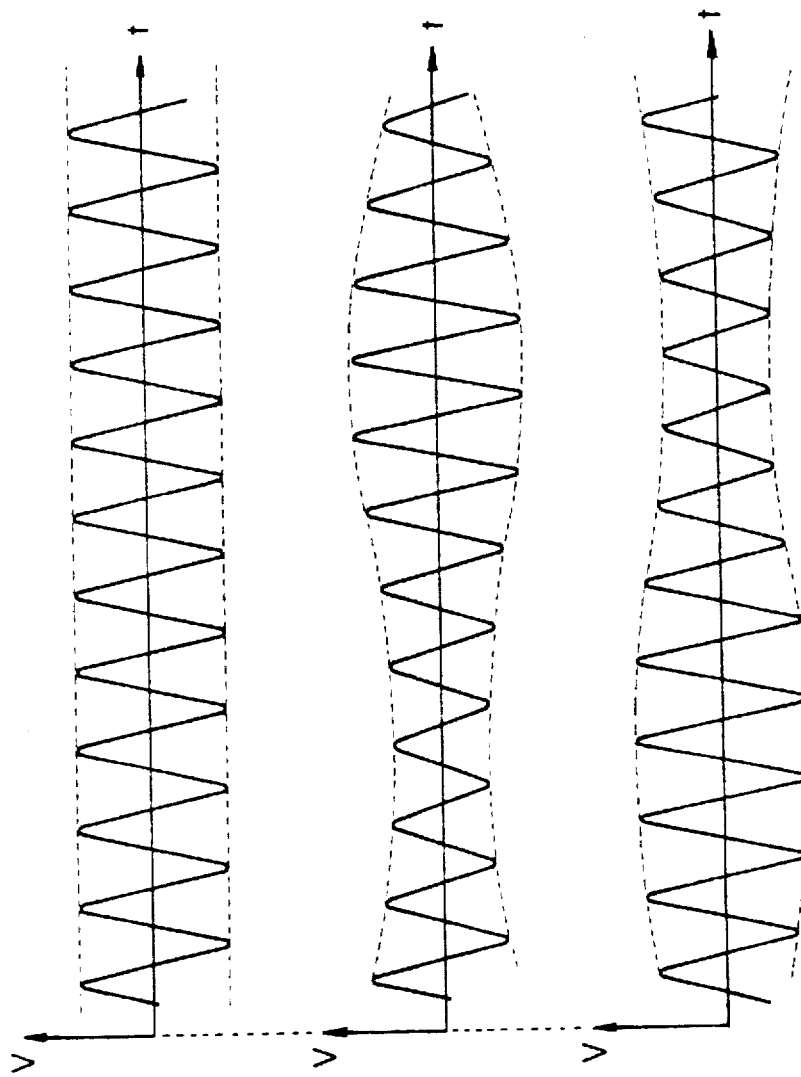
FIGS. 86A to 86C are waveform charts showing output waveforms of the respective electrodes of the vibrator.

FIG. 86A to 86C show waveforms of outputs from the electrodes 3045, 3046, and 3047 when the bending vibration due to Coriolis force is generated in the width direction (horizontal direction in FIG. 82) of the vibrator 3041 as the vibrator 3041 rotates, with an angular velocity, around an axis which is parallel to the longitudinal direction thereof at the time during which the vibrator 3041 generates self-excitation in the direction (vertical direction in FIG. 82) perpendicular to the surfaces of the electrodes 3044 and 3048. FIGS. 86A shows the output from the electrode 3047. FIG. 86B shows the output from the electrode 3045. FIG. 86C shows the output from the electrode 3046. As shown in FIG. 86A, the output from the electrode 3047 becomes a sine wave in which the amplitude having a self-excitation frequency is constant. Since the electrode 3047 is disposed at nearly the center in the width direction of the upper surface of the first member 3042, the output of the electrode 3047 corresponds to only the bending vibration of the vibrator 3041 in the direction (vertical direction in FIG. 82) perpendicular to the surfaces of the electrodes 3044 and 3048 due to the self-excitation of the vibrator 3041, whereby the amplitude of the output of the electrode 3047 does not change due to the Coriolis force. On the other hand, the outputs of the electrodes 3045 and 3046 correspond not only to the bending vibration (excitation) of the vibrator 3041 in the direction (vertical direction in FIG. 82) perpendicular to the surfaces of the electrodes 3044 and 3048 due to the self-excitation of the vibrator 3041 but also to the bending vibration of the vibrator 3041 in the width direction thereof (horizontal direction in FIG. 82) due to the Coriolis force, so as to be subjected to amplitude modulations in phases opposite to each other due to the generated Coriolis force, thereby changing their amplitudes Next, the reason why the outputs of the electrodes 3045 and 3046 are subjected to amplitude modulations in phases opposite to each other due to the Coriolis force will be explained. Namely, in the case where the vibrator 3041 is vibrated due to the Coriolis force so as to have an amplitude in the horizontal direction in FIG. 83, when a compressive stress (or tensile stress) acts between the electrodes 3044 and 3045, a tensile stress (or compressive stress) inversely acts between the electrode 3044 and 3046, whereby the polarities of the electric charges respectively generated at the electrodes 3045 and 3046 due the Coriolis force become opposite to each other. This feature is secured by the fact that the direction of polarization of each of the members 3001 and 3002 is in the thickness direction as explained above in conjunction with FIG. 83.

The detection circuit 3050 detects the differential between the signal of the electrode 3045 and the signal of the electrode 3046 so as to cancel the component caused by the excitation, thereby attaining the signal corresponding to the Coriolis force alone. Then, it demodulates the envelope of the resulting differential waveform and outputs thus demodulated signal as the detection signal of the Coriolis force. As a result, the rotational speed (angular velocity) of the vibrator 3041 can be measured. Since it is easy for one skilled in the art to design a specific circuit configuration of the detection circuit 3050 itself, its detailed description is omitted here.

The self-excitation circuit 3060 is constituted by an inverting amplifier 3070 composed of an operational amplifier 3051 and resistors 3052 to 3054 and a low-pass filter 3071 composed of two steps of RC filters comprising resistors 3055 and 3056 and capacitors 3057 and 3058. The configuration of the self-excitation circuit 3060 should not be restricted thereto, however. The output voltage from the electrode 3047 is inversely amplified by the inverting amplifier 3070. The phase of thus amplified voltage is adjusted by the low-pass filter 3071 so as to be supplied to the electrode 3048 as a driving voltage. As a result, a positive feedback is provided so as to attain a loop gain of 1 or higher, whereby the vibrator 3041 is driven in a self-excitation manner.

In the piezoelectric vibrational angular velocity meter shown in FIG. 85, since the vibrator 3041 comprises the electrode 3047 while the output of the electrode 3047 whose amplitude does not change due to the Coriolis force is used as an input for the self-excitation circuit 3060, the self-excitation vibration of the vibrator 3041 can be stabilized. Also, since the electrode 3047 used as an input for the self-excitation circuit 3060 is independent from the electrodes 3045 and 3046 which are used for detecting the Coriolis force, the detection circuit 3050 and the self-excitation circuit 3060 can be prevented from interacting with each other.

In the following, another embodiment of a piezoelectric vibrational angular velocity meter using the vibrator 3041 shown in FIG. 81 will be explained with reference to FIG. 87.

Figure 87:
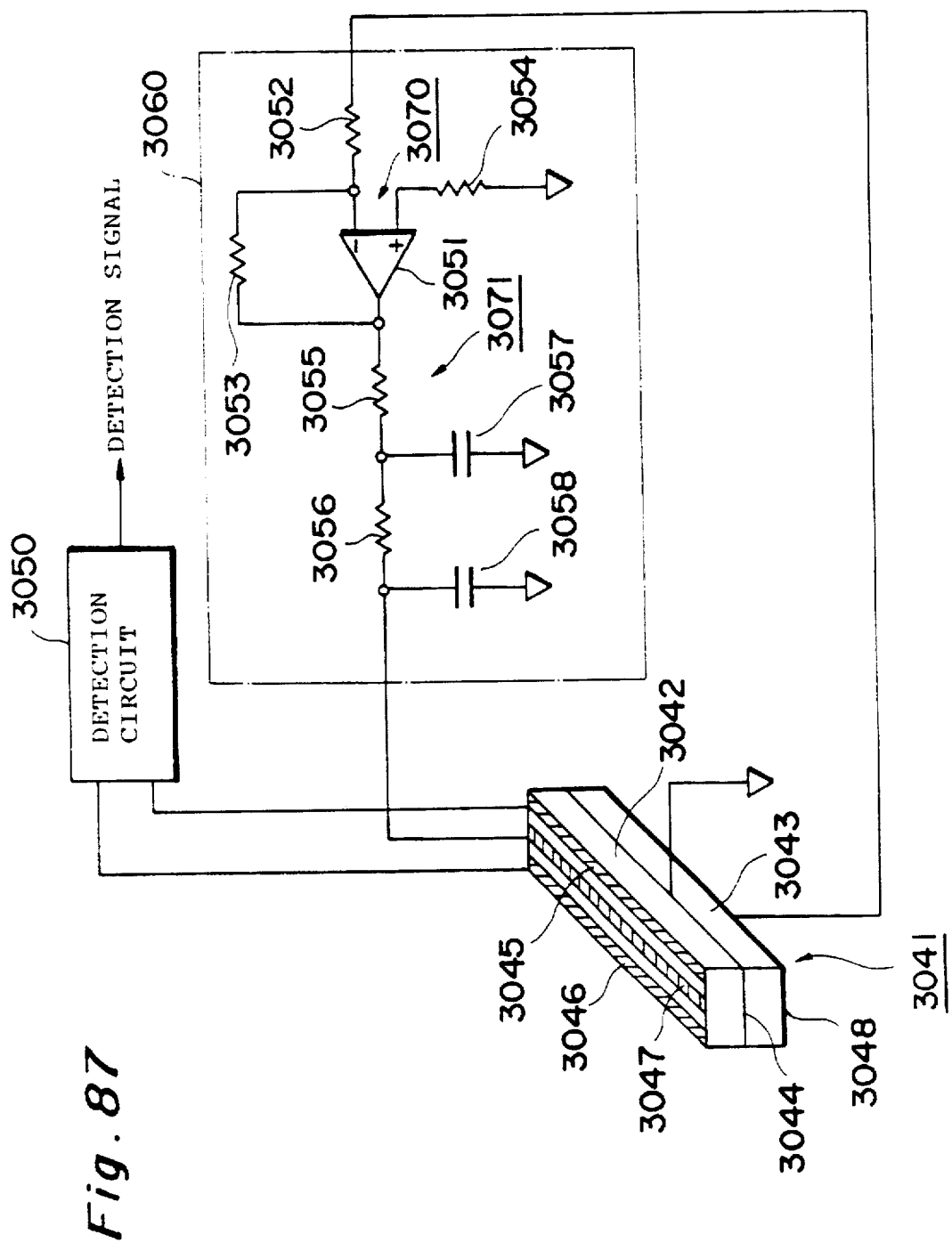
FIG. 87 is a perspective view showing a piezoelectric vibrational angular velocity meter of another embodiment.

In FIG. 87, constituents identical to those shown in FIG. 85 are referred to with marks identical thereto without repeating their explanations.

The piezoelectric vibrational angular velocity meter shown in FIG. 87 differs from the above-mentioned piezoelectric vibrational angular velocity meter shown in FIG. 85 only in that, whereas the input and output terminals of the self-excitation circuit 3060 are respectively connected to the electrodes 3047 and 3048 of the vibrator 3041 in the piezoelectric vibrational angular velocity meter shown in FIG. 85, the input and output terminals of the self-excitation circuit 3060 are respectively connected to the electrodes 3048 and 3047 of the vibrator 3041 in the piezoelectric vibrational angular velocity meter shown in FIG. 87, on the contrary.

Though the functions of the electrodes 3048 and 3047 in the vibrator 3041 in the piezoelectric vibrational angular velocity meter shown in FIG. 87 are opposite to those in the piezoelectric vibrational angular velocity meter shown in FIG. 85, they are substantially equivalent to each other.

Since the area of the electrode 3048 in the piezoelectric vibrational angular velocity meter shown in FIG. 87 differs from the area of the electrode 3047 in the piezoelectric vibrational angular velocity meter shown in FIG. 85, their magnitudes of the input voltages into the inverting amplifier 3070 of the self-excitation circuit 3060 upon the self-excitation of the vibrator 3041 differ from each other. However, since their frequencies of self-excitation are identical to each other, they can have the same circuit configuration for the self-excitation circuit 3060.

Figure 88:
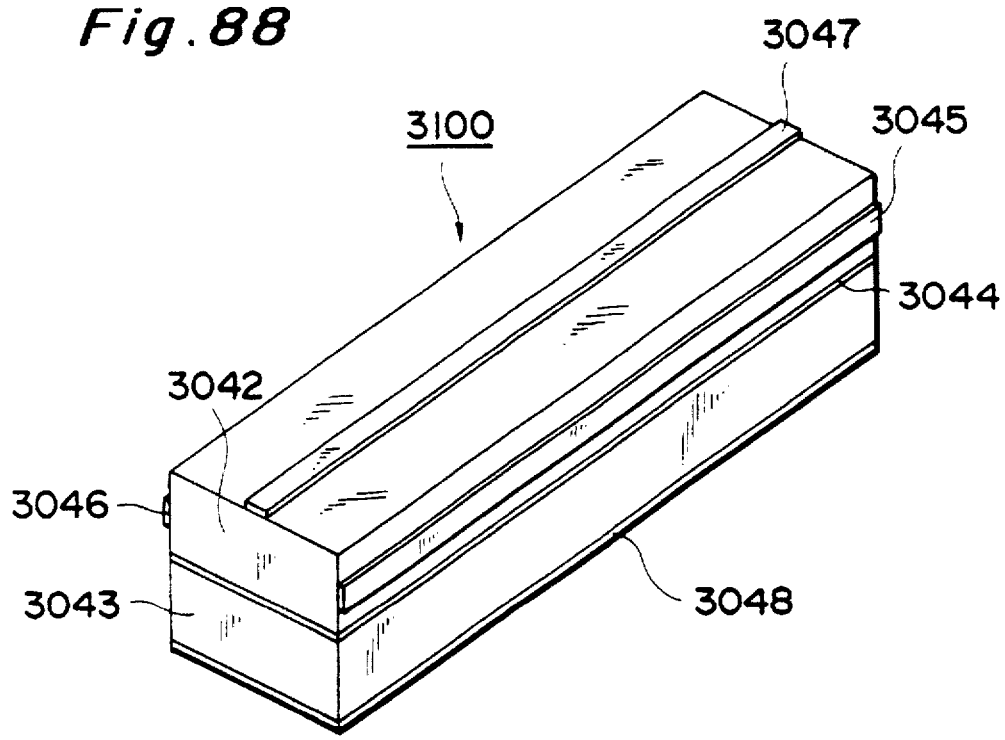
FIG. 88 is a perspective view of a vibrator in accordance with another embodiment.
Figure 89:
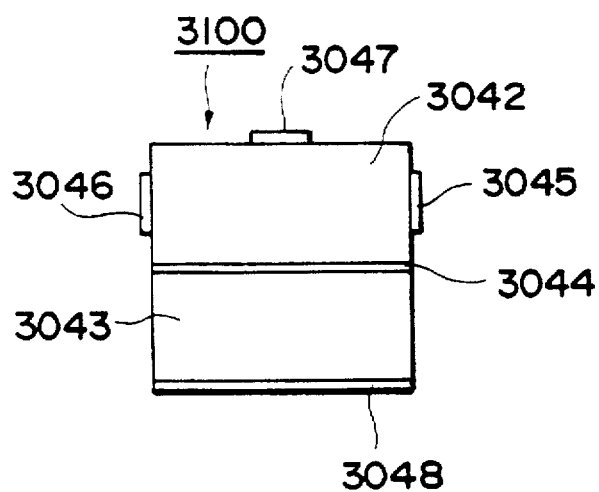
FIG. 89 is a front view of the vibrator shown in FIG. 88.

Next, a vibrator 3100 in accordance with another embodiment will be explained with reference to FIGS. 88 and 89. FIG. 88 is a perspective view of the vibrator 3100, whereas FIG. 89 is a front view thereof. In FIG. 88, constituents identical or corresponding to those shown in FIG. 81 are referred to with marks identical thereto without repeating their explanations.

This vibrator 3100 differs from the above-mentioned vibrator 3041 shown in FIG. 81 only in that the electrodes 3045 and 3046 are formed not on the upper surface of the first member 3042 but on third and fourth side surfaces of the first member 3042 neighboring the first side surface (lower surface) of the first member 3042. However, it is clear that the vibrator 3100 is substantially equivalent to the vibrator 3041. Accordingly, in the piezoelectric vibrational angular velocity meters shown in FIGS. 85 and 87, the vibrator 3100 can be used in place of the vibrator 3041.

Also, while the vibrators 3041 and 3100 in the foregoing embodiments have both of the electrodes 3045 and 3046, one of them may be eliminated in the present invention. When such a vibrator is used for constituting the piezoelectric vibrational angular velocity meter, the remaining electrode 3045 (or electrode 3046) is connected to the input side of the detection circuit, while the output of the electrode 3045 is converted into a DC voltage by a half-wave rectifier circuit, a smoothing circuit, and the like in the detection circuit. When the differential between this AC voltage and a constant voltage having a predetermined level (constant voltage with a level corresponding to the case where no Coriolis force is generated) is determined, this differential output can be used as the detection signal for the Coriolis force. The other features are similar to the cases of FIGS. 85 and 87.

This angular velocity meter can stabilize the self-excitation vibration of the vibrator, while preventing the detection circuit for detecting Coriolis force and the self-excitation driving circuit for self-excitation of the vibrator from interacting with each other.

In the following, a method of adjusting the resonance frequency of a vibrator for piezoelectric vibrational angular velocity meter will be explained. First, an outline of this method will be explained.

This method is directed to a resonance frequency adjusting method in which a side surface of the vibrator for piezoelectric vibrational angular velocity meter is subjected to a shaving processing with a predetermined amount of shaving so as to adjust the difference between the resonance frequency of the vibrator on the driving side and the resonance frequency of the vibrator on the detection side.

In this method, assuming that a first side surface of the vibrator is divided into upper and lower portions and that thus divided upper and lower portions are respectively referred to as first and second surface portions, a shaving processing for the first surface portion which is effected until the difference between the resonance frequency of the vibrator on the driving side and the resonance frequency of the vibrator on the detection side reaches an intermediate value and a shaving processing for the second surface portion which is effected until the difference between the resonance frequency of the vibrator on the driving side and the resonance frequency of the vibrator on the detection side reaches an intermediate value are alternately repeated until the difference between the resonance frequency of the vibrator on the driving side and the resonance frequency of the vibrator on the detection side finally reaches a final target value.

In this case, if the difference between the resonance frequency of the vibrator on the driving side and the resonance frequency of the vibrator on the detection side becomes smaller after the first or second surface portion is subjected to a preparatory shaving processing, the surface portion subjected to the preparatory shaving processing will be defined as the surface portion which is initially to be subjected to the shaving processing. If not, the other surface portion will be defined as the surface portion which is initially to be subjected to the shaving processing.

Here, the intermediate value refers to a value which becomes a reference for changing the place to be subjected to the shaving processing. This intermediate value may be a value at which the resonance frequency difference begins to increase when the shaving processing is continuously effected on one surface portion. Alternatively, when it is empirically known at which value the resonance frequency difference begins to increase, this value may be used as the intermediate value.

Here, the difference between the resonance frequency of the vibrator on the driving side and the resonance frequency of the vibrator on the detection side may reach the final target value even when only one of the first and second surface portions is subjected to the shaving processing.

The second resonance frequency adjusting method for the vibrator for piezoelectric vibrational angular velocity meter is directed to a resonance frequency adjusting method for the vibrator for piezoelectric vibrational angular velocity meter in which a side surface of the vibrator for piezoelectric vibrational angular velocity meter is subjected to a shaving processing with a predetermined amount of shaving so as to adjust the difference between the resonance frequency of the vibrator on the driving side and the resonance frequency of the vibrator on the detection side, wherein, assuming that each of first and second side surfaces of the vibrator is divided into upper and lower portions and that thus divided upper and lower portions of the first side surface are respectively referred to as first and second surface portions whereas thus divided upper and lower portions of the second side surface are respectively referred to as third and fourth surface portions, a shaving processing for the first surface portion which is effected until the difference between the resonance frequency of the vibrator on the driving side and the resonance frequency of the vibrator on the detection side reaches an intermediate value and a shaving processing for the third surface portion which is effected until the difference between the resonance frequency of the vibrator on the driving side and the resonance frequency of the vibrator on the detection side reaches an intermediate value are alternately repeated until the difference between the resonance frequency of the vibrator on the driving side and the resonance frequency of the vibrator on the detection side finally reaches a final target value.

In this case, if the difference between the resonance frequency of the vibrator on the driving side and the resonance frequency of the vibrator on the detection side becomes smaller after the first or third surface portion is subjected to a preparatory shaving processing, the surface portion subjected to the preparatory shaving processing will be defined as the surface portion which is initially to be subjected to the shaving processing. If not, the other surface portion will be defined as the surface portion which is initially to be subjected to the shaving processing.

The third resonance frequency adjusting method for the vibrator for piezoelectric vibrational angular velocity meter is directed to a resonance frequency adjusting method for the vibrator for piezoelectric vibrational angular velocity meter in which a side surface of the vibrator for piezoelectric vibrational angular velocity meter is subjected to a shaving processing with a predetermined amount of shaving so as to adjust the difference between the resonance frequency of the vibrator on the driving side and the resonance frequency of the vibrator on the detection side, wherein, assuming that each of first and second side surfaces of the vibrator is divided into upper and lower portions, that thus divided upper and lower portions of the first side surface are respectively referred to as first and second surface portions whereas thus divided upper and lower portions of the second side surface are respectively referred to as third and fourth surface portions, and that the first and fourth surface portions are referred to as a first group while the second and third surface portions are referred to as a second group, a shaving processing for one or both of the surface portions constituting the first group which is effected until the difference between the resonance frequency of the vibrator on the driving side and the resonance frequency of the vibrator on the detection side reaches an intermediate value and a shaving processing for one or both of the surface portions constituting the second group which is effected until the difference between the resonance frequency of the vibrator on the driving side and the resonance frequency of the vibrator on the detection side reaches an intermediate value are alternately repeated until the difference between the resonance frequency of the vibrator on the driving side and the resonance frequency of the vibrator on the detection side finally reaches a final target value.

In this case, if the difference between the resonance frequency of the vibrator on the driving side and the resonance frequency of the vibrator on the detection side becomes smaller after one surface portion constituting the first group or one surface portion constituting the second group is subjected to a preparatory shaving processing, one of the surface portions constituting the group including the surface portion subjected to the preparatory shaving processing will be defined as the surface portion which is initially to be subjected to the shaving processing. If not, one of the surface portions constituting the group different from the group including the surface portion subjected to the preparatory shaving processing will be defined as the surface portion which is initially to be subjected to the shaving processing.

Here, the difference between the resonance frequency of the vibrator on the driving side and the resonance frequency of the vibrator on the detection side may reach the final target value even when the shaving processing is effected for one or both surface portions constituting only one of the first and second groups.

In cases where the foregoing first to third resonance frequency adjusting methods for the vibrator for piezoelectric vibrational angular velocity meter are used, as the side surfaces of the vibrator for piezoelectric vibrational angular velocity meter composed of a piezoelectric material are subjected to the shaving processing with a predetermined amount of shaving, the difference between the resonance frequency of the vibrator on the driving side and the resonance frequency of the vibrator on the detection side can reach a final target value.

The first to third resonance frequency adjusting methods for the vibrator for piezoelectric vibrational angular velocity meter can be applied to a vibrator in which a first member formed like a square pole made of a piezoelectric material and a second member formed like a square pole made of a piezoelectric material are integrally bonded together. In this case, side surfaces which are in parallel to the longitudinal sides of the first and second members and orthogonal to the bonding surface of the first and second members become first and second side surfaces. The upper portion of the first side surface, which has been divided into the upper and lower portions by the bonding surface, becomes the first surface portion. The lower portion of the first side surface, which has been divided into the upper and lower portions by the bonding surface, becomes the second surface portion. The upper portion of the second side surface, which has been divided into the upper and lower portions by the bonding surface, becomes the third surface portion. The lower portion of the second side surface, which has been divided into the upper and lower portions by the bonding surface, is the fourth surface portion.

In this case, the shaving processing is preferably effected by means of laser light. When the laser light is used, its beam diameter and beam power can be changed arbitrarily according to the material.

Also, in the first to third resonance frequency adjusting methods for the vibrator for piezoelectric vibrational angular velocity meter, the shaving processing is preferably effected while the vibrator is fixed to its supporting member. In this case, most preferably, the vibrator is fixed at a position which becomes a vibrational nodal point of the vibrator. When the side surface of the vibrator are subjected to shaving processing with a predetermined amount of shaving while the vibrator is fixed to the supporting member, no further manufacturing step is necessary, whereby the most efficient piezoelectric vibrational angular velocity meter can be provided.

The foregoing resonance frequency adjusting methods will be explained in further detail. In the following, embodiments of the present invention will be explained with reference to drawings. These drawings schematically depict the forms, sizes, and positional relationships of various constituents to only such an extent that the present invention can be understood. In each drawing used for explanation, constituents similar to each other are referred to with numbers identical to each other. Also, the materials used, methods of formation, and sizes such as width only refer to preferable examples of the embodiments of the present invention. Accordingly, the present invention should not be restricted to these conditions alone.

Figure 93:
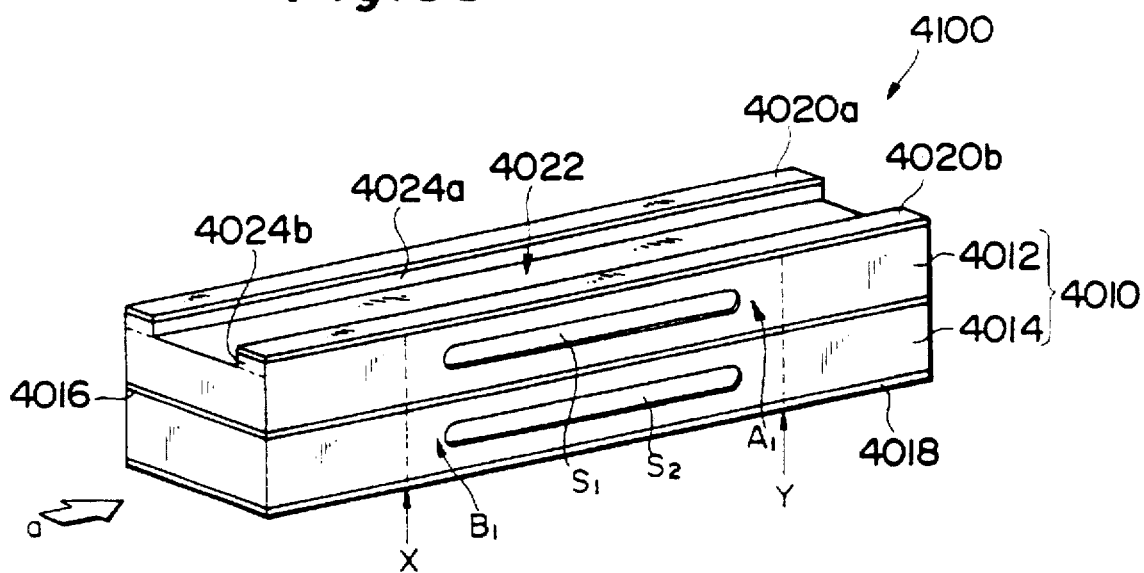
FIG. 93 is a perspective view of a vibrator of another embodiment.
Figure 94:
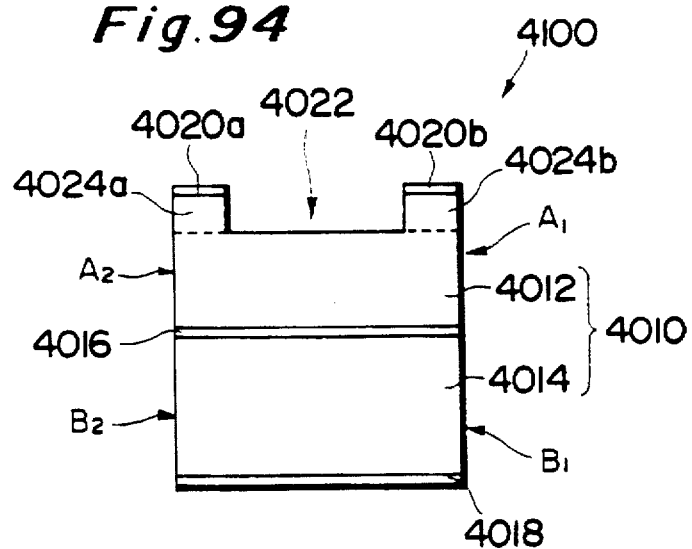
FIG. 94 is a front view of the vibrator shown in FIG. 93.

FIGS. 93 and 94 are schematic views of a piezoelectric vibrational angular velocity meter 4100. Here, FIG. 94 is a front view of the piezoelectric vibrational angular velocity meter 4100 observed from arrow a shown in FIG. 93. The piezoelectric vibrational angular velocity meter 4100 shown in FIGS. 93 and 94 comprises a bimorph type vibrator 4010 in which first and second members 4012 and 4014 each composed of lead zirconate titanate (also referred to as "PZT") are integrally bonded together. Here, each of the first and second members 4012 and 4014 is formed like a square pole whose longitudinal side has a length of 9 mm whereas two sides perpendicular to the longitudinal side, namely, width and thickness of each of the members 4012 and 4014, are 1.0 mm and 0.5 mm, respectively.

Between the first and second members 4012 and 4014, a reference electrode 4016 is disposed over the whole bonding surface of the first and second members 4012 and 4014. On the surface of the second member 4014 opposite to the reference electrode 4016, a driving electrode 4018 is disposed over the whole surface. On the surface of the first member 4012 opposite to the reference electrode 4016, two detection electrodes 4020a and 4020b are disposed along two opposite sides so as to be spaced from each other. A lead (not depicted) is attached to each electrode. At a region of the first member 4012 between the two detection electrodes 4020a and 4020b, a groove 4022 is formed along the detection electrodes 4020a and 4020b, namely, in parallel to the longitudinal sides of the first member 4012. Accordingly, the detection electrodes 4020a and 4020b are just disposed at banks 4024a and 4024b on both sides of the groove 4022, respectively. For each of the reference electrode 4016, driving electrode 4018, and two detection electrodes 4020a and 4022b, a silver electrode is used. The depth of the groove 4022, namely, the height of each of the banks 4024a and 4024b, is 30 μm, whereas the width of the groove 4022 is 0.2 mm. Also, the width of each of the banks 4024a and 4024b, namely, the width of each of the detection electrodes 4020a and 4020b, is 0.4 mm.

In order to detect a Coriolis force component by means of this piezoelectric vibrational angular velocity meter 4100, a vibrator excitation voltage is initially applied between the reference electrode 4016 and the driving electrode 4018. At this time, the vibrator 4010 vibrates in a direction perpendicular to the reference electrode 4016 (bonding surface). Normally, a non-depicted self-excitation circuit is used to effect this vibration with a resonance frequency on the driving side.

Under such a condition, when the piezoelectric vibrational angular velocity meter 4100 rotates, with a certain angular velocity, around an axis which is in parallel to the direction of the longitudinal side, signals due to driving and signals due to Coriolis force are generated at the two detection electrodes 4020a and 4020b with the same frequency.

The signals due to driving are generated at the two detection electrodes 4020a and 4020b in the same phase, whereas the signals due to Coriolis force are generated at the two detection electrodes 4020a and 4020b in phases opposite to each other. Accordingly, when the differential between the signals from the two detection electrodes 4020a and 4020b is detected, the Coriolis force component can be detected.

This vibrational angular velocity meter 4100 is used as a vibrational angular velocity meter used for navigation systems and attitude control systems in aircraft, ship, automobile, and the like as well as for sensing manual blurring and vibration in still camera and video camera.

Figure 95:
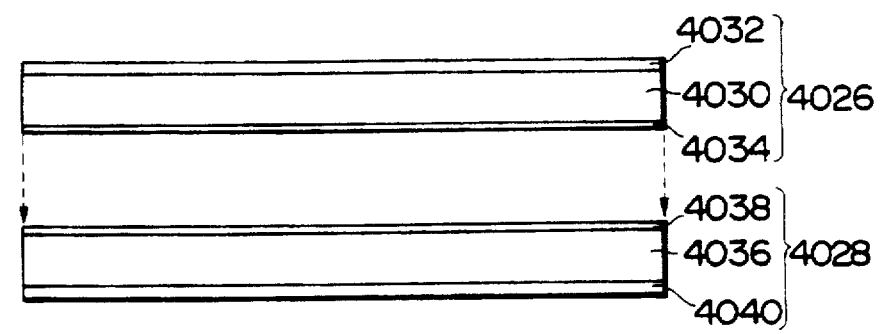
FIG. 95 is an explanatory view for explaining a manufacturing method.
Figure 96:
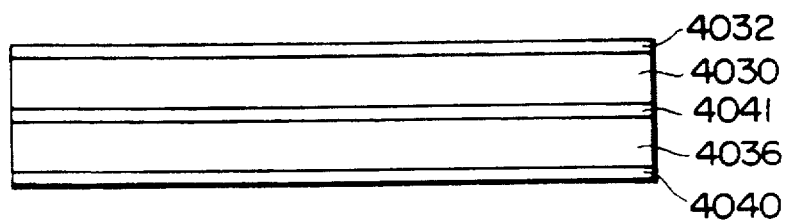
FIG. 96 is an explanatory view for explaining the manufacturing method.

When the vibrational angular velocity meter 4100 is to be manufactured, initially, two sheets of plates each composed of a piezoelectric material which has silver electrodes on both sides thereof and has been subjected to a polarization processing in the electrode direction beforehand are prepared (FIG. 95). Then, first silver electrode surfaces of these two plates 4026 and 4028 are bonded together by means of an epoxy adhesive (FIG. 96). Here, the piezoelectric material and silver electrodes constituting the plate 4026 are respectively indicated by 4030, 4032, and 4034; whereas the piezoelectric material and silver electrodes constituting the plate 4028 are respectively indicated by 4036, 4038, and 4040. Also, the silver electrode formed as the silver electrodes 4034 and 4038 are bonded together is indicated by 4041.

Figure 97:
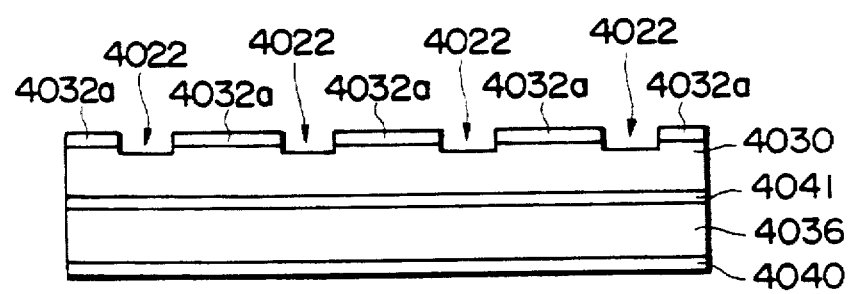
FIG. 97 is an explanatory view for explaining the manufacturing method.

Subsequently, a dicing saw is used to form grooves 4022 on one surface opposite to the bonding surface of the two plates 4026 and 4028, namely, on the surface where the silver electrode 4032 is formed (FIG. 97). The grooves 4022 are formed in parallel to each other with constant widths and intervals. Accordingly, the silver electrodes remain in parallel to each other with constant widths and intervals.

Figure 98:
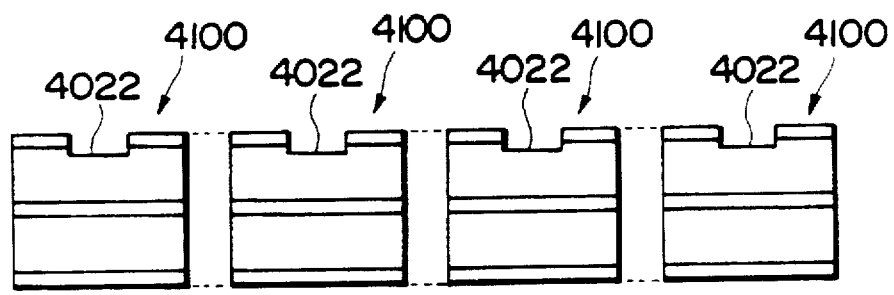

Then, a dicing saw (diamond blade dicing saw) is used to cut the center portion of each remaining silver electrode 4032a (FIG. 98), thereby yielding a plurality of, for example, four, piezoelectric vibrational angular velocity meters 4100.

Thereafter, though not depicted, a lead is attached to each electrode.

With respect to one piezoelectric vibrational angular velocity meter 4100 arbitrarily selected from a plurality of the piezoelectric vibrational angular velocity meters thus manufactured, the resonance frequency on the driving side of the vibrator 4010, namely, the resonance frequency between the reference electrode 4016 and the driving electrode 4018, and the resonance frequency of the detection side of the vibrator 4010, namely, the resonance frequency between the reference electrode 4016 and the detection electrode 4020a, were measured. The resonance frequency on the driving side was about 38.5 kHz, whereas the resonance frequency on the detection side was about 39.1 kHz. For the resonance frequency on the detection side, the resonance frequency between the reference electrode 4016 and the detection electrode 4020b may be measured as well. The resonance frequencies of the vibrator 4010 on the driving side and detection side were measured by means of an impedance analyzer (not depicted). The impedance analyzer is an apparatus in which, while applying an AC voltage with a variable frequency to an object, the impedance of the object at each frequency is measured. Accordingly, when the impedance analyzer applies an AC voltage between the reference electrode 4016 and the lower surface electrode 4018, the vibrator 4100 vibrates. The frequency of this AC voltage is swept by the impedance analyzer. While sweeping the frequency of the AC voltage, the impedance analyzer measures the impedance between the first lower surface electrode 4016 and the second lower surface electrode 4018. The impedance measured by this impedance analyzer has peaks at two specific frequencies. One of these peaks is measured when the frequency of the applied AC voltage coincides with the natural frequency of the vibrator 4100 in the thickness direction thereof, whereas the other peak is measured when the frequency of the applied AC voltage coincides with the natural frequency of the vibrator 4100 in the width direction thereof (direction perpendicular to both thickness and longitudinal directions). In the method of this embodiment, indentations $S_1$ and $S_2$ are formed such that these two peaks coincide with each other.

In the following, a method in which this piezoelectric vibrational angular velocity meter 4100 is used to adjust the difference between the resonance frequencies on the driving side and detection side of the vibrator 4010 will be explained. In this embodiment, side surfaces of the first and second members 4012 and 4014 which are in parallel to the longitudinal sides thereof and orthogonal to the reference electrode 4016, namely, the side surface of the first member 4012 indicated by A1 in FIGS. 93 and 94 (also referred to as "first surface portion" hereinafter) and the side surface of the second member 4014 indicated by B1 in FIGS. 93 and 94 (also referred to as "second surface portion" hereinafter), are exposed to pulse irradiation of YAG laser (with a beam diameter of 200 μm and a power density of 10 W) so as to adjust the difference between the resonance frequencies on the driving side and detection side of the vibrator 4010. The pulse irradiation of YAG laser with respect to the first and second surface portions A1 and B1 were effected while the irradiating position is gradually shifted between positions X and Y, which become vibrational nodal points of the vibrator 4010, in directions which are in parallel to the longitudinal sides of the first and second members 4012 and 4014. When the space between the positions X and Y are irradiated with the YAG laser, the resonance frequency difference can be adjusted most effectively. In FIG. 93, the pulse irradiation positions for the YAG laser are indicated by $S_1$ and $S_2$. Upon one pulse of YAG Laser irradiation, each of the first surface portion A1 and the second surface portion B1 is subjected to a shaving processing with a diameter of 200 μm and a depth of 30 μm. Namely, the indentation $S_1$ is formed in the first piezoelectric crystal member 4012 as the first piezoelectric crystal member 4012 is irradiated with a pulse laser beam, whereas the indentation $S_2$ is formed in the second piezoelectric crystal member 4014 as the second piezoelectric crystal member 4014 is irradiated with a pulse laser beam. These processes are repeated until the peak of the impedance obtained when the vibrator 4100 is vibrated at the natural frequency of its thickness direction coincides with the peak of the impedance obtained when the vibrator 4100 is vibrated at the natural frequency of its width direction.

While the tolerance range of the resonance frequency difference is determined according to the method of use of the piezoelectric vibrational angular velocity meter, the final target resonance frequency difference is set near 0 Hz here. In FIG. 94, the side surface of the first member 4012 opposite to the first surface portion A1 is indicated as a third surface portion A2, whereas the side surface of the second member 4014 opposite to the second surface portion B1 is indicated as a fourth surface portion B2.

Figure 99:
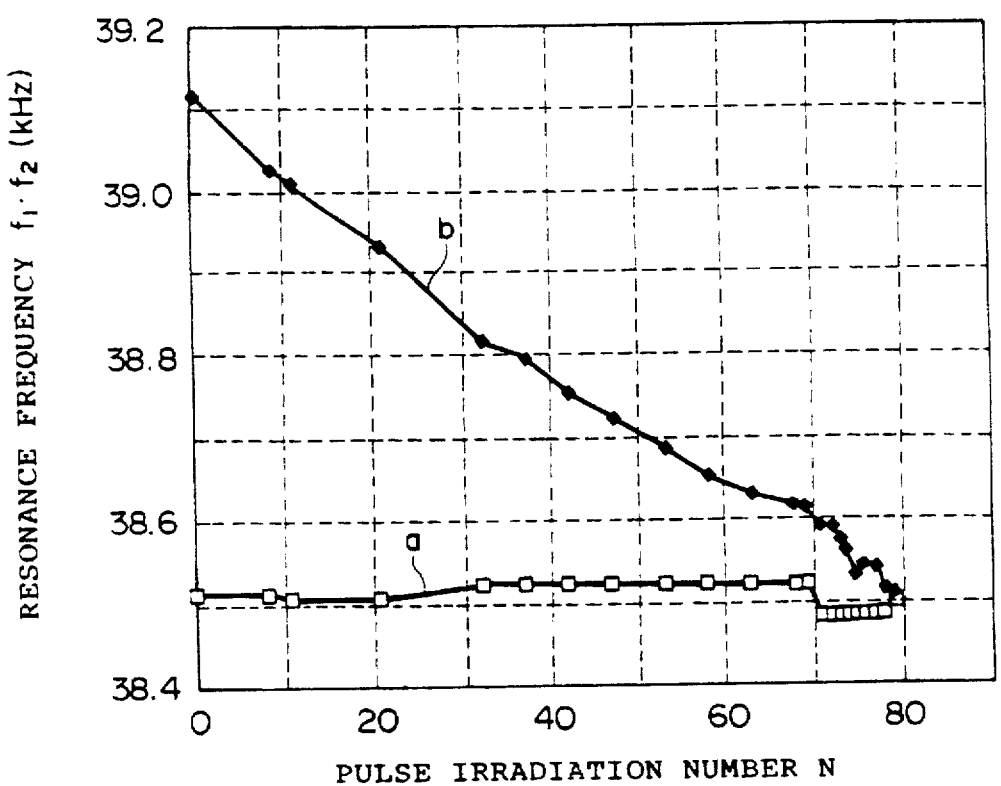
Figure 100:
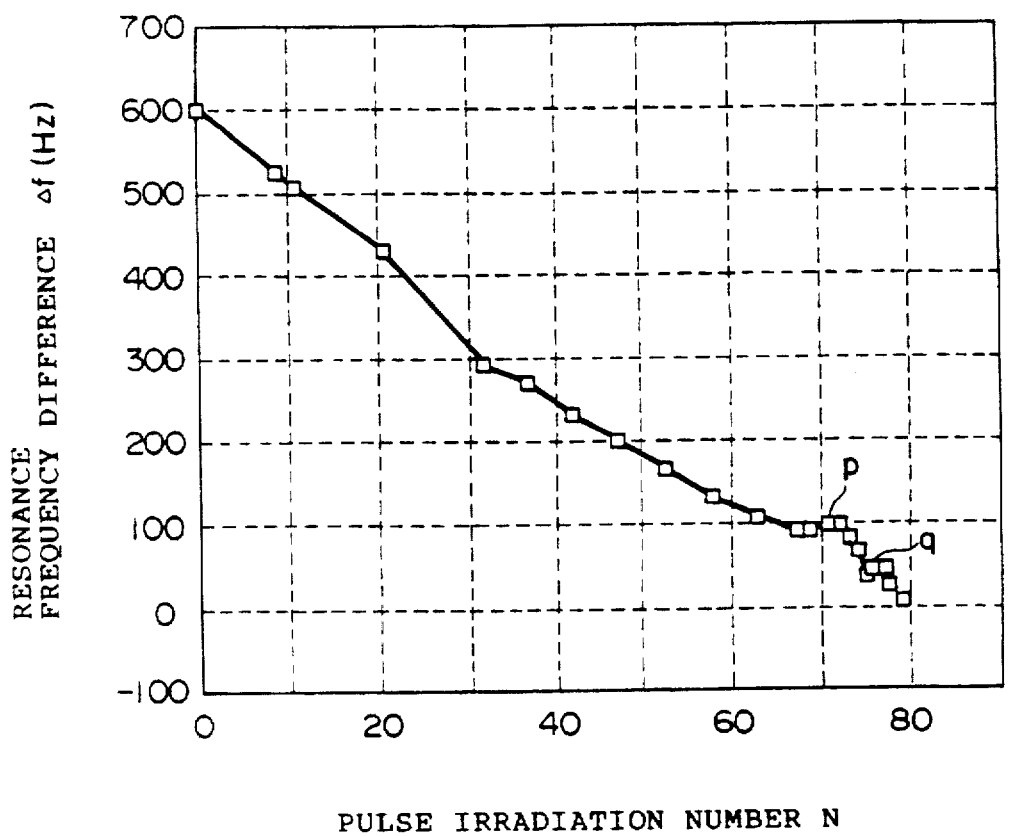

FIG. 99 is a variation chart of resonance frequency, whose vertical axis indicates resonance frequency f1 (kHz) on the driving side and resonance frequency f2 (kHz) on the detection side and horizontal axis indicates pulse irradiation number N. FIG. 100 is a variation chart of resonance frequency difference, whose vertical axis indicates difference Δf (Hz) between the resonance frequency on the driving side and the resonance frequency on the detection side and horizontal axis indicates pulse irradiation number N. In FIG. 99, curve a indicates change in the resonance frequency f1 on the driving side, whereas curve b indicates change in the resonance frequency f2 on the detection side. Table 1 shows the measured values of the resonance frequency f1 (kHz) on the driving side, resonance frequency f2 (kHz) on the detection side, and the resonance frequency difference Δf (Hz) at each irradiation pulse number N.

TABLE 1

| Pulse irradiation number N | Resonance frequency on driving side f1 (kHz) | Resonance frequency on detection side f2 (kHz) | Resonance frequency difference Δf (Hz) |
|---|---|---|---|
| 0 | 38.512 | 39.113 | 601 |
| 8 | 38.512 | 39.027 | 515 |
| 11 | 38.506 | 39.008 | 502 |
| 21 | 38.506 | 38.926 | 420 |
| 32 | 38.521 | 38.813 | 292 |
| 37 | 38.521 | 38.791 | 270 |
| 42 | 38.521 | 38.755 | 234 |
| 47 | 38.521 | 38.722 | 201 |
| 53 | 38.521 | 38.687 | 166 |
| 58 | 38.521 | 38.655 | 134 |
| 63 | 38.521 | 38.632 | 111 |
| 68 | 38.521 | 38.615 | 94 |
| 69 | 38.521 | 38.615 | 94 |
| 71 | 38.487 | 38.590 | 103 |
| 72 | 38.487 | 38.590 | 103 |
| 73 | 38.487 | 38.575 | 88 |
| 74 | 38.487 | 38.562 | 75 |
| 75 | 38.487 | 38.532 | 45 |
| 76 | 38.487 | 38.542 | 55 |

TABLE 1-continued

| Pulse irradiation number N | Resonance frequency on driving side f1 (kHz) | Resonance frequency on detection side f2 (kHz) | Resonance frequency difference Δf (Hz) |
|---|---|---|---|
| 77 | 38.487 | 38.542 | 55 |
| 78 | 38.487 | 38.517 | 30 |
| 79 | 38.500 | 38.505 | 5 |

In this embodiment, the second surface portion B1 was initially subjected to pulse irradiation of YAG laser. In this case, the resonance frequency difference Δf, which had been initially 601 Hz, decreased upon the pulse irradiation of YAG laser. The decrease in the resonance frequency difference Δf was mainly caused by the decrease in the resonance frequency f2 on the detection side. Specifically, the resonance frequency difference Δf decreased to 94 Hz at the sixty-eighth pulse irradiation of YAG laser. When further subjected to pulse irradiation of YAG laser, however, the resonance frequency difference Δf did not decrease. Specifically, the resonance frequency difference Δf became 94 Hz at the sixty-ninth pulse irradiation of YAG laser and 103 Hz at the seventy-first pulse irradiation (point p in FIG. 100). Therefore, the pulse irradiation of YAG laser with respect to the second surface portion B1 was terminated at the seventy-first time. The resonance frequency difference Δf in this case was 103 Hz (intermediate value) which was larger than the final target value.

Thereafter, when the first surface portion A1 was subjected to pulse irradiation of YAG laser, the resonance frequency difference Δf decreased. Also in this case, the decrease in the resonance frequency difference Δf was mainly caused by the decrease in the resonance frequency f2 on the detection side. Specifically, the resonance frequency difference Δf decreased to 45 Hz at the seventy-fifth pulse irradiation of YAG laser. When further subjected to pulse irradiation of YAG laser, however, the resonance frequency difference Δf did not decrease. Specifically, the resonance frequency difference Δf became 55 Hz at the seventy-sixth pulse irradiation of YAG laser (point q in FIG. 100). Therefore, the pulse irradiation of YAG laser with respect to the first surface portion A1 was terminated at the seventy-sixth time. The resonance frequency difference Δf in this case was 55 Hz (intermediate value) which was larger than the final target value.

Thereafter, when the second surface portion B1 was irradiated with the YAG laser again, the resonance frequency difference Δf decreased. Specifically, the resonance frequency difference Δf decreased to 5 Hz at the seventy-ninth pulse irradiation of the YAG laser. Since the resonance frequency difference Δf reached the final target in the proximity of 0 Hz, the pulse irradiation of YAG laser was terminated at the seventy-ninth time.

In this embodiment, the initial pulse irradiation of YAG laser with respect to the second surface portion B1 contributed to the decrease in the resonance frequency difference Δf. However, the pulse irradiation of YAG laser on the second surface portion B1 does not always contribute to the decrease in the resonance frequency difference Δf. Rather, the pulse irradiation of YAG laser with respect to the first surface portion A1 may contribute to the decrease in the resonance frequency difference Δf. Though experiments had been repeated, no causal relationship was attained with respect to whether the first or second surface portion A1 or B1 should be initially subjected to the pulse irradiation of YAG laser. It may depend on local unevenness in characteristics of the first and second members 2012 and 2014 or fluctuations in processing of electrodes. Accordingly, for example, if the resonance frequency difference Δf decreases after the first surface portion A1 is irradiated with five pulses of YAG laser irradiation as a preparatory shaving processing, the first surface portion A1 will be defined as the surface portion to be initially subjected to the pulse irradiation of YAG laser. If not, the second surface portion B1 will be defined as the surface portion to be initially subjected to the pulse irradiation of YAG laser.

As explained in the foregoing, in the case where a step for continuously subjecting one surface portion of the first and second surface portions A1 and B1 to pulse irradiation of YAG laser during the time in which the resonance frequency difference Δf decreases and a step for continuously subjecting the other surface portion to pulse irradiation of YAG laser during the time in which the resonance frequency difference Δf decreases, which is effected when the resonance frequency difference fails to decrease in the other step, are alternately repeated, the resonance frequency difference Δf can reach the final target value. In this embodiment, the final target value is near 0 Hz.

According to circumstances, the resonance frequency difference Δf may reach the final target. value when the pulse irradiation of YAG laser with respect to the surface portion initially subjected thereto is continuously effected during the time in which the resonance frequency difference Δf decreases.

While the method in which the first and second surface portions A1 and B1 are exposed to the pulse irradiation of YAG laser so as to adjust the difference between the resonance frequencies of the vibrator on the driving side and detection side is explained in the foregoing, it has been found, as a result of experiments repeated many times, that effects equivalent thereto can be expected when the first surface portion A1 and the third surface portion A2 are exposed to the pulse irradiation of laser in place of the first surface portion A1 and the second surface portion B1. Similarly, it has been found that effects equivalent thereto can be expected when the first surface portion A1 and the fourth surface portion B2 are exposed to the pulse irradiation of laser in place of the first surface portion A1 and the second surface portion B1.

Further, assuming that the first and fourth surface portions A1 and B2 constitute a first group and that the second and third surface portions B1 and A2 constitute a second group, it has been found that equivalent effects can be expected in the case where a step for continuously subjecting one or both surface portions constituting one of the first and second groups to pulse irradiation of YAG laser during the time in which the resonance frequency difference Δf decreases and a step for continuously subjecting one or both surface portions constituting the other group to pulse irradiation of YAG laser during the time in which the resonance frequency difference Δf decreases are alternately repeated. For example, the pulse irradiation of YAG laser is initially effected with respect to one or both surface portions of the first surface portion A1 and fourth surface portion B2 constituting the first group and then with respect to one or both surface portions of the second surface portion B1 and third surface portion A2 constituting the second group. Thereafter, the pulse irradiation of YAG laser is effected with respect to one or both surface portions of the first surface portion A1 and fourth surface portion B2 constituting the first group again.

Figure 101:
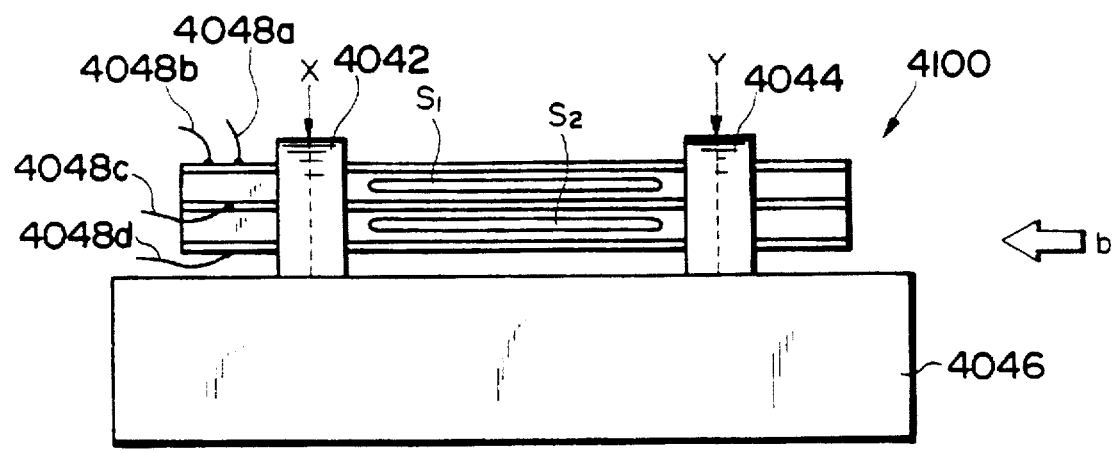
Figure 102:
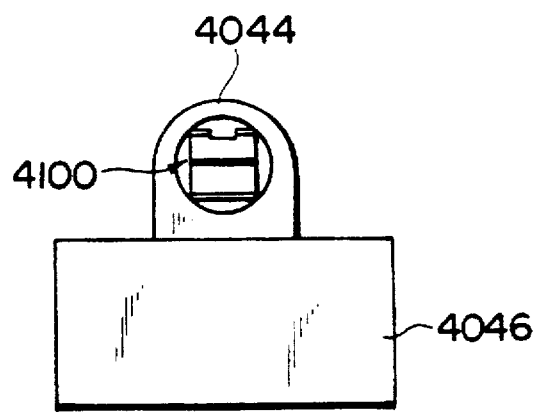

FIGS. 101 and 102 are views used for explaining an example in which, while the piezoelectric vibrational angular velocity meter 4100 is fixed, the first to fourth surface portions A1, A2, B1, and B2 are exposed to pulse irradiation of YAG laser. FIG. 101 is a side view of the piezoelectric vibrational angular velocity meter 4100, whereas FIG. 102 is a front view of the piezoelectric vibrational angular velocity meter 4100 observed from the direction of arrow b shown in FIG. 101. In the example shown in FIGS. 101 and 102, in order to fix the piezoelectric vibrational angular velocity meter 4100, used are supporting members 4042 and 4044 composed of silicone resin each having an internal through hole whose diameter is substantially the same as or slightly smaller than the diagonal length of the cross section of the piezoelectric vibrational angular velocity meter 4100. In this case, the piezoelectric vibrational angular velocity meter 4100 is inserted into the internal through holes of the supporting members 4041 and 4044, while an etched portion of the piezoelectric vibrational angular velocity meter 4100 and the supporting members 4042 and 4044 are fixed to each other by means of a silicone adhesive. The lower surface of each of the supporting members 4042 and 4044 is fixed onto a substrate 4046 made of alumina by means of an adhesive.

When the first to fourth surface portions A1, A2, B1, and B2 are exposed to pulse irradiation of YAG laser after the piezoelectric vibrational angular velocity meter 4100 is fixed in such a manner, the resonance frequency difference can be adjusted at the final step for manufacturing the piezoelectric vibrational angular velocity meter 4100. Since no post-process is necessary, the most efficient piezoelectric vibrational angular velocity meter 4100 can be provided. In FIG. 101, the pulse irradiation positions for the YAG laser are indicated by $S_1$, and $S_2$ Also, while leads 4048a to 4048d are soldered between the supporting member 4042 and the end surface of the piezoelectric vibrational angular velocity meter 4100, the influence of the attachment of leads upon the vibration can be minimized when the leads are soldered to the respective electrodes at positions X and Y which become vibrational nodal points of the vibrator 4010.

Though the above-mentioned embodiment is explained with reference to the piezoelectric vibrational angular velocity meter in which the groove 4022 is formed between the two detection electrodes 4020a and 4020b, it may be a piezoelectric vibrational angular velocity meter in which the groove 4022 is not formed. In this case, the two detection electrodes 4020a and 4020b may be formed by screen printing technique. Also, the present invention is applicable to a piezoelectric vibrational angular velocity meter in which a self-excitation feedback electrode is disposed between the two detection electrodes 4020a and 4020b.

Also, while YAG laser is used for the shaving processing in the above-mentioned embodiment, carbon dioxide gas laser, excimer laser, and the like may also be used as the laser. Alternatively, a fine drill or other precision shaving processing methods may be used for effecting the shaving processing.

Though a kind of linear shaving processing in which the laser spot is gradually shifted is used as the shaving processing method in the above-mentioned embodiment, a bore processing in which dots are continuously aligned may also be used. In this case, the form of the bore may not be circular. Also, the shaving processing is not limited to a single line but may be effected in a plurality of lines.

As can be seen from the foregoing explanations, in the resonance frequency adjusting method for the vibrator for piezoelectric vibrational angular velocity meter in accordance with the present invention, as a side surface of the vibrator for piezoelectric vibrational angular velocity meter composed of a piezoelectric material is subjected to a shaving processing with a predetermined amount of shaving, the difference between the resonance frequencies of the vibrator on the driving side and detection side can reach the final target value.

Also, when the side surface of the vibrator is subjected to the shaving processing with a predetermined amount of shaving while the vibrator is fixed to a supporting member, the most efficient piezoelectric vibrational angular velocity meter can be provided since no further manufacturing step is necessary.

The above-mentioned vibrator or piezoelectric vibrational angular velocity meter can be applied to the camera shown in FIG. 4A.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 207080/1994 (6-207080) filed on Aug. 31, 1994, 207081/1994 (6-207081) filed on Aug. 31, 1994, 207082/1994 (6-207082) filed on Aug. 31, 1994, 115693/1995 (7-115693) filed on May 15, 1995, 83828/1995 (7-83828) filed on Apr. 10, 1995, 83830/1995 (7-83830) filed on Apr. 10, 1995, 287822/1995 (7-287822) filed on Oct. 9, 1995, 170153/1995 (7-170153) filed on Jun. 13, 1995 and 335085/1995 (7-335085) filed on Dec. 22, 1995 are hereby incorporated by reference.

What is claimed is:

1. A camera comprising:

a substrate;

a piezoelectric element; and at least two support portions for supporting said piezoelectric element, said support portions being interposed between said substrate and said piezoelectric element, wherein said piezoelectric element comprises a first piezoelectric element including, a first member comprised of a piezoelectric crystal,
   a left electrode arranged on an upper surface of said first member,
   a right electrode arranged on the upper surface of said first member,
   a middle electrode arranged between said left and right electrodes on the upper surface of said first member, and
   a lower-surface electrode arranged on a lower surface of said first member.

2. A camera comprising:

a substrate;

a piezoelectric element; and at least two support portions for supporting said piezoelectric element, said support portions being interposed between said substrate and said piezoelectric element, wherein said piezoelectric element comprises:

a first piezoelectric element including,
      a first member comprised of a piezoelectric crystal,
      a left electrode arranged on an upper surface of said first member,
      a right electrode arranged on the upper surface of said first member,
      a middle electrode arranged between said left and right electrodes on the upper surface of said first member, and
      a first lower-surface electrode arranged on a lower surface of said first member;

a second piezoelectric element including,
      a second member comprised of a piezoelectric crystal,
      an upper-surface electrode arranged on an upper surface of said second member, and
      a second lower-surface electrode arranged on a lower surface of said second member; and an adhesive interposed between said first and second piezoelectric elements.

3. A camera according to claim 2, further comprising:

wires respectively connected to said left electrode, said right electrode, said middle electrode, said upper-surface electrode, said first lower-surface electrode, and said second lower-surface electrode;

a circuit board having an upper surface to which said substrate is fixed, the upper surface having terminals to which said wires are respectively connected; and a circuit unit arranged on a lower surface of said circuit board, said circuit unit including a circuit, electrically connected to the terminals, for applying an AC voltage to said piezoelectric element, and a circuit for processing a signal output from said piezoelectric element.

4. A camera according to claim 3, further comprising a lower case having a cavity in which said circuit unit is housed.

5. A camera according to claim 3, wherein said lower case includes at least two surfaces which support said circuit board in contact with the lower surface thereof.

6. A camera according to claim 3, further comprising:

a lower case having a cavity in which said circuit unit is housed; and an upper case for housing said piezoelectric element, said upper case being fixed to said lower case with an adhesive.

7. A camera according to claim 2, further comprising:

a circuit for applying an AC voltage between said upper-surface electrode and said second lower-surface electrode; and an automatic level control circuit for controlling an amplitude of the AC voltage generated by said circuit such that an amplitude of an AC voltage induced between said middle electrode and said first lower-surface electrode is kept constant.

8. A camera according to claim 7, wherein said automatic level control circuit comprises:

a first comparator for comparing a voltage induced between said middle electrode and said first lower-surface electrode with a first reference voltage, and outputting a voltage signal having a square wave;

a second comparator for comparing a voltage induced between said middle electrode and said first lower-surface electrode with a second reference voltage, and outputting a voltage signal having a square wave;

an integrating circuit for integrating the voltage signal output from said first comparator; and a multiplier for multiplying the voltage signal output from said integrating circuit and the voltage signal output from said second comparator.

9. A camera according to claim 2, further comprising a differential amplifier for outputting a voltage signal representing a difference between a voltage signal output from said left electrode and a voltage signal output from said right electrode.

10. A camera according to claim 9, further comprising:

a housing in which a film is placed;

a lens, mounted in said housing, for forming an image of an object on the film;

a motor for moving said lens;

an A/D converter for converting the signal output from said differential amplifier into a digital signal; and a central processing unit for receiving data output from said A/D converter and controlling said motor on the basis of the data.

11. A camera comprising:

a substrate;

a piezoelectric element; and at least two support portions for supporting said piezoelectric element, said support portions being interposed between said substrate and said piezoelectric element, wherein said piezoelectric element comprises:
- a first member comprised of a piezoelectric crystal;
- a lower-surface electrode arranged on a lower surface of said first member and having a rough surface;
- a second member comprised of a piezoelectric crystal;
- an upper-surface electrode arranged on an upper surface of said second member and having a rough surface; and
- an adhesive layer interposed between said lower-surface electrode and said upper-surface electrode, said adhesive layer having a thickness larger than 0 mm and smaller than 1 mm, and said upper-surface electrode being electrically connected to said lower-surface electrode via said adhesive layer.

12. A device for detecting an angular velocity, comprising:

a substrate;

a piezoelectric element; and at least two support portions for supporting said piezoelectric element, said support portions being interposed between said substrate and said piezoelectric element, wherein said piezoelectric element comprises a first piezoelectric element including,
- a first member comprised of a piezoelectric crystal,
- a left electrode arranged on an upper surface of said first member,
- a right electrode arranged on the upper surface of said first member,
- a middle electrode arranged between said left and right electrodes on the upper surface of said first member, and
- a lower-surface electrode arranged on a lower surface of said first member.

13. A device for detecting an angular velocity, comprising:

a substrate;

a piezoelectric element; and at least two support portions for supporting said piezoelectric element, said support portions being interposed between said substrate and said piezoelectric element, wherein said piezoelectric element comprises:
- a first piezoelectric element including,
  - first member comprised of a piezoelectric crystal,
  - a left electrode arranged on an upper surface of said first member,
  - a right electrode arranged on the upper surface of said first member,
  - a middle electrode arranged between said left and right electrodes on the upper surface of said first member, and
  - a first lower-surface electrode arranged on a lower surface of said first member,
- a second piezoelectric element including,
  - a second member comprised of a piezoelectric crystal,
  - an upper-surface electrode arranged on an upper surface of said second member, and
  - a second lower-surface electrode arranged on a lower surface of said second member; and
- an adhesive interposed between said first and second piezoelectric elements.

14. A device for detecting an angular velocity, comprising:

a substrate;

a piezoelectric element; and at least two support portions for supporting said piezoelectric element, said support portions being interposed between said substrate and said piezoelectric element, wherein said piezoelectric element comprises:
- a first member comprised of a piezoelectric crystal;
- a lower-surface electrode arranged on a lower surface of said first member and having a rough surface;
- a second member comprised of a piezoelectric crystal;
- an upper-surface electrode arranged on an upper surface of said second member and having a rough surface; and
- an adhesive layer interposed between said lower-surface electrode and said upper-surface electrode, said adhesive layer having a thickness larger than 0 mm and smaller than 1 mm, and said upper-surface electrode being electrically connected to said lower-surface electrode via said adhesive layer.

* * * * *